(12) United States Patent
Osborn et al.

(10) Patent No.: US 7,992,093 B2
(45) Date of Patent: Aug. 2, 2011

(54) METHOD OF PROGRAMMING A PROCESSING SYSTEM

(75) Inventors: Andrew R. Osborn, Bracknell (GB); Charles K. Cowham, Caledonia, MI (US); Sarah L. Brown, Guilford (GB); Stephen H. Briers, Colchester (GB); Stephen W. Burgess, Middlesex (GB); Alan P. Newson, Guildford (GB); Kyle M. Rhodes, Sandhurst (GB)

(73) Assignee: Beptech Inc., Grand Rapids, MI (US)

( * ) Notice: Subject to any disclaimer, the term of this patent is extended or adjusted under 35 U.S.C. 154(b) by 1621 days.

(21) Appl. No.: 11/066,687

(22) Filed: Feb. 25, 2005

(65) Prior Publication Data

US 2005/0278059 A1    Dec. 15, 2005

Related U.S. Application Data

(60) Provisional application No. 60/547,588, filed on Feb. 25, 2004.

(51) Int. Cl.
*G06F 3/048* (2006.01)
*G06F 9/44* (2006.01)
(52) U.S. Cl. .......................... 715/771; 717/109
(58) Field of Classification Search .................. None
See application file for complete search history.

(56) References Cited

U.S. PATENT DOCUMENTS

| | | | |
|---|---|---|---|
| 4,901,221 A | | 2/1990 | Kodosky et al. |
| 5,301,336 A * | | 4/1994 | Kodosky et al. ............ 715/846 |
| 5,485,620 A * | | 1/1996 | Sadre et al. ................. 717/162 |
| 5,737,622 A * | | 4/1998 | Rogers et al. ............... 713/324 |
| 6,366,300 B1 | | 4/2002 | Ohara et al. |
| 6,449,624 B1 | | 9/2002 | Hammack et al. |
| 6,993,466 B2 * | | 1/2006 | Kodosky et al. ................. 703/2 |
| 7,013,464 B2 * | | 3/2006 | Osborn ......................... 718/102 |
| 7,302,675 B2 * | | 11/2007 | Rogers et al. ............... 717/125 |
| 2002/0145629 A1 * | | 10/2002 | Gabbert et al. .............. 345/763 |
| 2003/0035006 A1 * | | 2/2003 | Kodosky et al. ............ 345/763 |
| 2003/0035010 A1 * | | 2/2003 | Kodosky et al. ............ 345/771 |
| 2003/0038842 A1 * | | 2/2003 | Peck et al. .................. 345/763 |
| 2003/0058280 A1 | | 3/2003 | Molinari et al. |
| 2003/0184580 A1 * | | 10/2003 | Kodosky et al. ............ 345/734 |
| 2003/0192032 A1 * | | 10/2003 | Andrade et al. ............ 717/124 |
| 2004/0255269 A1 * | | 12/2004 | Santori et al. .............. 717/109 |
| 2007/0016659 A1 * | | 1/2007 | Peck et al. .................. 709/220 |

OTHER PUBLICATIONS

PCT International Search Report, International Application No. PCT/US2005/006204; International filing date Feb. 25, 2005; with Written Opinion.

\* cited by examiner

*Primary Examiner* — Michael J Yigdall
*Assistant Examiner* — Ben C Wang
(74) *Attorney, Agent, or Firm* — Howard & Howard Attorneys PLLC

(57) ABSTRACT

Various methods of programming a processing system utilizing a computer having a configuration canvas, at least one processor, and a plurality of function objects is disclosed. A processing configuration is created by placing object icons associated with function objects onto the canvas. Execution paths are automatically routed between the object icons based on orientations of icons on the canvas. Data flow paths are created between object icons on the canvas separately from the routings of the execution paths. Execution paths can be re-routed to increase the versatility of the processing system. Also, visual instruments and instrument icons can be utilized to further graphically illustrate and control the processing configuration.

49 Claims, 54 Drawing Sheets

METHOD OF PROGRAMMING A PROCESSING SYSTEM

CROSS-REFERENCE TO RELATED APPLICATIONS

The subject patent application claims priority to and all the benefits of U.S. Provisional Patent Application Ser. No. 60/547,588, which was filed on Feb. 25, 2004.

BACKGROUND OF THE INVENTION

1. Field of the Invention

The subject invention relates to a processing system and a method of programming the processing system.

2. Description of Related Art

Data processing is utilized in a number of different manufacturing and business related applications for accomplishing a virtually unlimited variety of tasks. One field in which data processing systems are employed is in the field of automaton, control, data collection, and instrumentation. An actual instrument or actuator, such as a load cell, hydraulic valve, or servomotor, creates streams of data in real time or requires real time command streams. A computer, which includes the data processing system, interfaces with the instruments to collect and analyze the data and produce appropriate commands. Prior art data processing systems implemented to accomplish this data collection, as well as a variety of other tasks, utilize different design configurations and are typically organized in a network fashion. Networks may be arranged in a variety of configurations such as a bus or linear topology, a star topology, ring topology, and the like. Within the network there are typically a plurality of nodes and communication links which interconnect each of the nodes. The nodes are part of the processing system and are connected to each of the instruments to individually collect the data outputted by the instruments. The nodes may also be computers, terminals, workstations, other actuators, additional data collectors, sensors, or the like. The nodes typically have a processor, a memory, and various other hardware and software components. The nodes communicate with each other over the communication links within the network to obtain and send information. In a typical application, there may be numerous nodes communicating in a variety of different paths.

A user of the processing system frequently develops and requires conceptual models of the physical system in order to assist the user in programming and utilizing the processing system. Programming this type of data processing system utilizing the nodes can be a daunting task, even for a professional programmer. There are numerous subtle complexities that a programmer must master before efficiently programming a prior art processing system. The task of programming a processing system utilizing mathematical formulas, mathematical steps or other such procedures further complicates the programming process. Computer programs used to control processing systems are typically written in conventional textual programming language such as, for example, machine code, C, C++, or Pascal. Responsive real time performance usually requires that the programmer learn and employ a multi-threaded, real-time operating system. These programming languages and operating systems are not intuitive and are not well adapted for collecting and analyzing data required by the data processing systems.

Users and programmers of processing systems are more often not professional programmers and therefore frequently require high level programming techniques that are more understandable and intuitive. The increasing use of computers and data processing systems by users who are not highly trained in computer programming has lead to the need for programming a data processing system that is easier to use and implement that the current systems.

The prior art has contemplated improvements in the programming of data processing systems over the programming languages listed above, see U.S. Pat. Nos. 4,901,221; 4,914,568; and 5,301,301. The programming techniques disclosed in these prior art documents attempts to graphically assist the user in programming the data processing system. However, these programming techniques have a number of deficiencies. In particular, these approaches are personal-computer centric and do not natively handle a system of distributed, multi-processing nodes. There are an inordinate number of steps required to complete a programming configuration and there are a number of features that remain counterintuitive. Also, there are a number of unnecessary constraints placed on the user or programmer of the processing system. Finally, the processing system is incapable of dynamically changing during the programming process or during the operation of the processing system.

Accordingly, it would be desirable to develop a method of programming a processing system which is relatively easy and intuitive. Further, the programming method should be versatile and have limited constraints to allow the user to fully customize the processing system. As well, the programming method should be adaptable to multi-processing distributed systems. Finally, the programming method should be graphical in nature to assist the user in visually conceptualizing the programming steps and should be capable of dynamically changing during both the programming process and during operation.

SUMMARY OF THE INVENTION AND ADVANTAGES

The subject invention includes a method of programming a processing system utilizing a computer having a configuration canvas, at least one processor, and a plurality of function objects with each of the function objects including commands to perform a particular function. The method comprises the steps of placing a first object icon associated with a first function object onto the canvas at a first location. A second object icon associated with a second function object is placed onto the canvas at a second location, with the second location being different than the first location. A third object icon associated with a third function object is placed onto the canvas at a third location, with the third location being different than the first and second locations. The method includes the step of automatically routing an execution path from one of the first and second object icons to the third object icon based on an orientation of the third location of the third object icon relative to the first location of the first object icon and the second location of the second object icon on the canvas.

The subject invention also includes a method of programming the processing system with the function objects further including inputs and outputs. This method comprises the steps of placing a first object icon associated with a first function object onto the canvas at a first location. A second object icon associated with a second function object is placed onto the canvas at a second location, with the second location being different than the first location. The method also includes the steps of automatically routing an execution path from the first object icon at the first location to the second object icon at the second location when the second object icon is placed on the canvas, and creating a data flow path from an output of the first object icon to an input of the second object icon on the canvas separately from the routings of the execution paths on the canvas such that the execution paths and data flow path are independent from each other.

The subject invention further includes a method of programming the processing system comprising the steps of placing a first processor icon associated with a first processor onto the canvas. A first plurality of object icons each associated with a first plurality of function objects are placed onto the canvas at a plurality of different locations. A first plurality of execution paths are automatically routed from the first processor icon to each of the first plurality of object icons when the first plurality of object icons are placed on the canvas to define a first processing configuration. A second processor icon is placed onto the canvas. A second plurality of object icons each associated with a second plurality of function objects are placed onto the canvas at a plurality of different locations. A second plurality of execution paths are automatically routed from the second processor icon to each of the second plurality of object icons when the second plurality of object icons are placed on the canvas to define a second processing configuration. The method also includes the step of re-routing at least one of the first plurality of object icons from the first processing configuration into the second processing configuration by automatically removing the first plurality of execution paths associated with the re-routed object icon and automatically routing the second plurality of execution paths to the re-routed object icon.

The subject invention also includes a method of programming a processing system utilizing the computer having an instrument canvas and a temporary pane with the processing system further including at least one visual instrument. The method comprises the steps of placing a first plurality of object icons each associated with a first plurality of function objects onto the configuration canvas at a plurality of different locations. A plurality of execution paths are automatically routed between each of the first plurality of object icons when the first plurality of object icons are placed on the configuration canvas to define a processing configuration. Data flow paths are created between the object icons on the configuration canvas. At least one visual instrument is placed onto the instrument canvas. An instrument icon associated with the visual instrument is automatically placed onto the temporary pane. The instrument icon is moved from the temporary pane to place the instrument icon onto the configuration canvas. The method includes the step of creating a data flow path between the instrument icon and at least one of the object icons within the processing configuration on the configuration canvas such that the visual instrument on the instrument canvas is operationally connected to the processing configuration on the configuration canvas. Alternatively, at least one instrument icon can be first placed onto the configuration canvas. The visual instrument associated with the instrument icon is then automatically placed onto the temporary pane. A data flow path is created between the instrument icon and at least one of the object icons within the processing configuration on the configuration canvas. The alternative method includes the step of moving the visual instrument from the temporary pane to place the visual instrument onto the instrument canvas with the visual instrument on the instrument canvas operationally connected to the processing configuration on the configuration canvas.

Accordingly, the subject invention includes numerous improved methods of programming a processing system that create a graphical programming technique that is extremely versatile yet intuitive. As explored in greater detail below, the programming method is dynamic in nature and can be altered during both the programming process and during operation.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
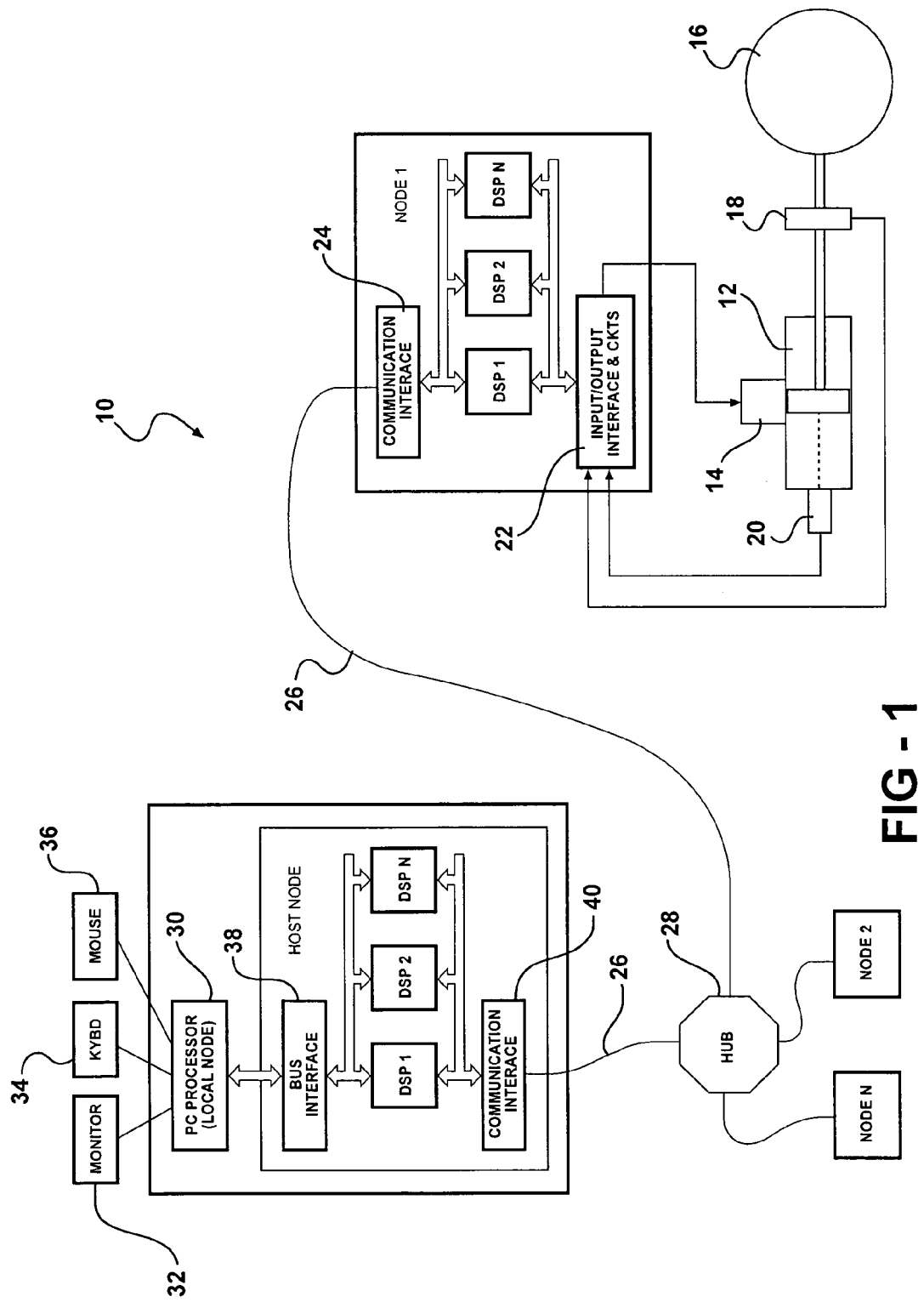
FIG. 1 is a schematic illustration of one contemplated application of the processing system.

Referring to the Figures, wherein like numerals indicate like or corresponding parts throughout the several views, a schematic illustration of one contemplated application of the processing system is generally shown at 10 in FIG. 1. In particular, the processing system 10 is configured as a distributed multiprocessing system 10 having a plurality of nodes. One contemplated application of the distributed multiprocessing system 10 is for compiling and analyzing data, such as during a testing of a vehicle. As one skilled in the art will appreciate, the processing system 10 of the subject invention has numerous applications and the subsequent discussion relating to data collection and vehicle testing is merely for illustrative purposes and is in no way intended to limit the scope of the subject invention.

As shown in FIG. 1, a hydraulic actuator 12 with a servo-valve 14 are schematically shown. The hydraulic actuator 12 acts on a test specimen 16, such as a vehicle. A load cell 18 and displacement transducer 20 are connected to the actuator 12 to provide signals, such as force and displacement, to an interface 22. The interface 22 is also connected to the servo-valve 14 to provide the necessary control signals. The interface 22 is preferably part of a servo-controller node, which is labeled as node 1 in the Figure. Node 1 also includes one or more processors and a communication interface 24. Preferably, the processor(s) of node 1 are digital signal processors (DSPs). Node 1 is in turn connected, via a communication link 26, to a routing hub 28. As shown, there are other nodes and a host node also connected to the hub 28. There may be any number of nodes connected to the hub 28 with these nodes having any suitable number and type of processors. The host node is preferably a computer having a PC processor 30 along with a monitor 32, keyboard 34, mouse 36, and any other suitable peripheral device. The host node includes a DSP card which has a bus interface 38, one or more DSP processors, and a communication interface 40. As with node 1, the communication interface 40 of the host node connects the host node to the hub 28 through a communication link 26. As also with node 1, there is no restriction on the type or size of processors in the host node. The specific and unique structure of the hub 28 and node configuration as well as the specifics of the nodes themselves is disclosed in co-pending U.S. patent application Ser. Nos. 09/692,852 and 09/982,601, the disclosures of which are herein incorporated by reference.

As discussed in the background section above, prior art processing systems can be difficult and non-intuitive to program. The logical extension of the distributed multiprocessing system illustrated in FIG. 1 can also be difficult to program. As such, the subject invention has been invented to address these needs. The subject invention includes numerous improved methods, discussed in detail below, of programming the distributed multiprocessing system that are graphical in nature, extremely versatile, and intuitive to use. The programming method is also dynamic in nature and can be altered during both the programming process and during operation.

Figure 2:
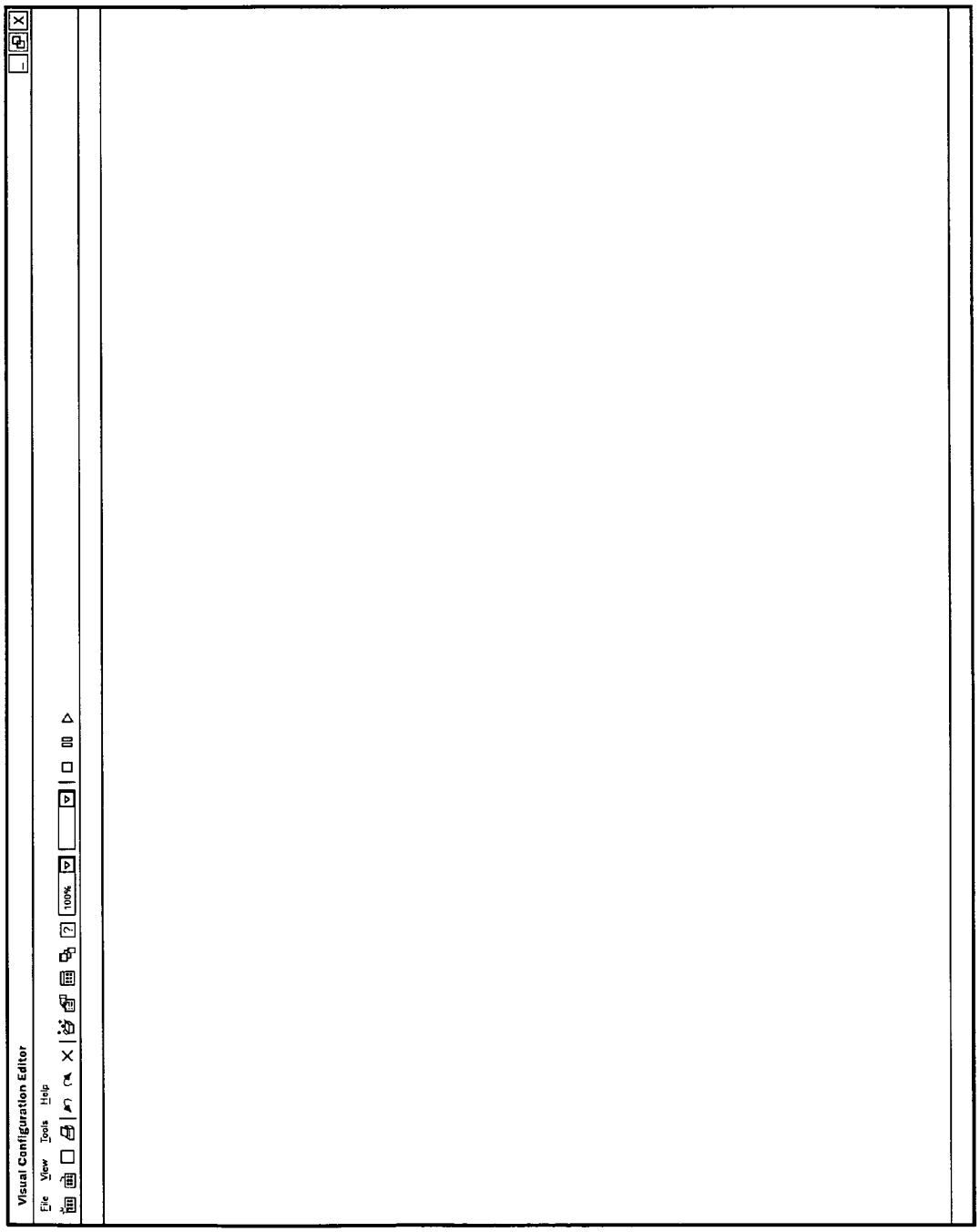
FIG. 2 illustrates a blank start up screen of a computer monitor connected to the processing system of the subject invention.

Turning to FIGS. 2-10, many of the basic components used in the programming methods are shown. A blank start up screen of the computer monitor is shown in FIG. 2. This screen or window is labeled as a Visual Configuration Editor (VCE). Many of the features shown on the VCE or start up screen are typical of a window based system. The VCE is the environment employed by a user to create, edit, run, and monitor the operation of a project. It should be noted that the term REDGRID® is a registered trademark with the U.S. Patent Office and any use of this term in this patent application in no way diminishes the strength and/or protection available for this mark. Further, the terms Visual Configuration Editor and VCE, as well as the graphical illustration adjacent the REDGRID® mark, as used in this patent application, in no way diminishes the strength and/or protection available for these trademarks.

Figure 3:
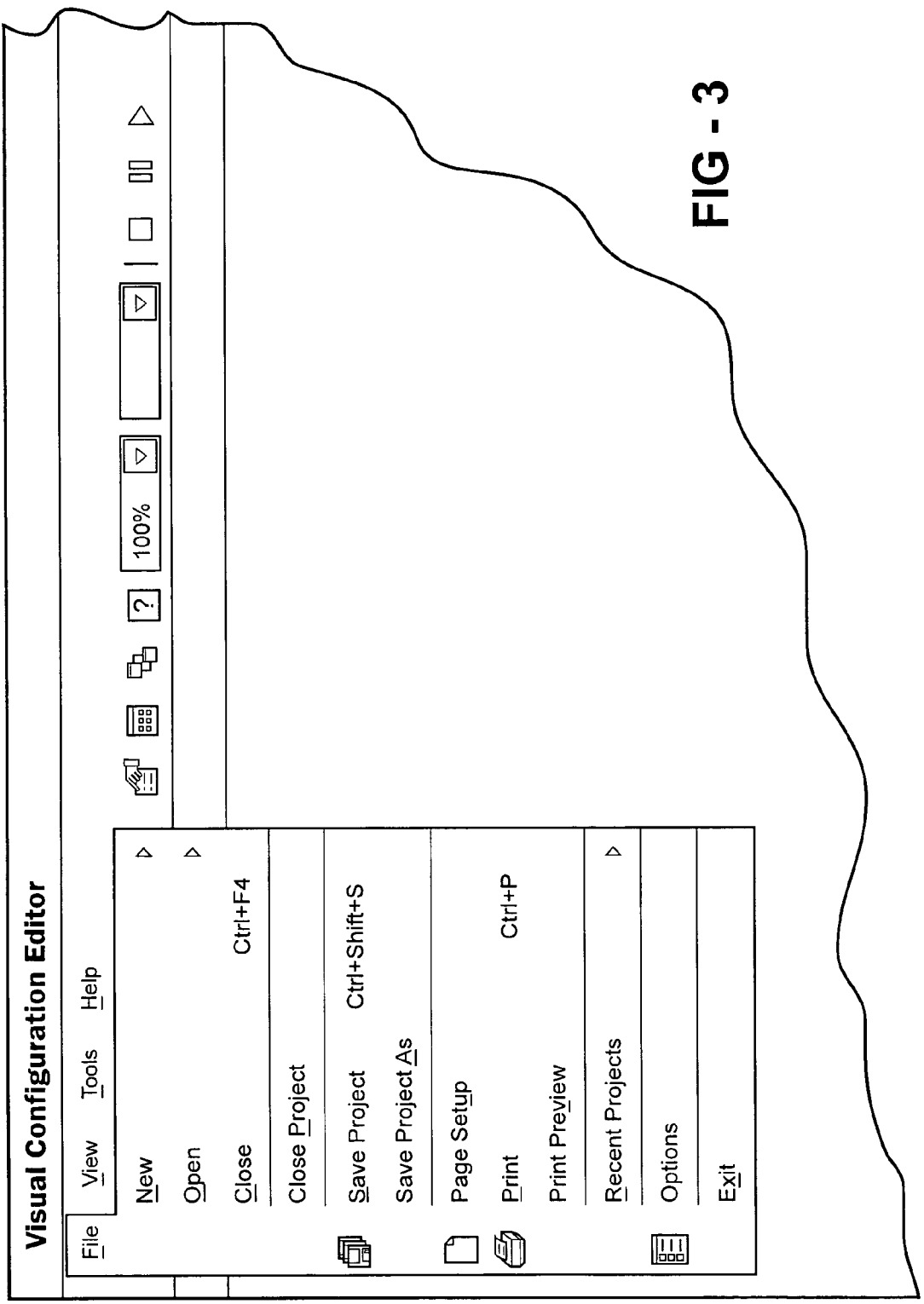
FIG. 3 illustrates a File menu of the start up screen.
Figure 4:
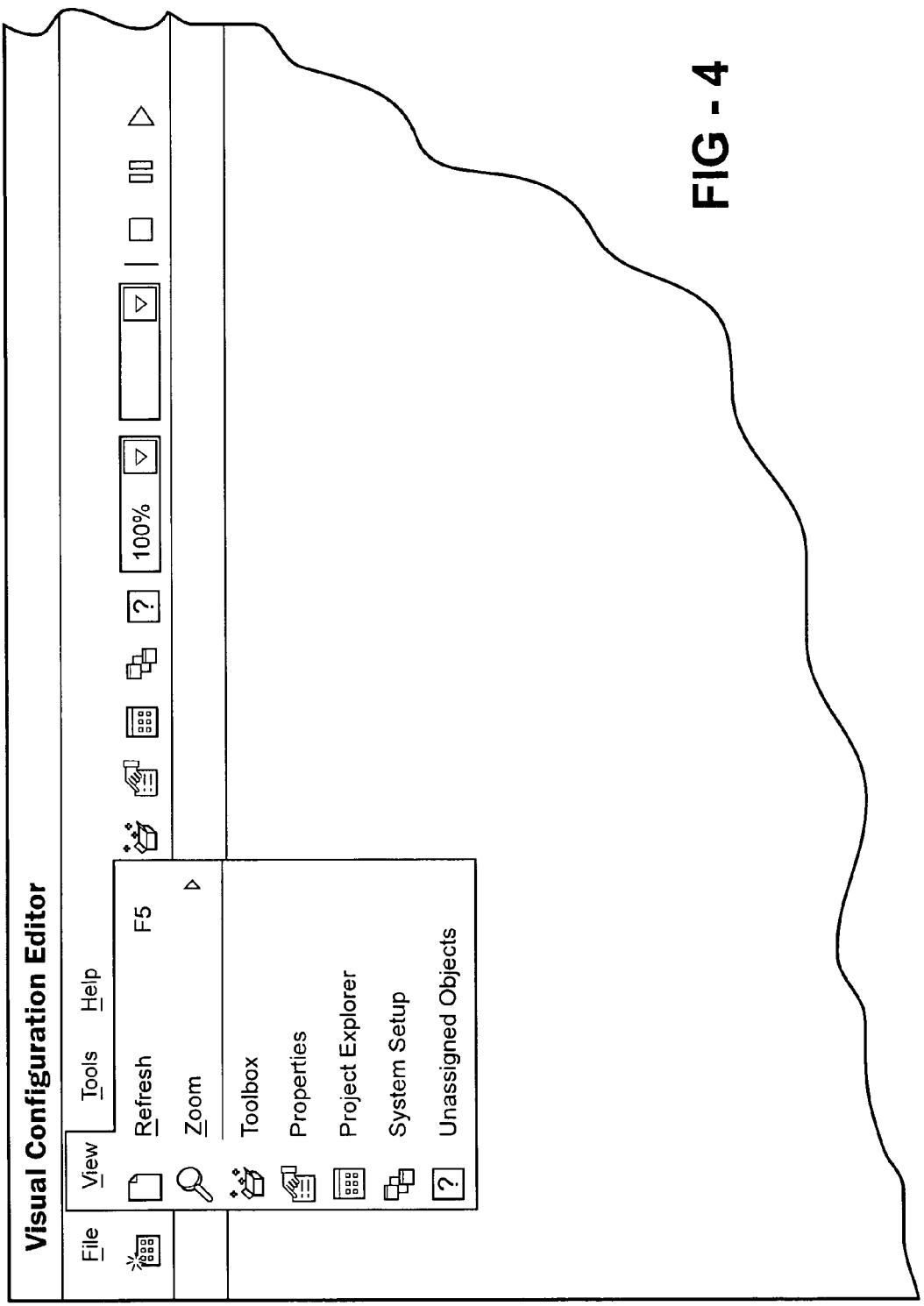
FIG. 4 illustrates a View menu of the start up screen.
Figure 5:
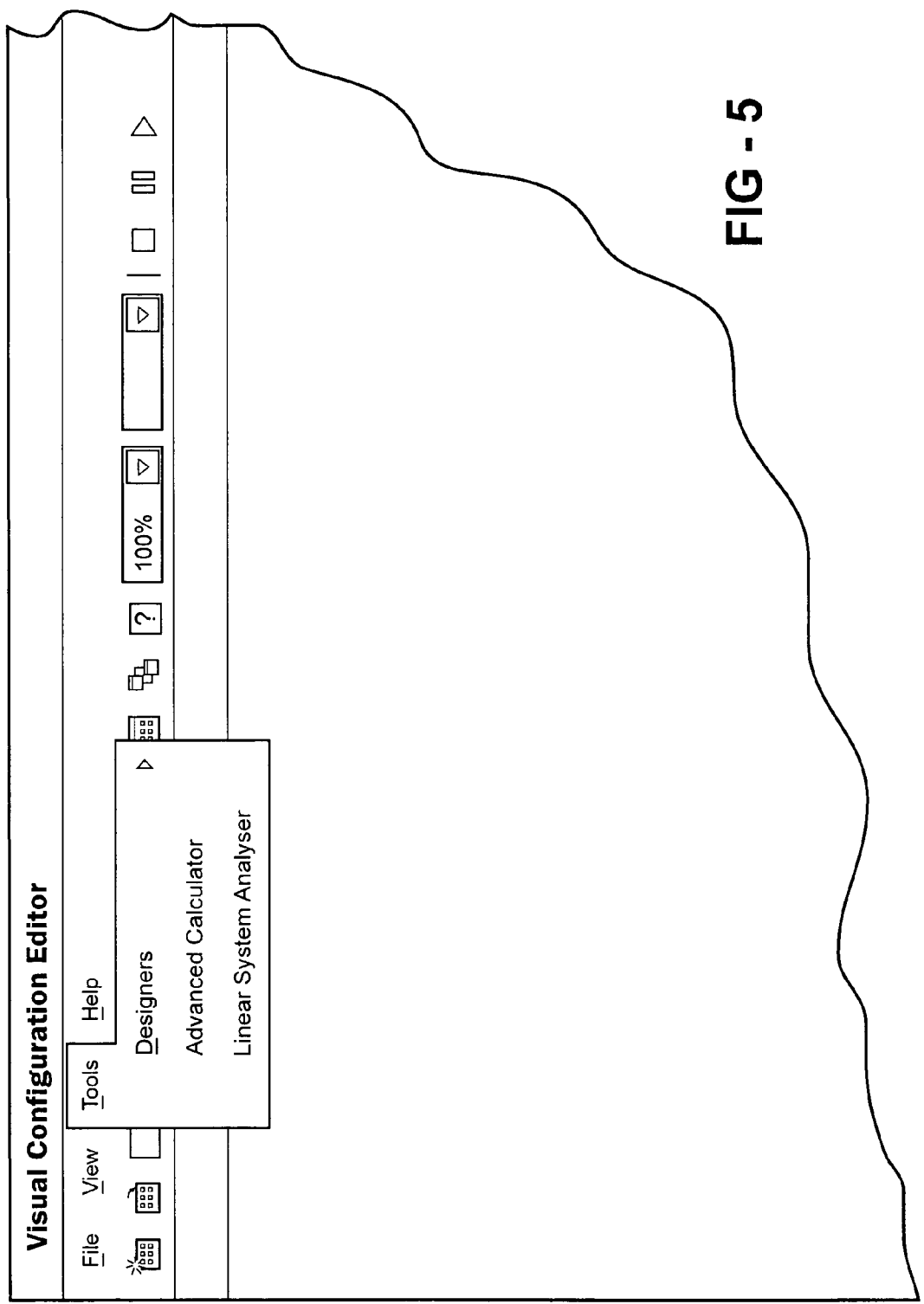
FIG. 5 illustrates a Tools menu of the start up screen.
Figure 6:
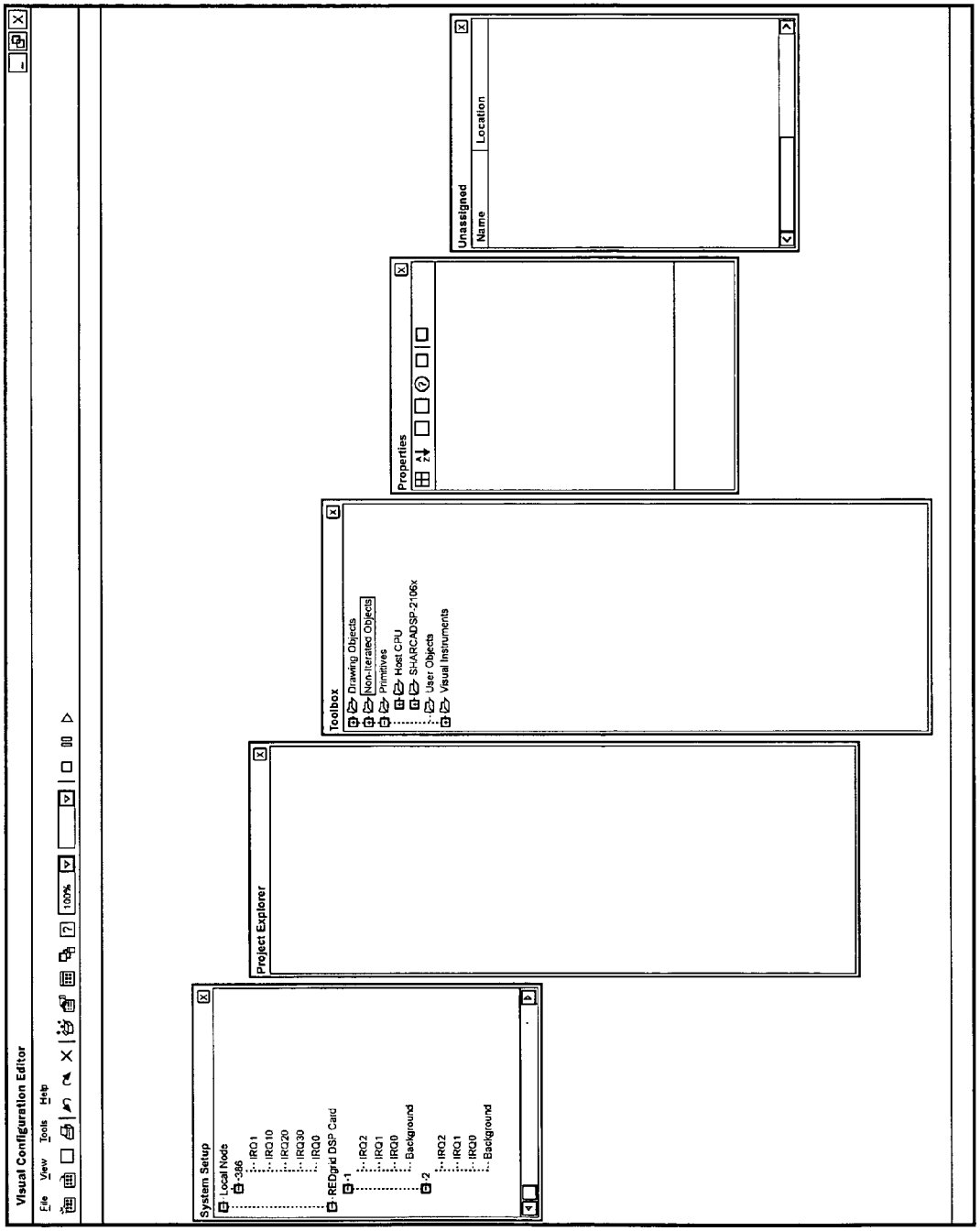
FIG. 6 illustrates a System Setup pane, a Project Explorer pane, a Toolbox pane, a Properties pane, and an Unassigned pane opened on the start up screen.

FIG. 3 illustrates a File menu of the start up screen, which includes commands for creating new projects, opening project files, and saving projects. FIG. 4 illustrates a View menu and FIG. 5 illustrates a Tools menu of the start up screen. The View menu allows the user to selectively open various panes, such as shown in FIG. 6. Referring to FIG. 6, a System Setup pane, a Project Explorer pane, a Toolbox pane, a Properties pane, and an Unassigned pane are opened on the start up screen. The panes may be floating or dockable and are re-sizeable as desired. Each of these panes have specific purposes when the user is creating, modifying, or executing a project, which are discussed in detail below. The Tools menu of FIG. 5, contains high-level software features that are designed to perform specific complex tasks. These software features might be specialized calculation programs to assist the user and the like. Thus, these software features are efficient labor-saving devices.

Figure 7:
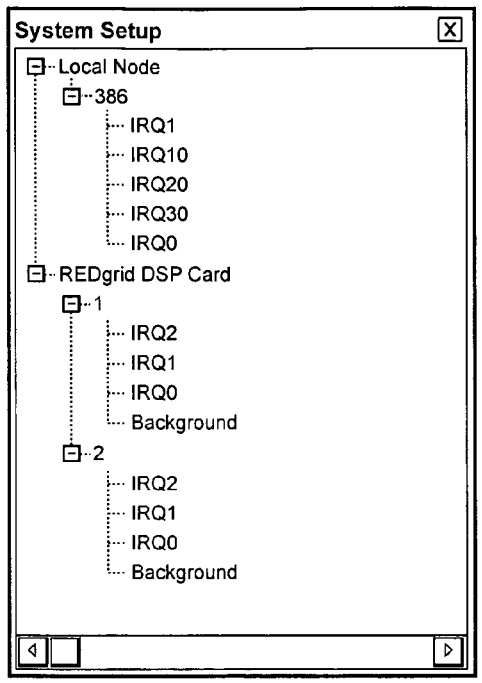
FIG. 7 is a detail of the System Setup pane.

The System Setup pane or processor pane is shown in greater detail in FIG. 7. The System Setup pane shows a tree view of all of the processors that are currently available to the user. The processors are organized under nodes. In this example, there are two nodes available. One node is the Local Node, which is another name for the host node discussed above. In other words, the Local Node is part of the computer. The Local Node includes a PC processor, labeled as 386, with five (5) distinct events identified in the processor pane. As is discussed in greater detail below, the events identified under the PC processor can be separately utilized in the processing system to initiate execution paths. The other node available is the REDgrid DSP Card, which is a specific name for Node 1 discussed above. As mentioned above, REDgrid® is a registered trademark and is only used in this patent application to assist in the illustration of a contemplated embodiment. Node 1 includes two processors, labeled as '1' and '2'. The processors are preferably DSPs and each include three (3) events that can be selected by the user. However, in this specific implementation of the processing system the DSPs are designed such that each of these processors under Node 1 can be utilized only once in the processing system, but this in no way limits the invention where it is possible to implement DSPs such that each event can be selected independently.

The events discussed above differentiate a variety of different execution rates for the processors. In a real-time processing system the user will typically require that an execution path is repeated in a periodic fashion with a particular rate. In other words, the execution path, which is discussed in greater detail below, can be repetitive and continuous. The user can select these parameters based upon the needs of the device being controlled and then selects a processor event and rate accordingly. In addition to the periodic events, there may be events available that can initiate execution in an aperiodic fashion.

Figure 8:
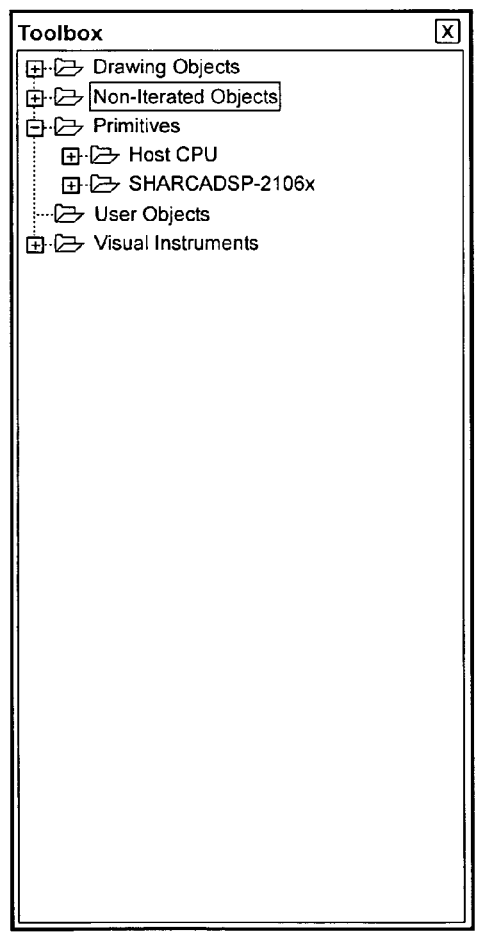
FIG. 8 is a detail of the Toolbox pane.
Figure 9:
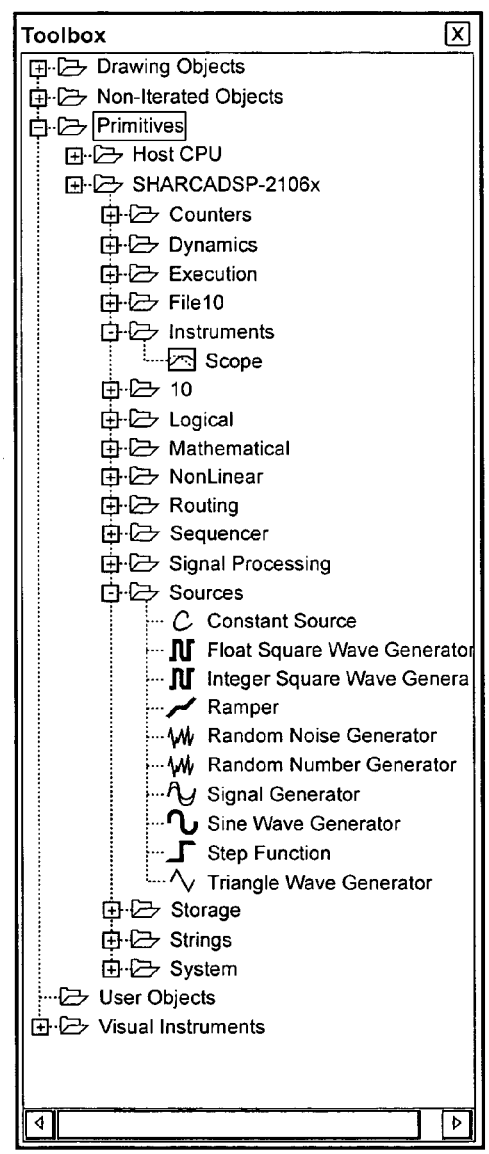
FIG. 9 is further detail of the Toolbox pane.

The Toolbox pane is shown in greater detail in FIGS. 8 and 9. The Toolbox pane can have virtually any number of items as desired by any particular application. Examples of folders can include Drawing Objects, Non-Iterated Objects, Primitives, and Visual Instruments. Drawings Objects are visual elements that assist the user in creating logical, understandable project configurations. The Drawing Objects are generally not executable objects. Visual Instruments will be discussed in greater detail below.

As shown in FIG. 9, the Primitives folder includes a large class of the sub-folders, sub-sub-folders, etc. Within the Primitives folder are a plurality of function objects or primitives. Examples of function objects are shown under the Instrument sub-sub-folder and under the Sources sub-sub-folder. The function objects include basic executable code or commands that have been pre-programmed such that each of the function objects can perform a particular function. The function objects, as discussed below, are basic elements or building blocks that are assembled and connected to perform more complex tasks. The function objects can be written to specifically run on a processor or family of processors. In the example of FIG. 8, there are two classes of function objects, the Host and the SHARC. The Host function objects are designed to only execute on the PC or Host processor. The SHARC function objects are designed to only execute on SHARC DSPs. The User Objects, which is a collection of function objects, is discussed in greater detail below.

Figure 10:
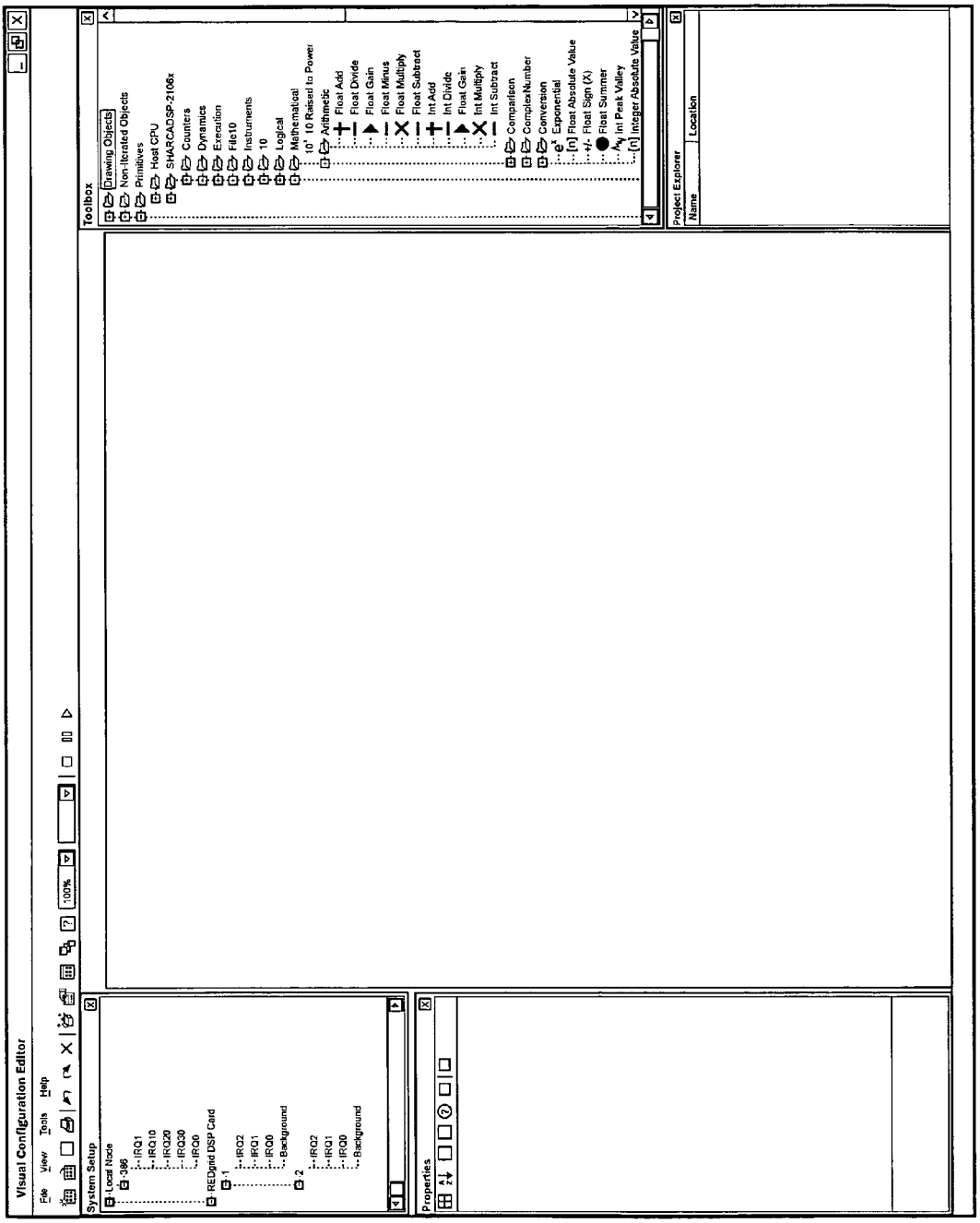
FIG. 10 illustrates the System Setup pane, the Project Explorer pane, the Toolbox pane, and the Properties pane opened on the start up screen and positioned along the edges of the start up screen.

FIG. 10 illustrates the System Setup pane, the Project Explorer pane, the Toolbox pane, and the Properties pane opened on the start up screen and docked along the edges of the start up screen. As is clearly shown, the Properties pane and Project Explorer pane are currently empty. Also, the Unassigned pane or temporary pane, which is also currently empty, is hidden from view.

Figure 11:
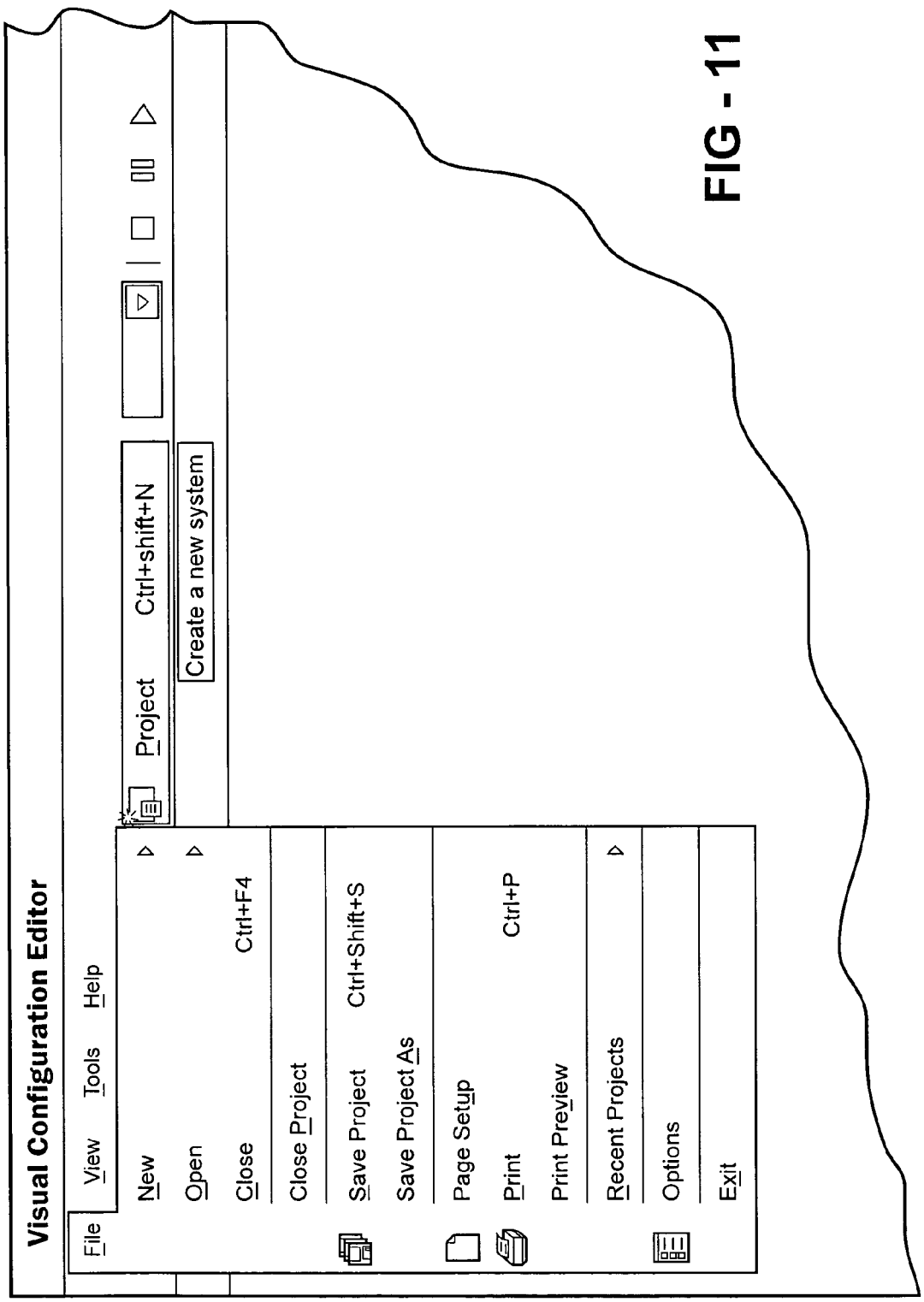
FIG. 11 illustrates the File menu and the selection of the Project command.
Figure 12:
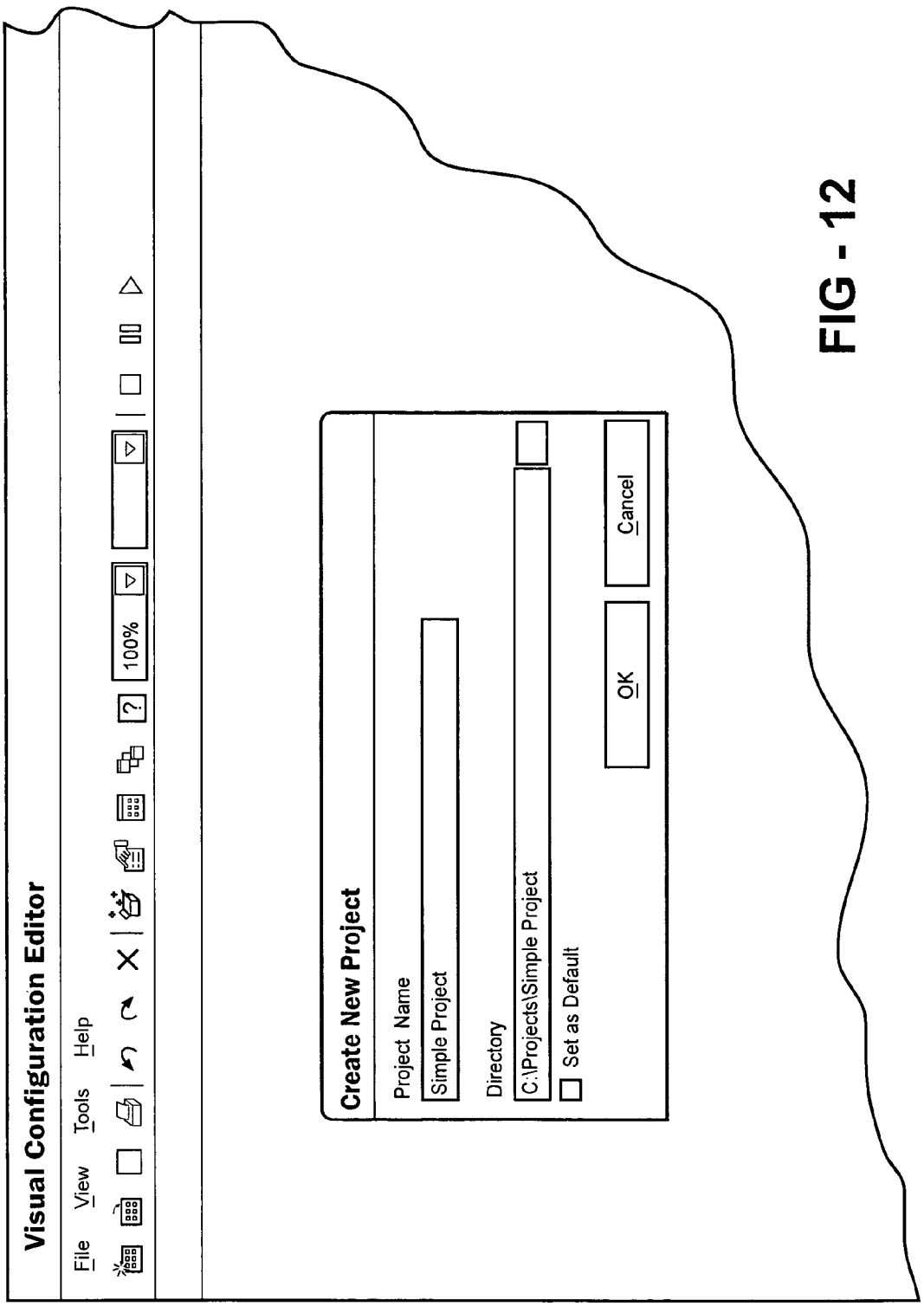
FIG. 12 illustrates a Create New Project window within the start up screen.
Figure 13:
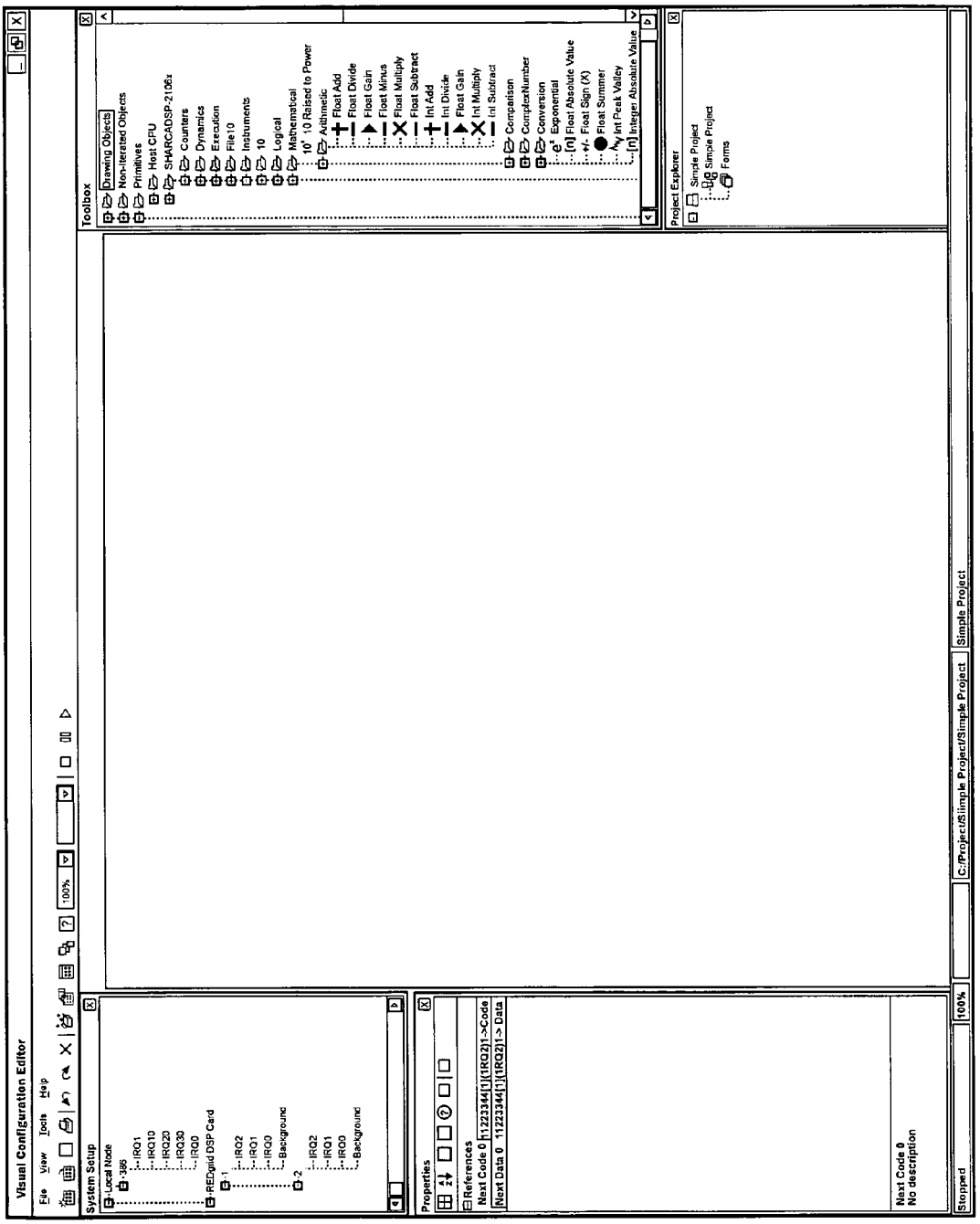
FIG. 13 illustrates a blank configuration canvas with the System Setup pane, the Project Explorer pane, the Toolbox pane, and the Properties pane opened along the edges thereof.

Turning to FIGS. 11-16, additional basic components used in the programming methods as well as an initiation of a project are shown. As shown in FIG. 11, the user starts by opening the File menu and selecting the New/Project commands. FIG. 12 illustrates a Create New Project window within the start up screen and the user assigns a name to the project, such as 'Simple Project'. As shown in FIG. 13, a blank configuration canvas now appears with the System Setup pane, the Project Explorer pane, the Toolbox pane, and the Properties pane remaining opened along the edges thereof. The Project Explorer now illustrates the beginning of a tree, which will track the project on the canvas.

Figure 14:
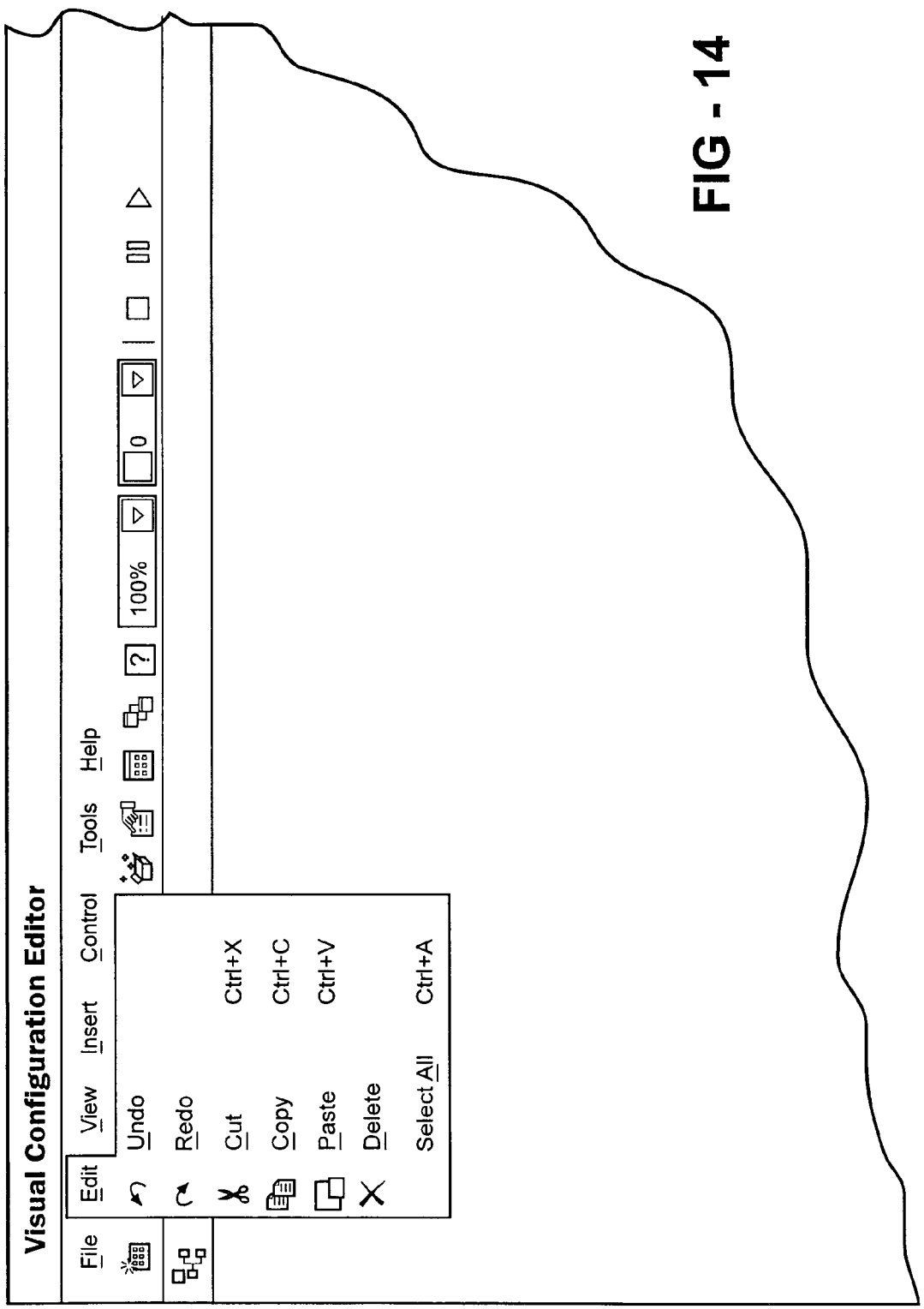
FIG. 14 illustrates an Edit menu of the configuration canvas.
Figure 15:
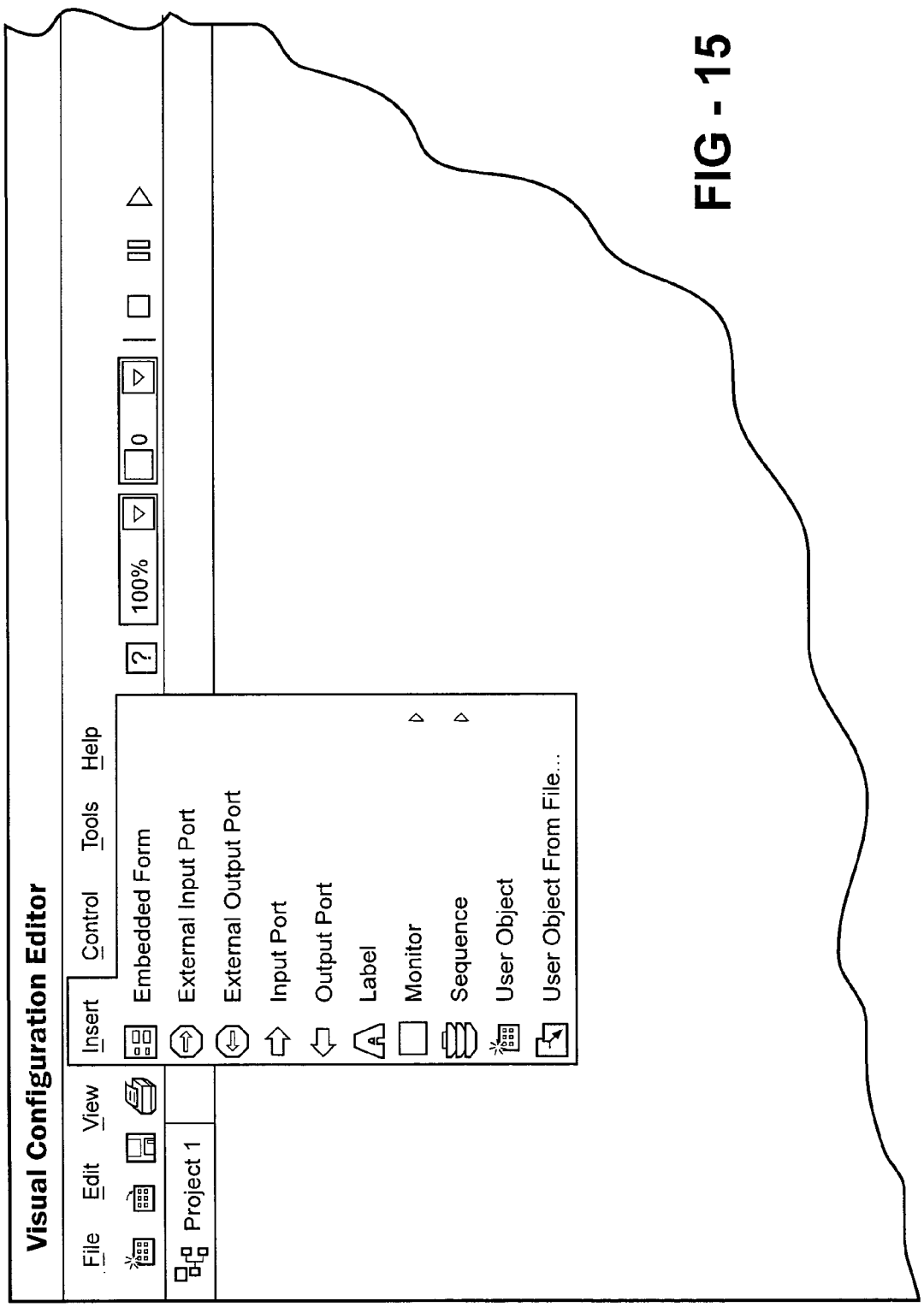
FIG. 15 illustrates an Insert menu of the configuration canvas.
Figure 16:
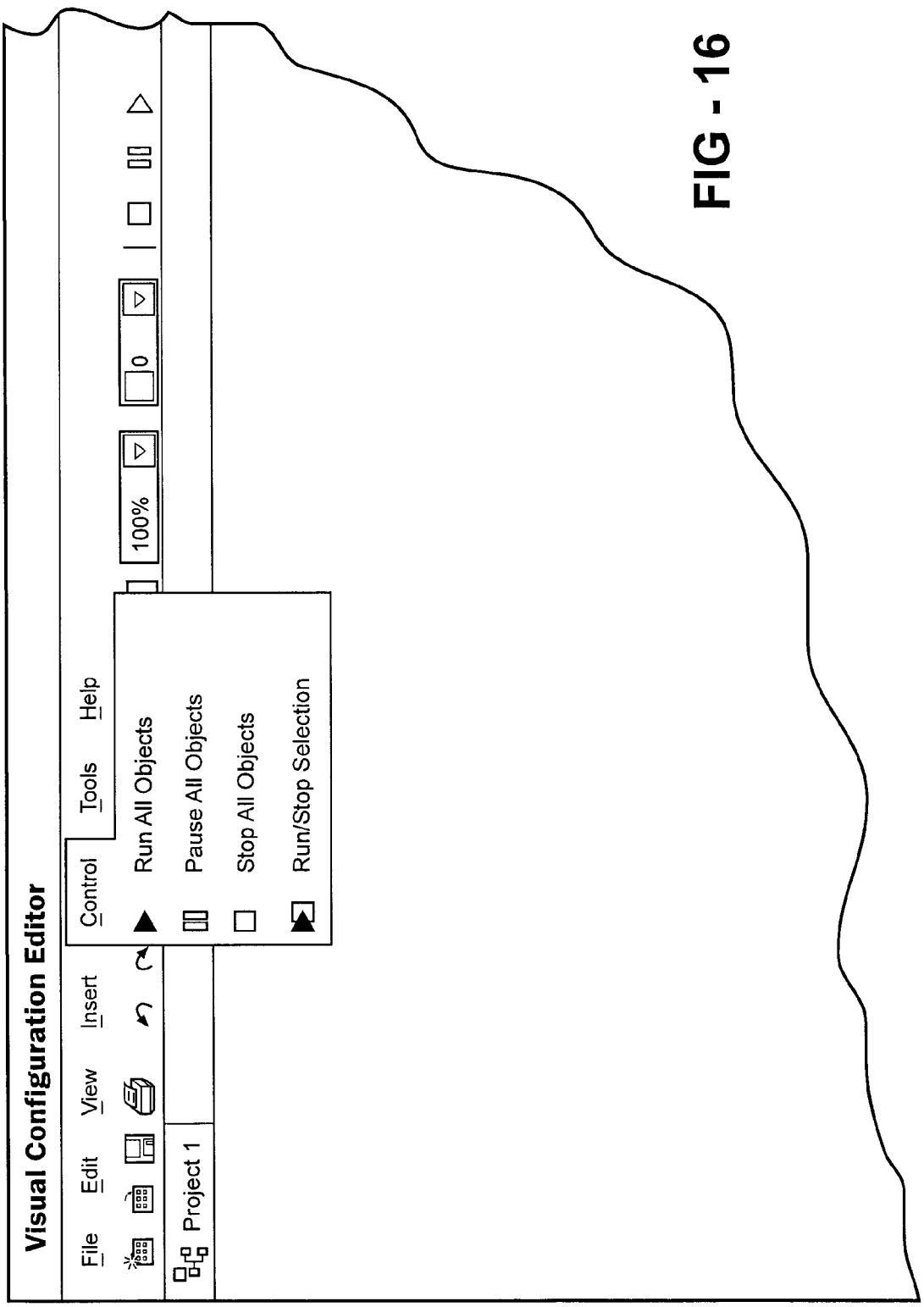
FIG. 16 illustrates a Control menu of the configuration canvas.

Once a project is initiated, three new menu choices appear. An Edit menu of the configuration canvas, as shown in FIG. 14, contains familiar windows edit controls. As shown in FIG. 15, an Insert menu of the configuration canvas provides a user with a list of drawing objects that may be inserted into the configuration canvas. The Drawing Objects folder discussed above in the Toolbox pane contains the same list of drawing objects. FIG. 16 illustrates a Control menu of the configuration canvas, which contains selections for controlling execution of a completed project. To assist the user, the execution controls are also located on a toolbar of the screen.

Figure 17:
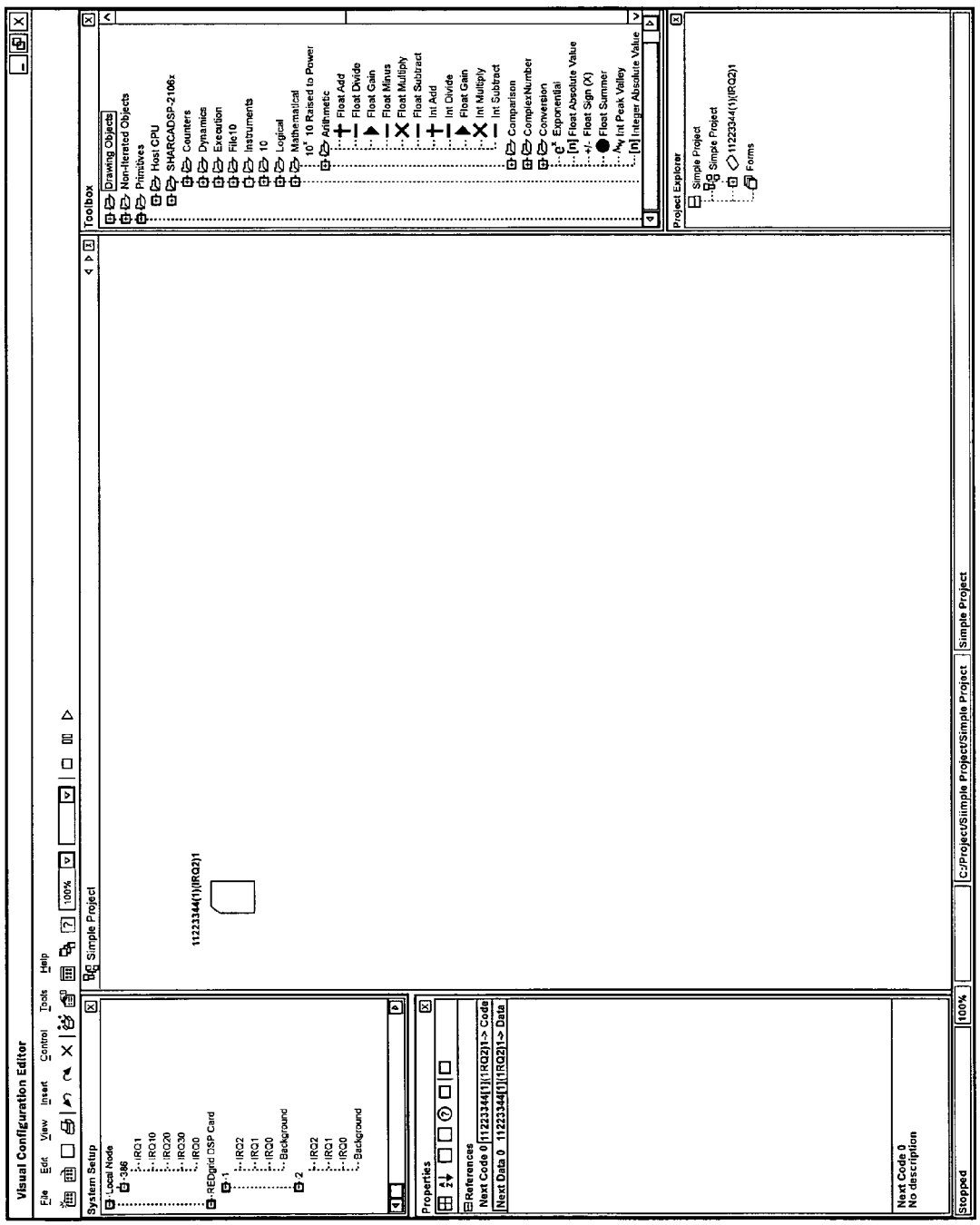
FIG. 17 illustrates a typical first step in creating a processing configuration wherein a processor icon is disposed on the configuration canvas.

Turning to FIGS. 17-31, a method of programming a basic project, such as the 'Simple Project' initiated above, for the processing system, as well as a number of other features, is now discussed in detail. As shown in FIG. 17, a processor icon associated with one of the processors is placed onto the canvas. Specifically, one of the events from the processor pane is moved by dragging and dropping the selection onto the canvas to create the processor icon on the canvas. In this example, the number '1' DSP under the REDgrid DSP Card node is moved onto the canvas. The user has specifically selected the IRQ2 event and this event is identified in the labeling of the processor. The IRQ2 event is a repetitive event that executes the execution paths at 20,480 times per second. All of the events in this processor are now shaded to indicate that this processor is no longer available for use in this project. It should be noted again that the unavailability of all events once one has been selected is a property of a specific implementation of the processing system. Further, it is not necessary to begin a project with a processor and the user may follow any desired sequence in building a processing configuration.

Figure 18:
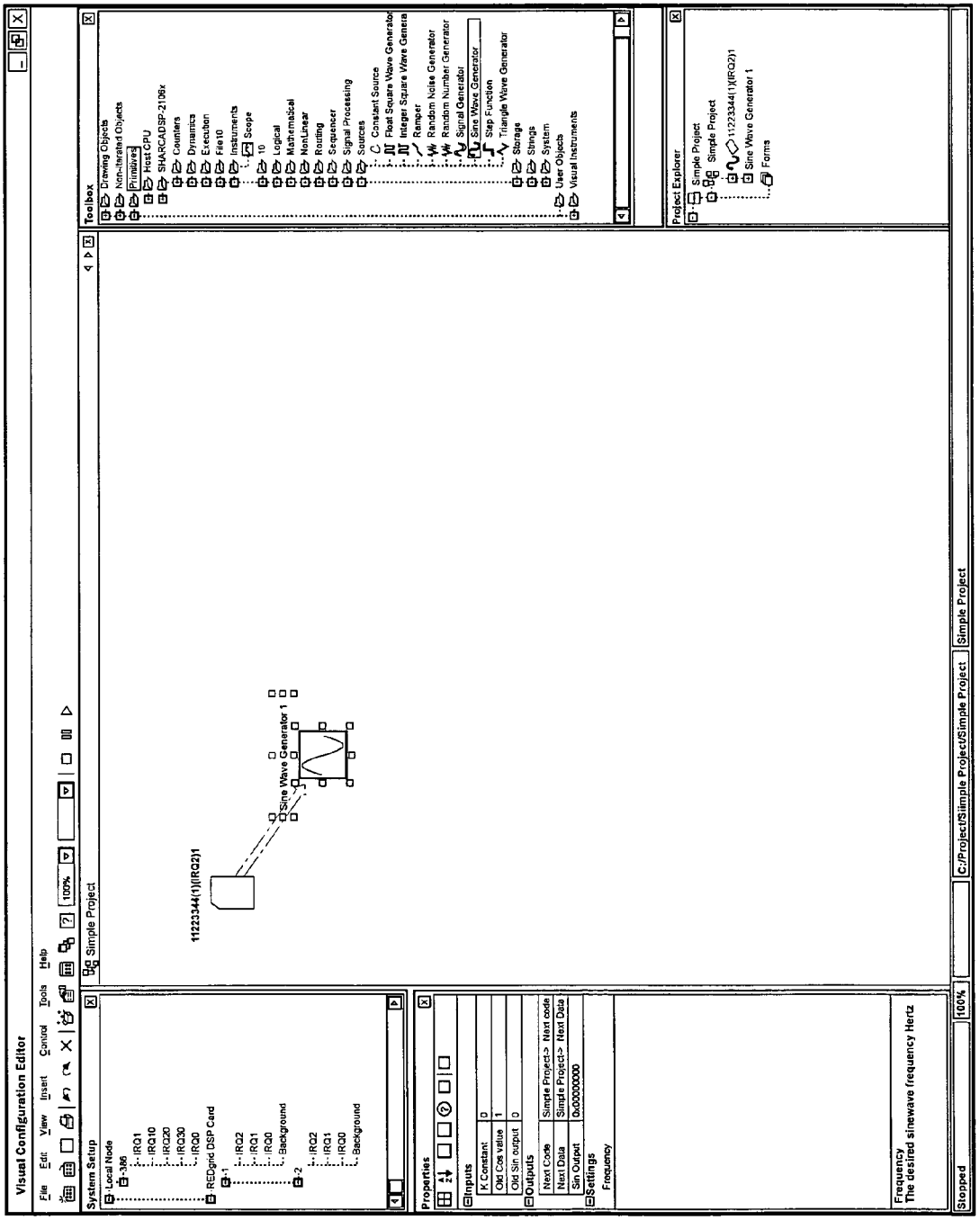
FIG. 18 illustrates a next step in the processing configuration by placing an object icon in the form of a Sine Wave Generator on the configuration canvas.

As shown in FIG. 18, the user browses the Toolbox pane for a desired function object and then places a first object icon associated with a first function object onto the canvas at a first location. Specifically, the associated symbol from the Toolbox pane is copied onto the canvas, which defines the first object icon. In this example, the first object icon is associated with a Sine Wave Generator function object and was dragged and dropped onto the canvas from the Sine Wave Generator symbol under the Sources folder in the Toolbox pane. The Project Explorer pane automatically indicates the Sine Wave Generator in the tree and will be automatically updated each time the project is modified. The Sine Wave Generator is highlighted and the Properties pane becomes populated with various information relating to the Sine Wave Generator.

Figure 19:
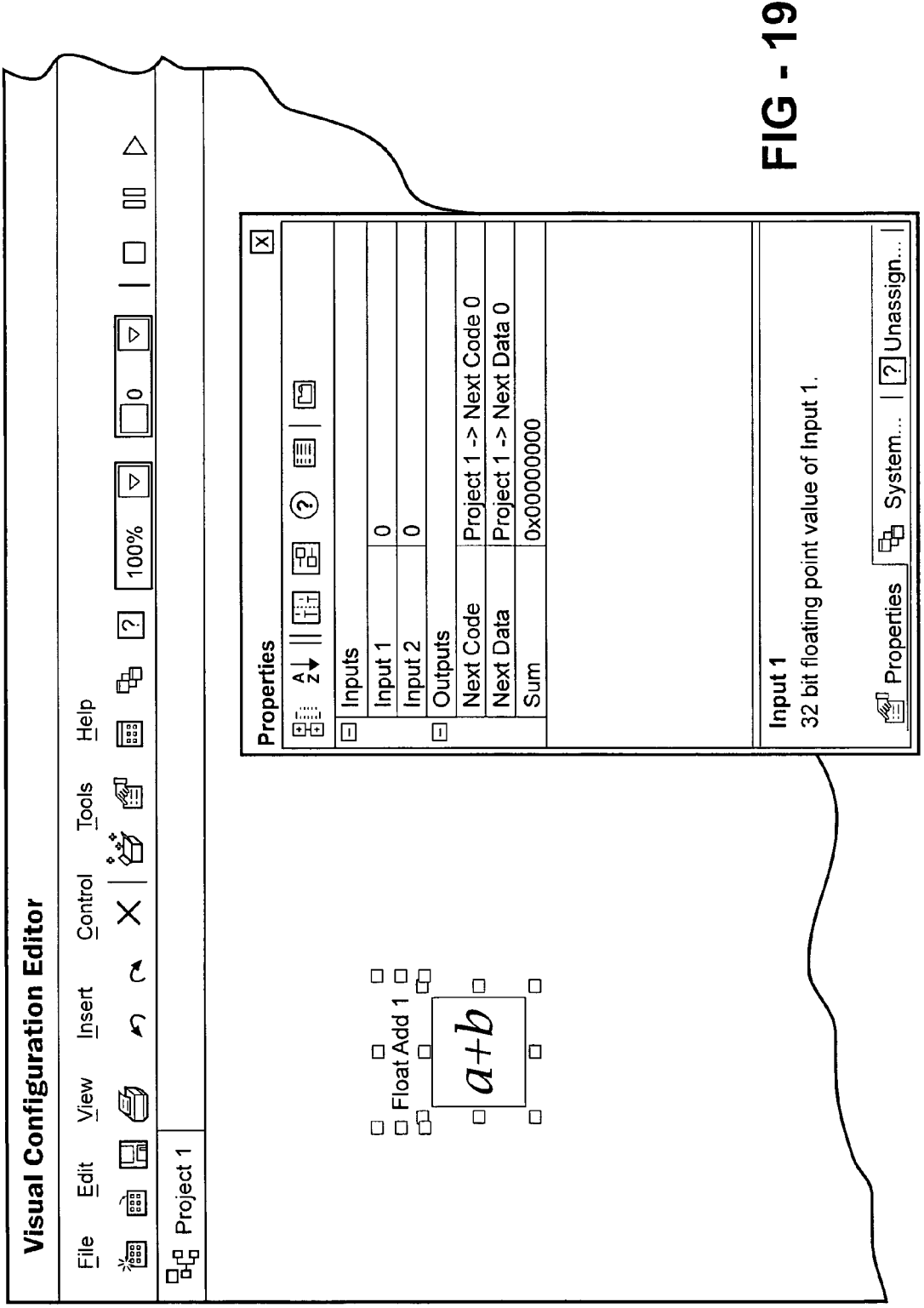
FIG. 19 is a detail of the Properties pane correlating to a Float Add function object.
Figure 20:
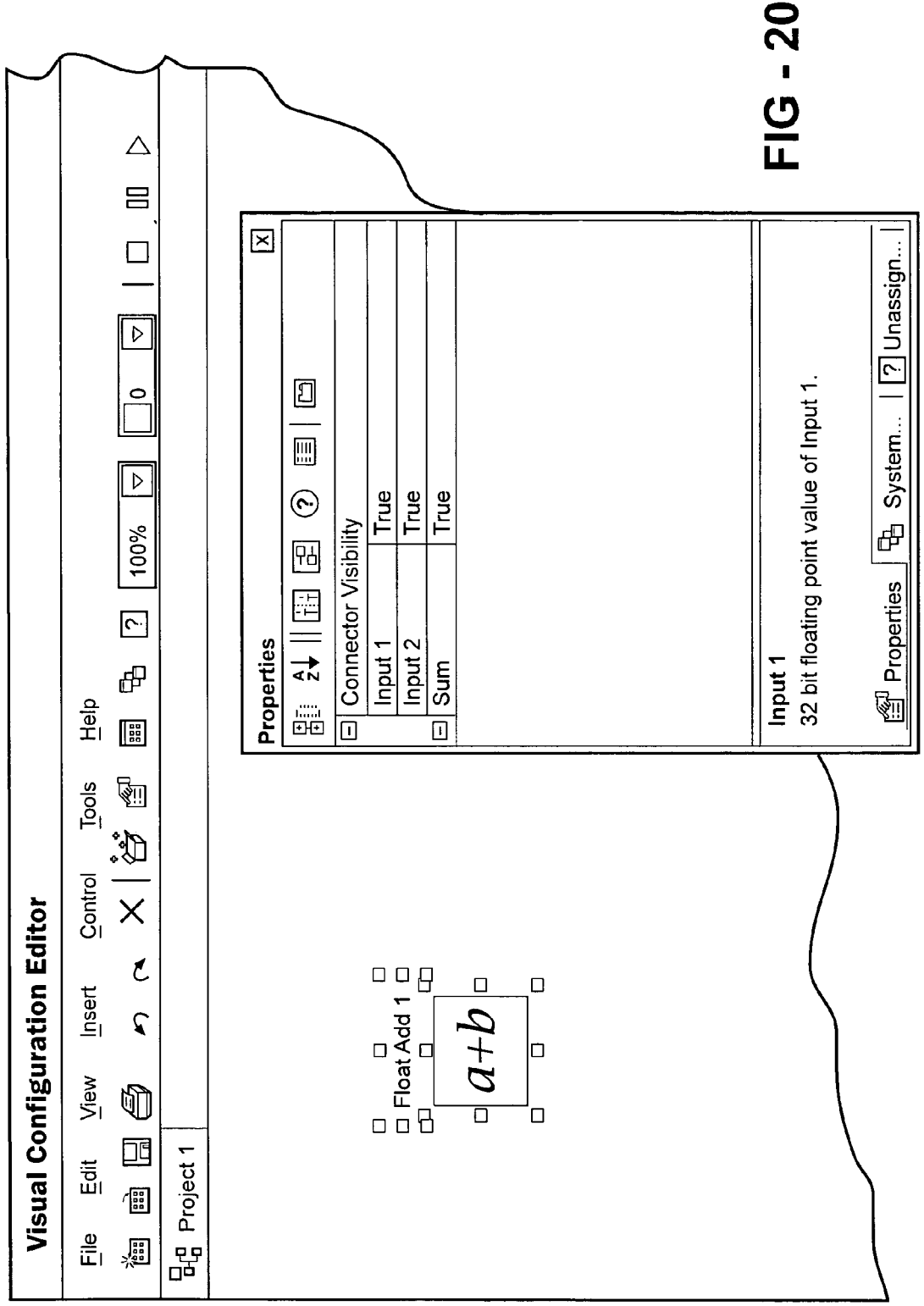
FIG. 20 is another detail of the Properties pane.
Figure 21:
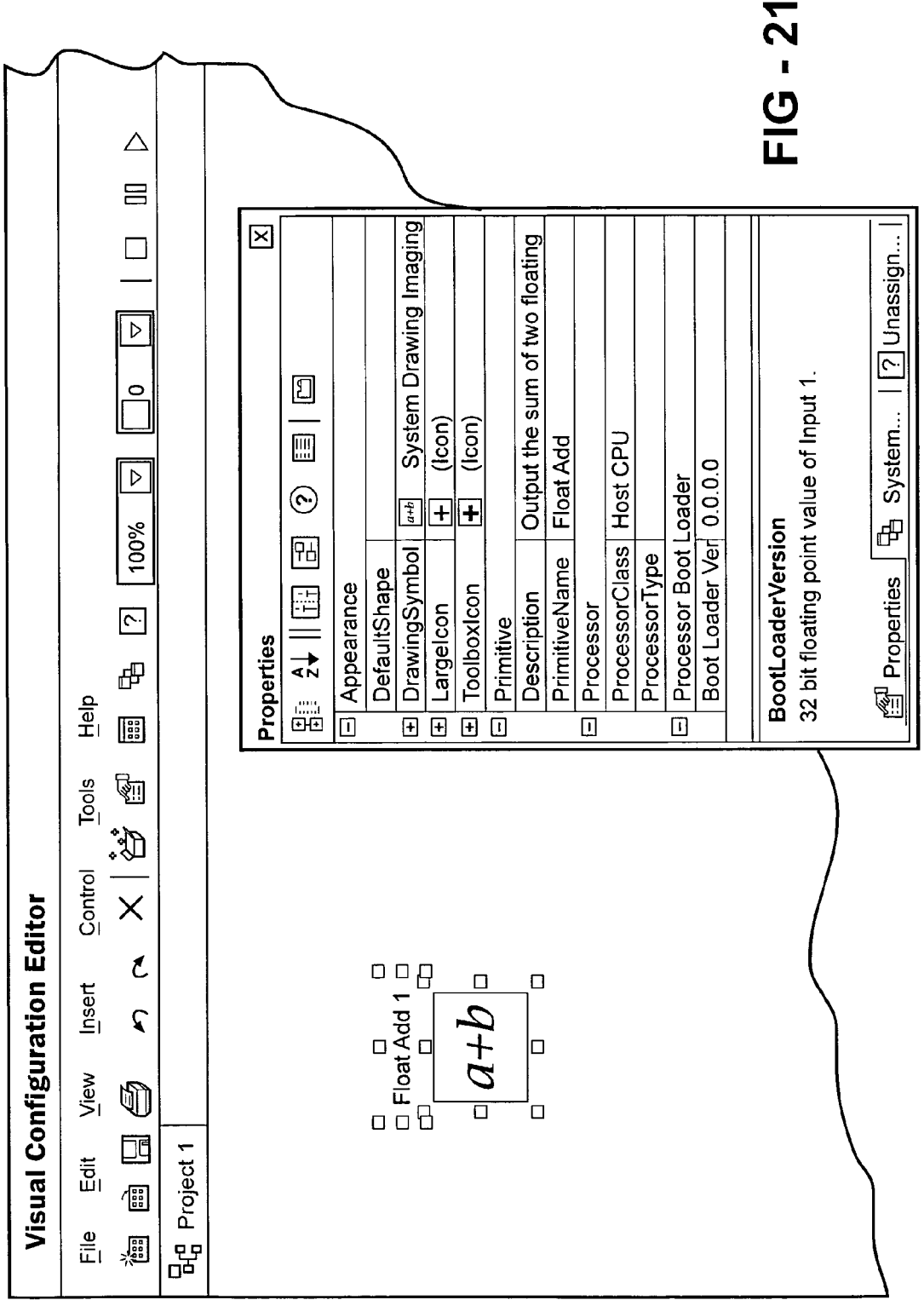
FIG. 21 is yet another detail of the Properties pane.
Figure 22:
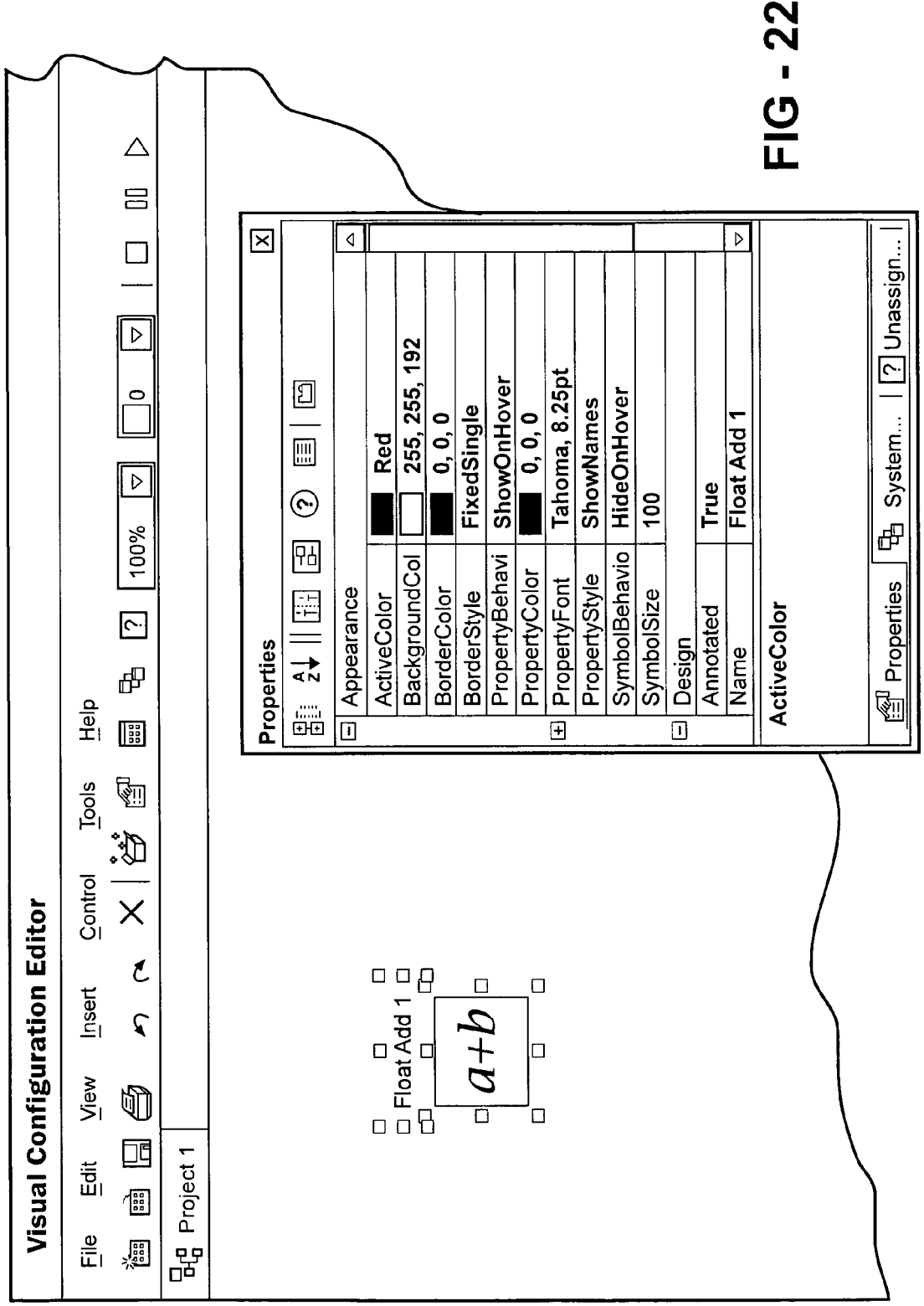
FIG. 22 is another detail of the Properties pane.

Referring to FIGS. 19-22, the Properties pane is illustrated in greater detail. In this example, a Float Add function object is placed onto the canvas and highlighted. The Properties pane is shown floating next to this function object. The Properties pane is used to inspect and modify virtually all of the properties of all of the function objects in the project. For example, properties of data signals, connectors (data ports), and the visual appearance of the function object can be inspected and/or modified. In the Example of FIG. 19, the user can enter values for Input 1 and Input 2, which allows the user to set initial conditions for the input signals. The Properties pane also has tabs in a mini-toolbar for selecting different views, such as Signals, Connections, Info, and Visuals. The Signals view is shown in FIG. 19. The Connections view is shown in FIG. 20 wherein the user can choose to display or hide any data connectors. This is useful for highly complex function objects that have many inputs and outputs available to the user, but only a few are needed, thereby removing visual clutter. The Info view is shown in FIG. 21 and the Visuals view is shown in FIG. 22. In the Visuals view, every aspect of how the graphical symbol appears and behaves can be inspected and modified.

Figure 23:
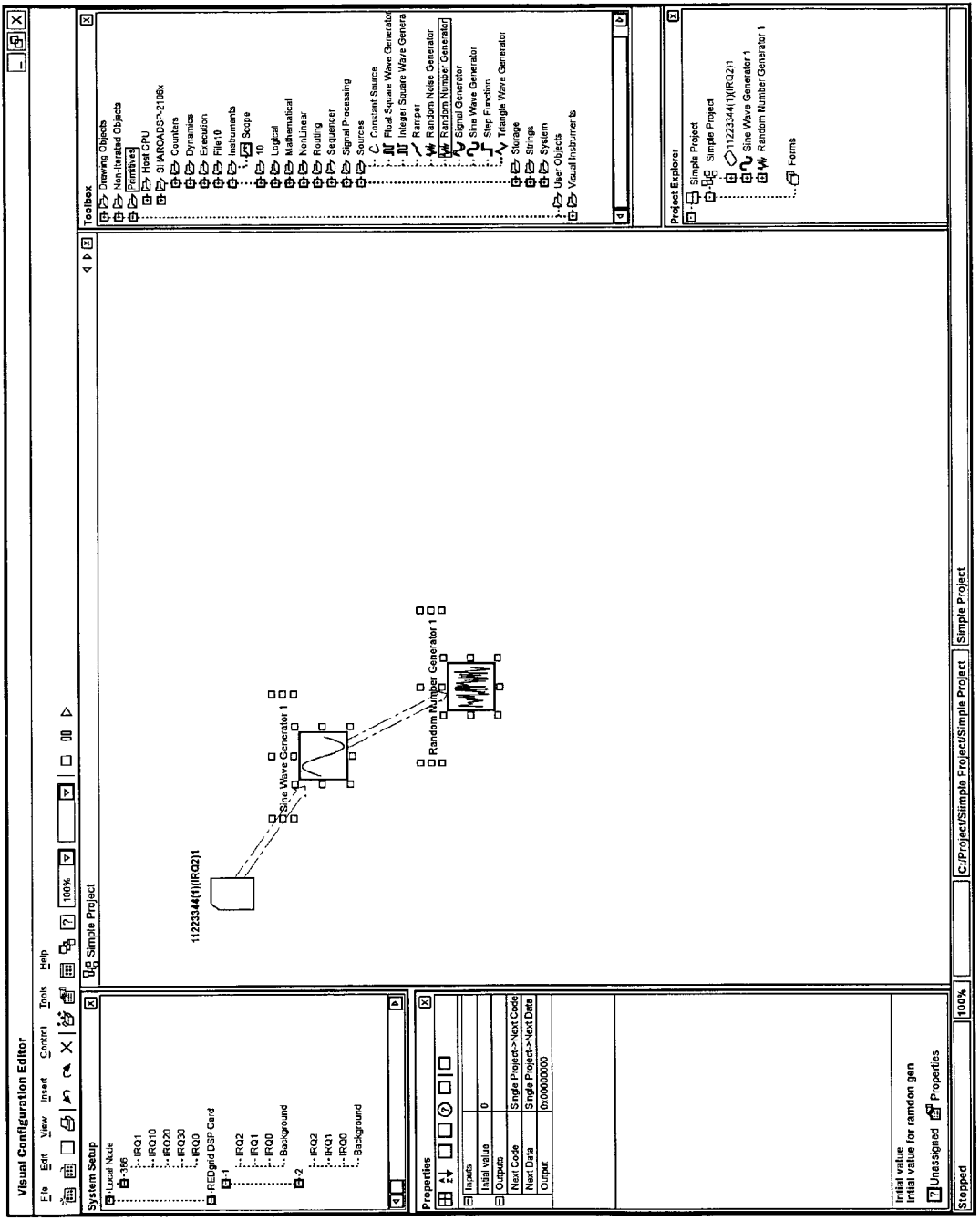
FIG. 23 illustrates the step of placing another object icon in the form of a Random Number Generator on the configuration canvas.
Figure 24:
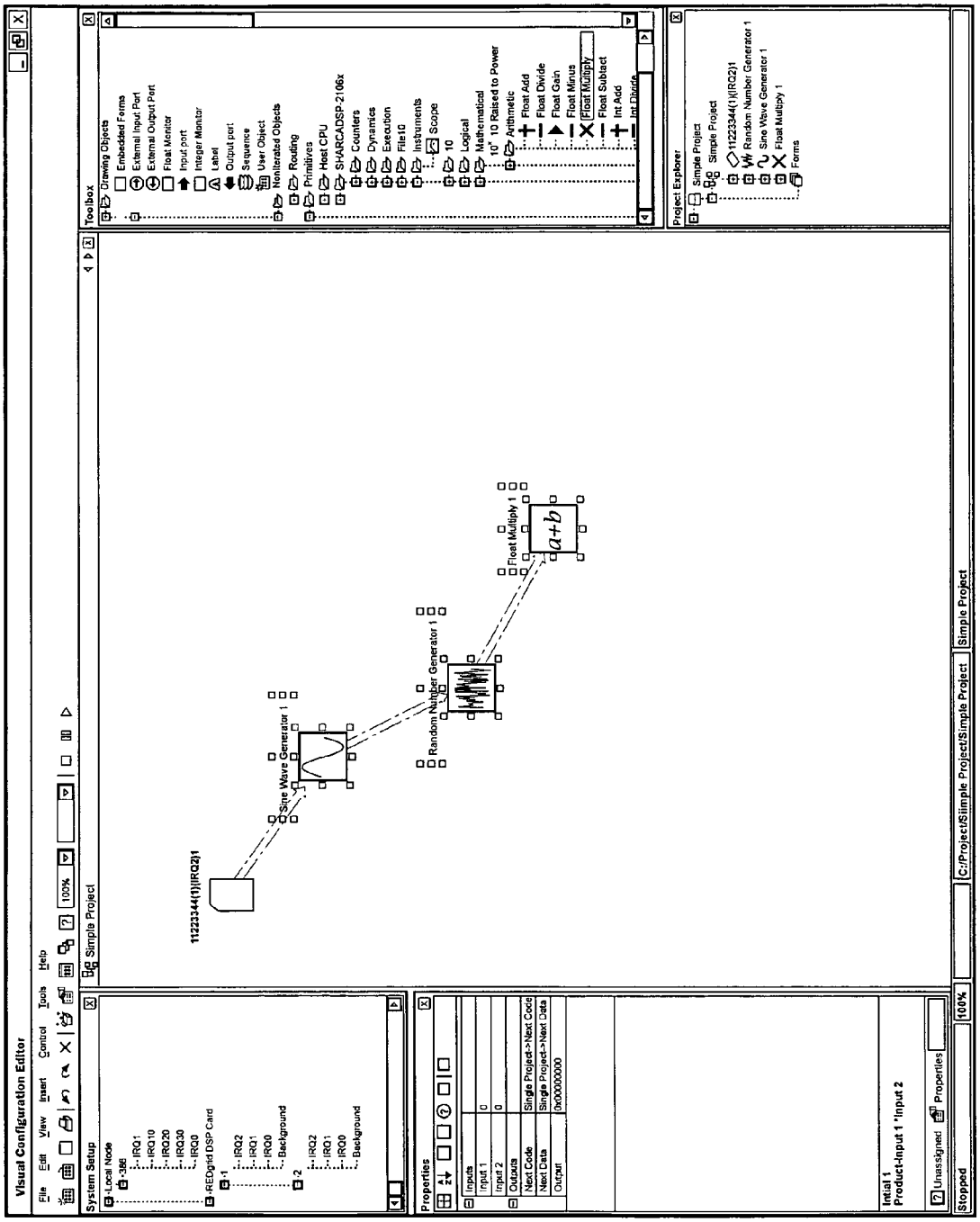
FIG. 24 illustrates the step of placing yet another object icon in the form of a Float Multiply on the configuration canvas.
Figure 25:
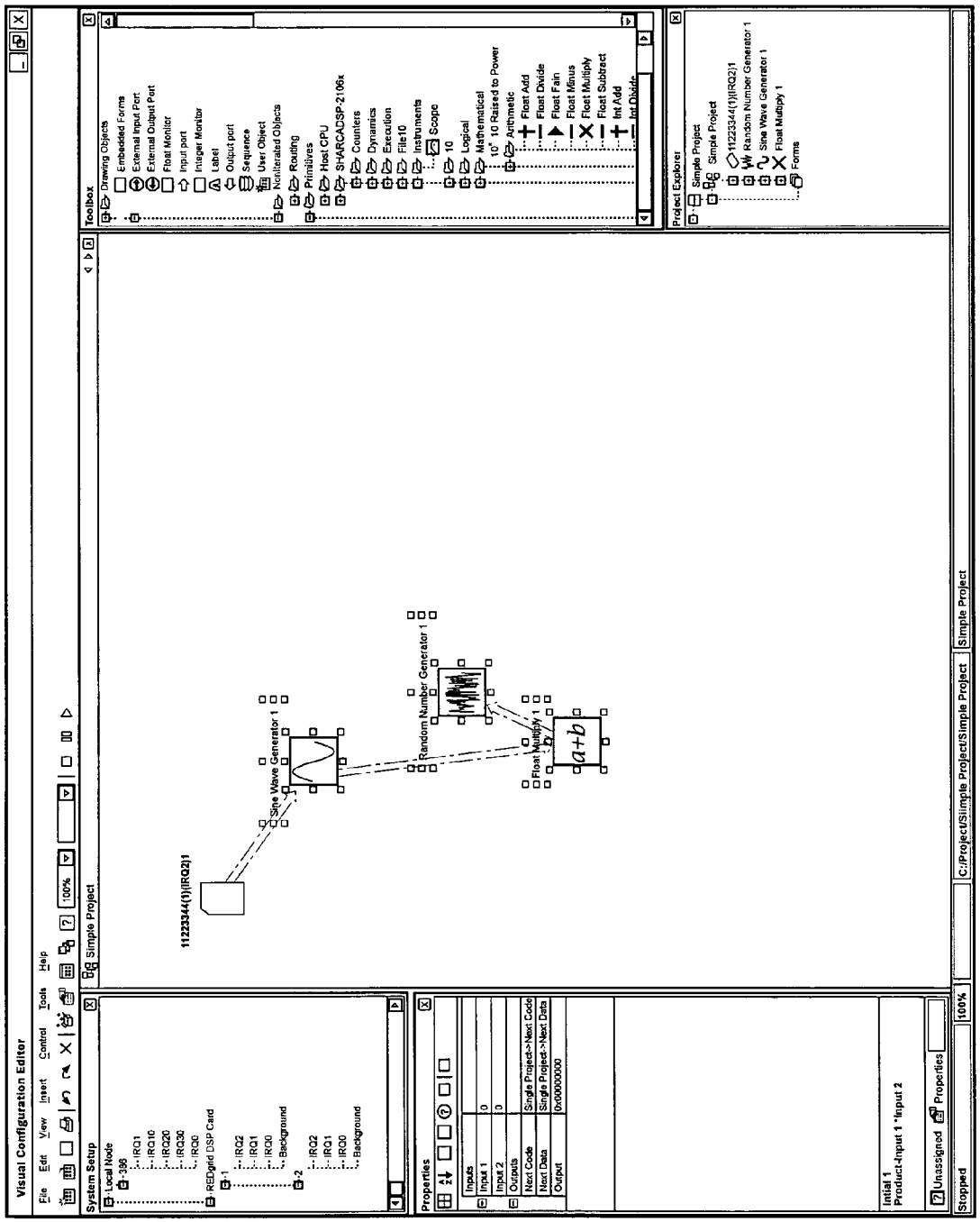
FIG. 25 illustrates an alternative placement of the Float Multiply icon on the configuration canvas.

Returning back to the basic project being created, FIG. 23 illustrates a second object icon associated with a second function object being placed onto the canvas at a second location. The second location of the second icon is different than the first location of the first icon. In this example, the second icon is associated with a Random Number Generator function object. As shown in FIGS. 24 and 25, a third object icon associated with a third function object is next placed onto the canvas at a third location. Again, the third location is different than the first and second locations. In this example, the third icon is associated with a Float Multiply function object.

One feature of the subject invention relates to the routing and re-routing of processing threads or execution paths as the icons and processors are placed on the canvas. As shown in FIGS. 24 and 25, a processing thread or execution path is automatically routed from one of the first and second object icons to the third object icon based on an orientation of the third location of the third object icon relative to the first location of the first object icon and the second location of the second object icon on the canvas. Stated another way, a processing thread or execution path is automatically routed from one of the first object icon and the third object icon to the second object icon based on the orientation of the third location of the third object icon relative to the first location of the first object icon and the second location of the second object icon on the canvas.

In the example of FIG. 24, a processing thread or execution path is routed from the second object icon to the third object icon since the second location of the second object icon is between the first location of the first object icon and the third location of the third object icon as viewed from left to right on the canvas. A processing thread or execution path is also automatically routed from the first object icon at the first location to the second object icon at the second location when the second object icon is placed on the canvas. In other words, as shown in FIG. 23, the processing thread or execution path is immediately and automatically routed from the first object icon to the second object icon based on the relative orientation of the second icon.

Alternatively, as shown in FIG. 25, a processing thread or execution path could be automatically routed from the first object icon to the third object icon since the third location of the third object icon is between the first location of the first object icon and the second location of the second object icon as viewed from left to right on the canvas. In this alternative example, the processing thread or execution path from the first object icon is automatically and seamlessly re-routed, from what is shown in FIG. 23, in response to the orientation of the third object icon such that the processing thread or execution path is re-routed to the third object icon. Further, a processing thread or execution path would be automatically routed from the third object icon at the third location to the second object icon at the second location in response to the orientation of the third object icon. Hence, in this alternative example, the processing thread or execution path would be routed from the first icon, to the third icon, and then to the second icon.

A processing thread or execution path is also automatically routed from the processor icon to one of the first, second, and third object icons based on the orientations of the icons. The processing thread or execution path from the processor icon to one of the first, second, and third object icons is automatically routed based on a left most position of the first, second, and third object icons as viewed from left to right on the canvas. In the example, as shown in FIGS. 17 and 18, the processor is first placed on the canvas and then the first icon is placed on the canvas. The processing thread or execution path, as shown in FIG. 18, is automatically routed to the first icon because this first icon is in the left most position. It should be appreciated that there is no requirement that the processor be placed on the canvas first and further there is no requirement that the processor be located along the left position of the canvas.

The processing threads or execution paths can be identified by colored arrows or uniquely configured arrows. As set forth in greater detail below, there may be a number of different processing threads or execution paths routed from different processors to different configured groups of the object icons. In these types of multiprocessing configurations, it is desirable to have differently colored or differently configured arrows to identify different processing configurations routed from different processors. The processing thread or execution path that is currently being reviewed or modified is identified on the toolbar. For descriptive purposes only, the subsequent discussion regarding the routing and re-routing of processing threads or execution paths will use the term execution path.

Comparing FIGS. 24 and 25, the dynamic nature of the subject invention is illustrated. The object icons could initially be placed onto the canvas in the orientations shown in FIG. 24. Then one of the object icons (the third object icon in this example) can be moved to a different location. In the example of FIG. 25, the Float Multiply (third object icon) is moved to a position between the first and second icons. As discussed above, the execution paths are automatically and seamlessly re-routed based on the moved orientation of the third object icon relative to the other icons on the canvas. The generation of the execution paths and re-drawing process is performed in real time and continues while the icon is being dragged from one orientation to another.

Figure 26:
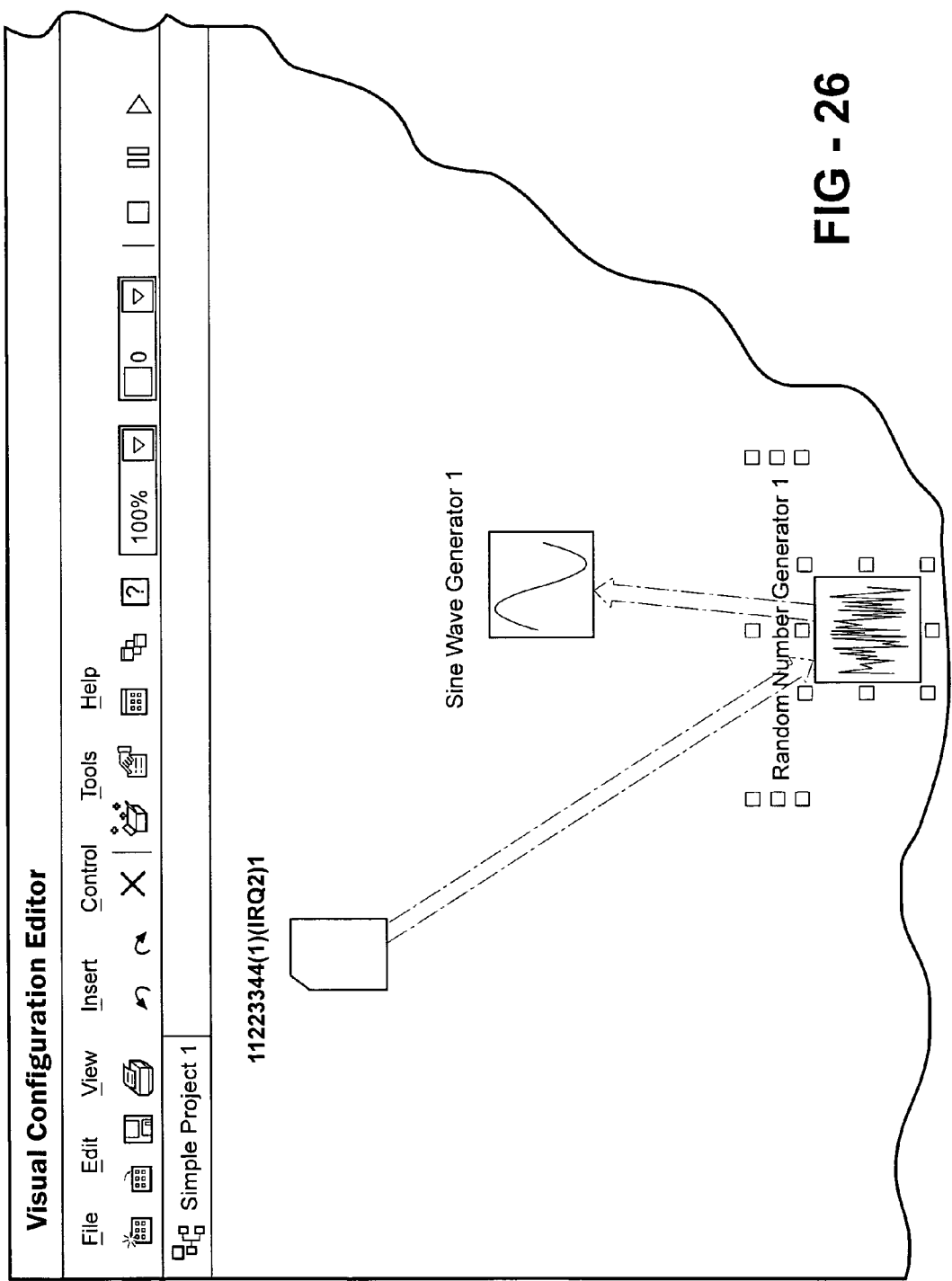
FIG. 26 illustrates the movement of the Random Number Generator icon relative to the Sine Wave Generator icon.

Comparing FIGS. 24 and 26, another example of the dynamic nature of the subject invention is shown. The processor and object icons could initially be placed onto the canvas in the orientations shown in FIG. 24. The Random Number Generator (second object icon) could then be moved to a position between the processor the first object icon such as shown in FIG. 26. The second object icon is now the left most icon such that the execution path from the processor is automatically and seamlessly re-routed to the second object icon (see FIG. 26). In response, the remaining execution paths are also re-routed such that the execution paths now route from the processor to the second object icon, to the first object icon, and to the third object icon as shown in FIG. 27.

Figure 27:
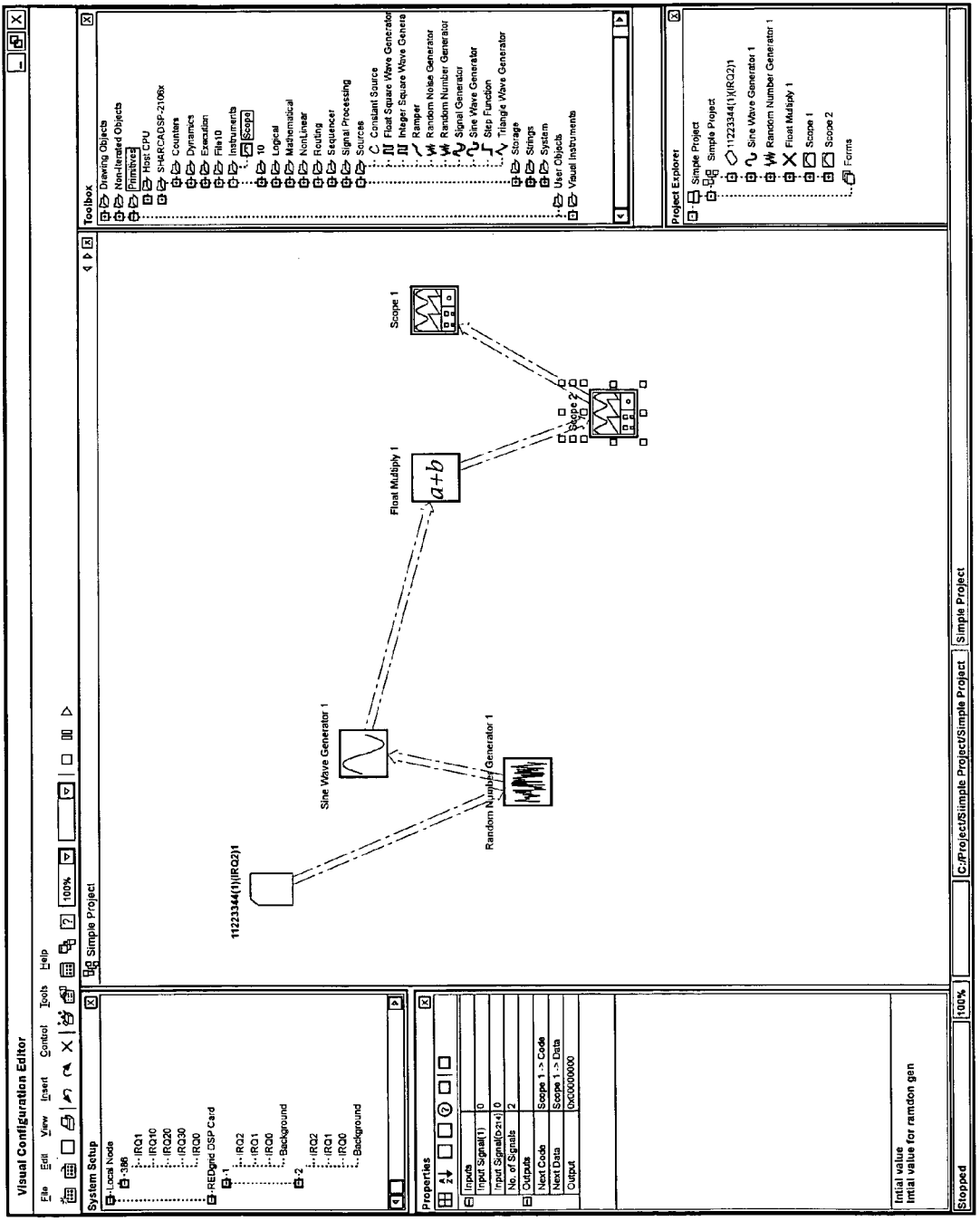
FIG. 27 illustrates a partially completed processing configuration on the configuration canvas with all of the execution paths being routed.

As also shown in FIG. 27, a fourth object icon associated with a fourth function object is placed onto the canvas at a fourth location, with the fourth location being different than the first, second, and third locations. In this example, the fourth icon is associated with a Scope function object. An execution path is also automatically routed from the third object icon at the third location to the fourth object icon at the fourth location when the fourth object icon is placed on the canvas. It should be appreciated there can be any number of additional icons placed onto the canvas that are associated with the same or different function objects. In this example, there is one additional icon, which is also associated with a Scope, placed on the canvas.

Figure 27A:
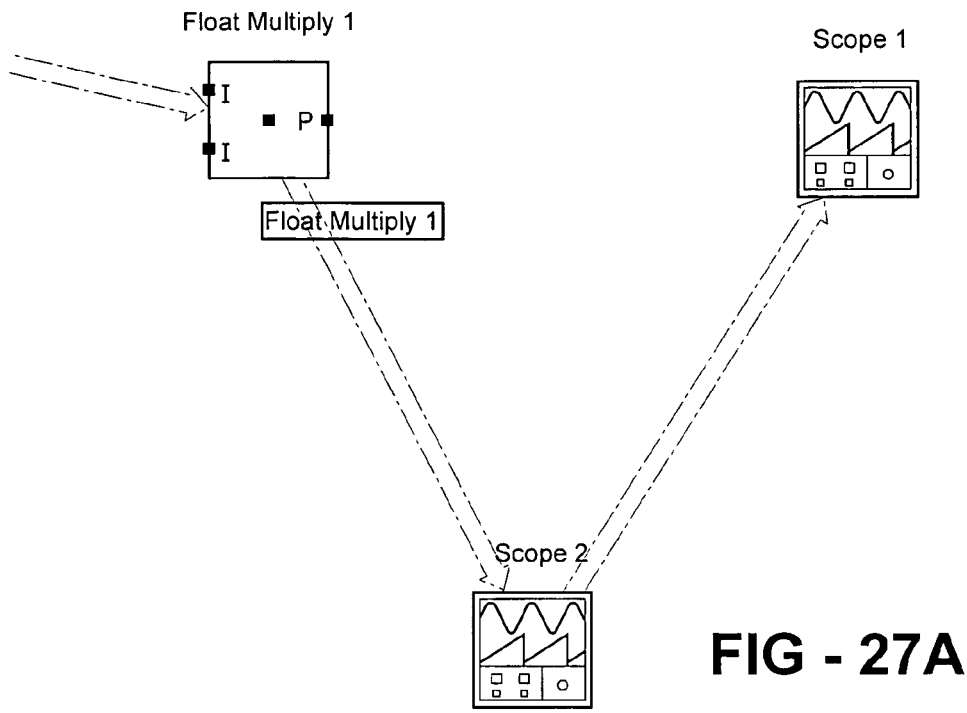
FIG. 27A is a detail of some of the object icons on the configuration canvas of FIG. 27 illustrating a text descriptor for the Float Multiply icon.

Each of the function objects and associated object icons include at least one input and/or at least one output. The inputs and outputs are designed as data ports for receiving and transmitting data. FIG. 27A illustrates a Float Multiply icon having two inputs and a single output. It should be appreciated that the function objects and object icons can have any suitable number of inputs and/or outputs as desired.

Figure 27B:
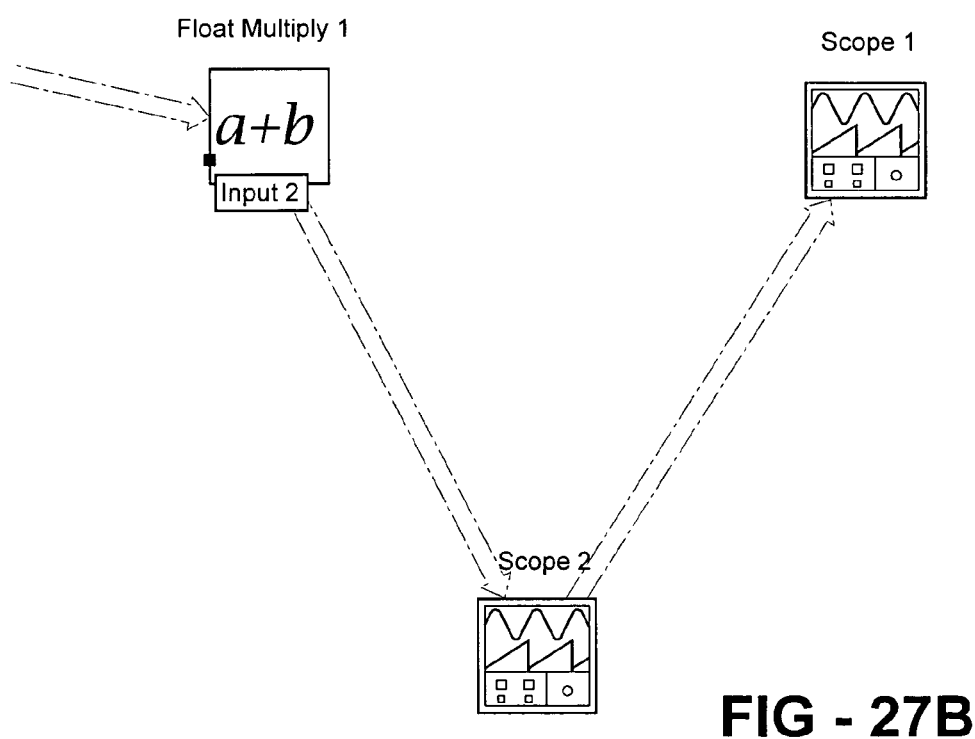
FIG. 27B is another detail of some of the object icons on the configuration canvas of FIG. 27 illustrating a symbol for the Float Multiply icon.

Referring to FIGS. 27A and 27B, another feature associated with each of the object icons is illustrated. In particular, each of the first, second, and third object icons include a plurality of symbols, such as mathematical or engineering symbols, and descriptors, such as text. Due to the space limitations on the canvas, it is advantageous for the user to have the plurality of symbols and descriptors that can be dynamically altered when desired. There are times when a symbol alone is sufficient for the user to understand the function or operation of the function object. At other times, the user would like to see greater detail and descriptions of the inputs and outputs, for example. FIG. 27A illustrates the Float Multiply icon having text descriptors visible to a user. Specifically, the input and output data ports are visible. The labels of the inputs and outputs is configurable by the user. In the example shown, only the first character of the name for the inputs and outputs is displayed to conserve space. Since the preferred execution path proceeds in a left to right fashion, the inputs are shown on the left hand edge and the outputs are shown on the right hand edge. FIG. 27B illustrates the same Float Multiply icon now having a symbol visible to the user. If the user points to a specific input or output, the name of the input or output will then be visible. In the preferred embodiment, each of the object icons include both a graphical symbol and a text descriptor with only one of the symbol and descriptor being visible at any one time. Even more preferably, the user would position a cursor over the object to dynamically change the views.

Figure 28:
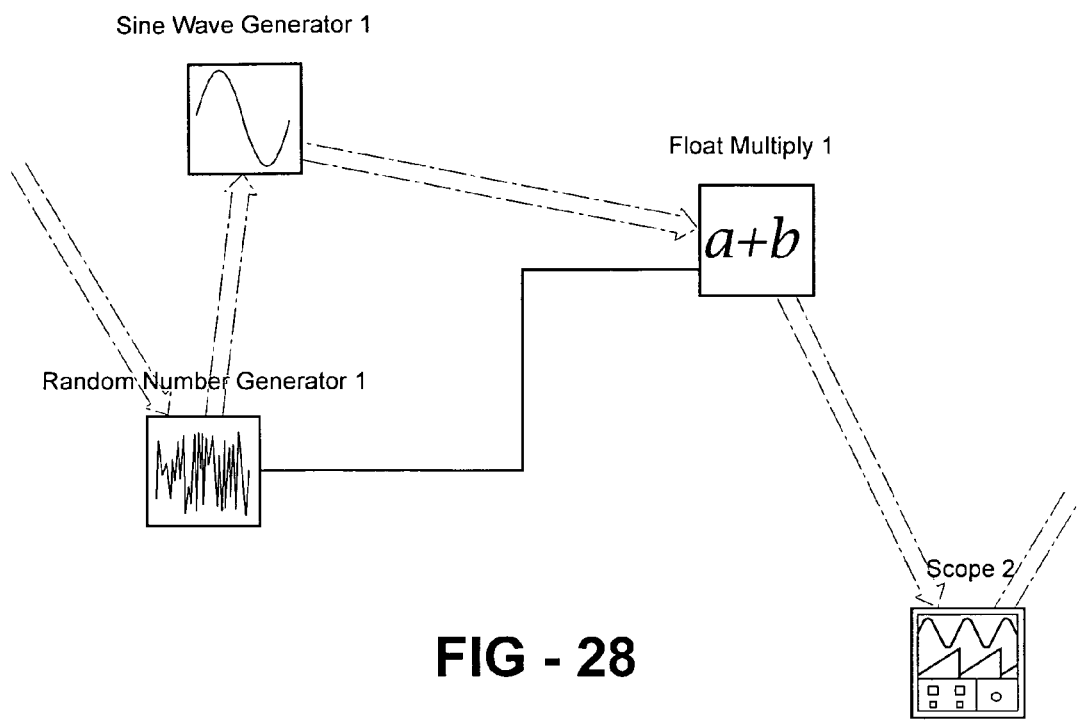
FIG. 28 is a detail of object icons on the configuration canvas of FIG. 24 illustrating a single data flow path, which is independent of the routed execution paths.
Figure 29:
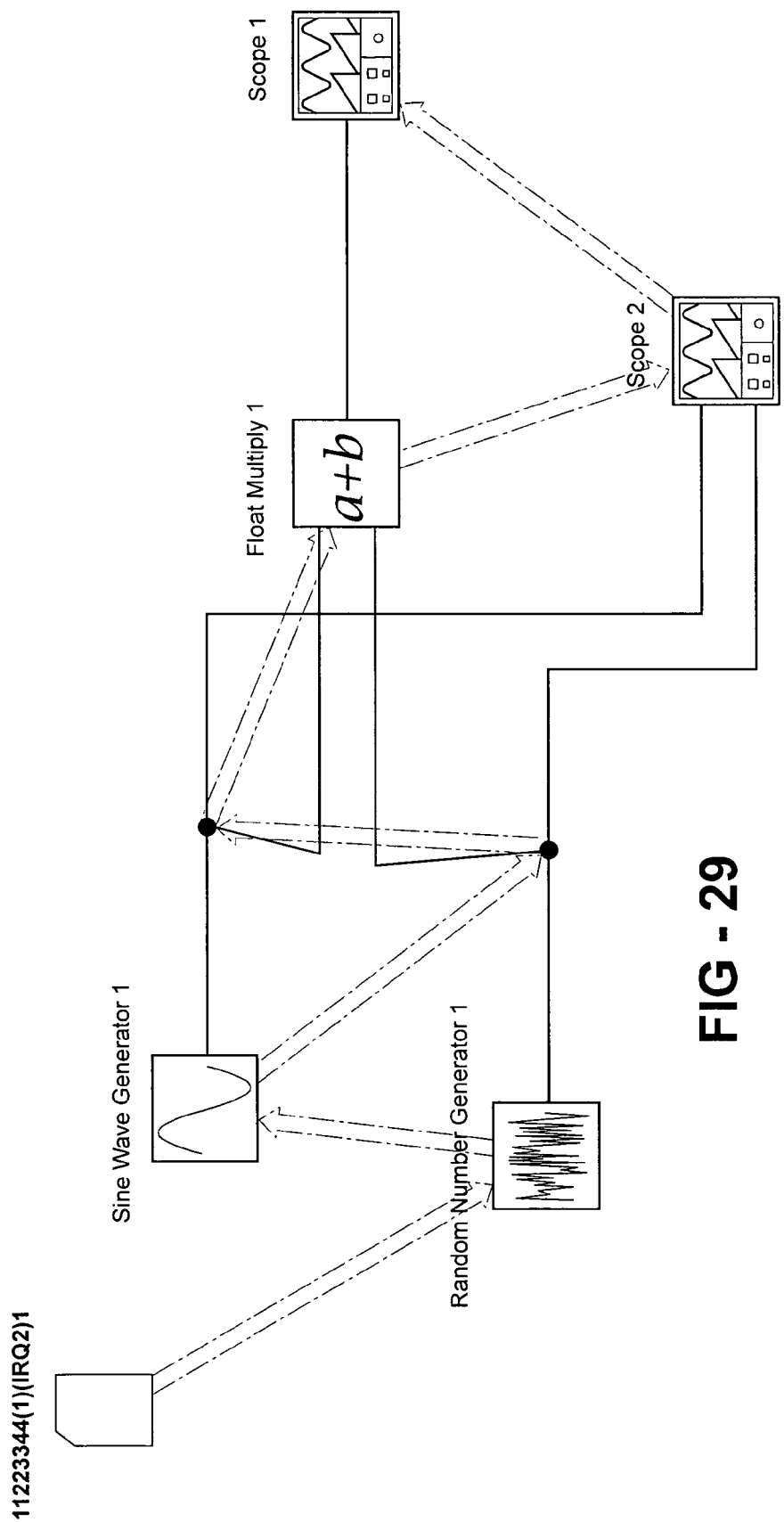
FIG. 29 illustrates a completed processing configuration on the configuration canvas with all of the execution paths being routed and all of the data flow paths being connected.

At this point in our example project and as shown in FIG. 27, the execution paths have all been established. However, in the preferred embodiment, the execution paths are independent from data flow paths. Referring to FIGS. 28 and 29, a data flow path is now created between the first, second, third, and fourth object icons on the canvas separately from the routings of the execution paths on the canvas. Specifically, the creation of the data flow paths between the object icons is performed by manually connecting the output from one of the object icons to the input of another object icon on the canvas. Even more specifically, the user clicks on an input or output and drags the pointer on the canvas toward the opposing input or output. If a permissible data connection is obtained, then a solid line is drawn indicating a connected data flow path. In the example shown in FIG. 28, an output of the Random Number Generator is connected to an input of the Float Multiply by connecting a data flow path between these data ports. The execution paths are not affected by the connection of the data flow path.

FIG. 29 illustrates completed data flow paths between the various object icons. The data flow path can be automatically distributed to more than one input when multiple inputs are required by one or more object icons, thereby creating a distribution point on the data flow path. The distribution of the data flow path in no way affects the actual values of the data. The values of the data passing through the data flow paths is simply sent to more than one object icon. In the example shown, the both the Float Multiply and the Scope 2 require multiple inputs. Therefore, the outputs from the Sine Wave Generator and the Random Number Generator have been distributed and a distribution point has been placed on this area of the data flow path. Preferably, a distribution icon associated with another function object is automatically created at the distribution point on the data flow path. Further, the execution paths are automatically re-routed to include the distribution icon at the distribution point based on the relative orientations of the icons. Alternatively, a distribution icon associated with another function object can be manually placed on the data flow path to distribute the data flow path when more than one input is required by one or more icons.

Figure 30:
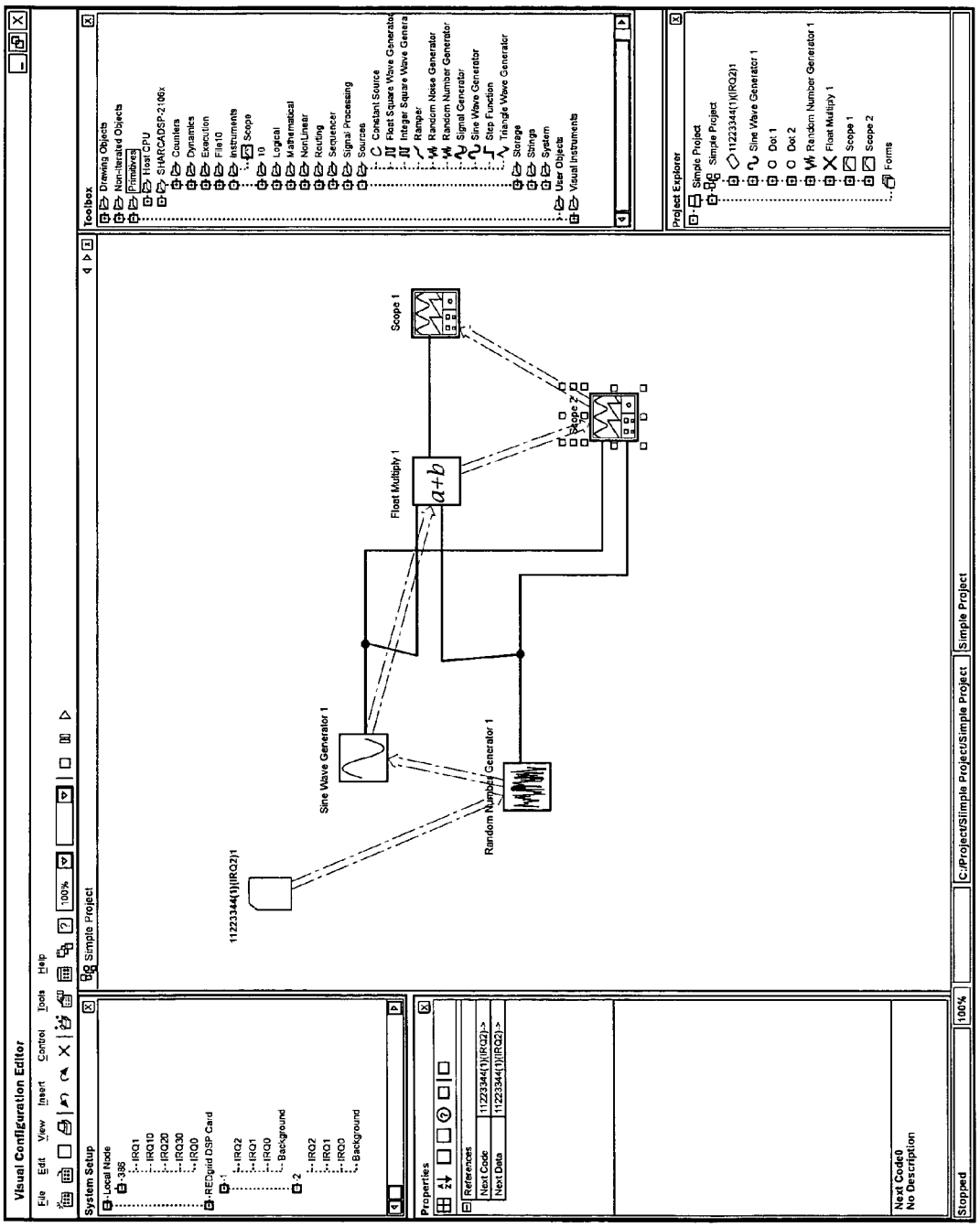
FIG. 30 illustrates the completed processing configuration of FIG. 29 along with the System Setup pane, the Project Explorer pane, the Toolbox pane, and the Properties pane.
Figure 31:
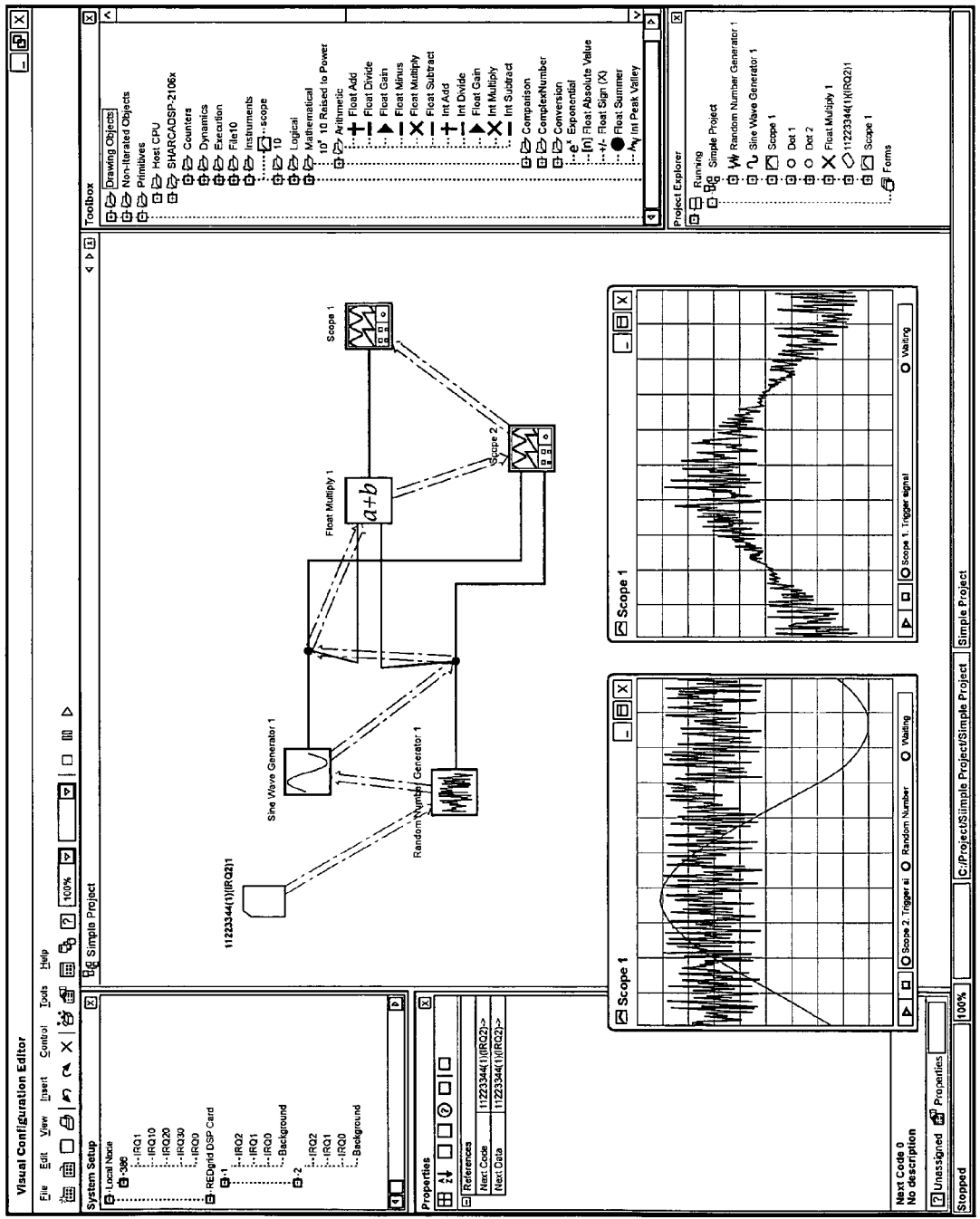
FIG. 31 illustrates the completed processing configuration of FIG. 30 during an operation thereof.
Figure 32:
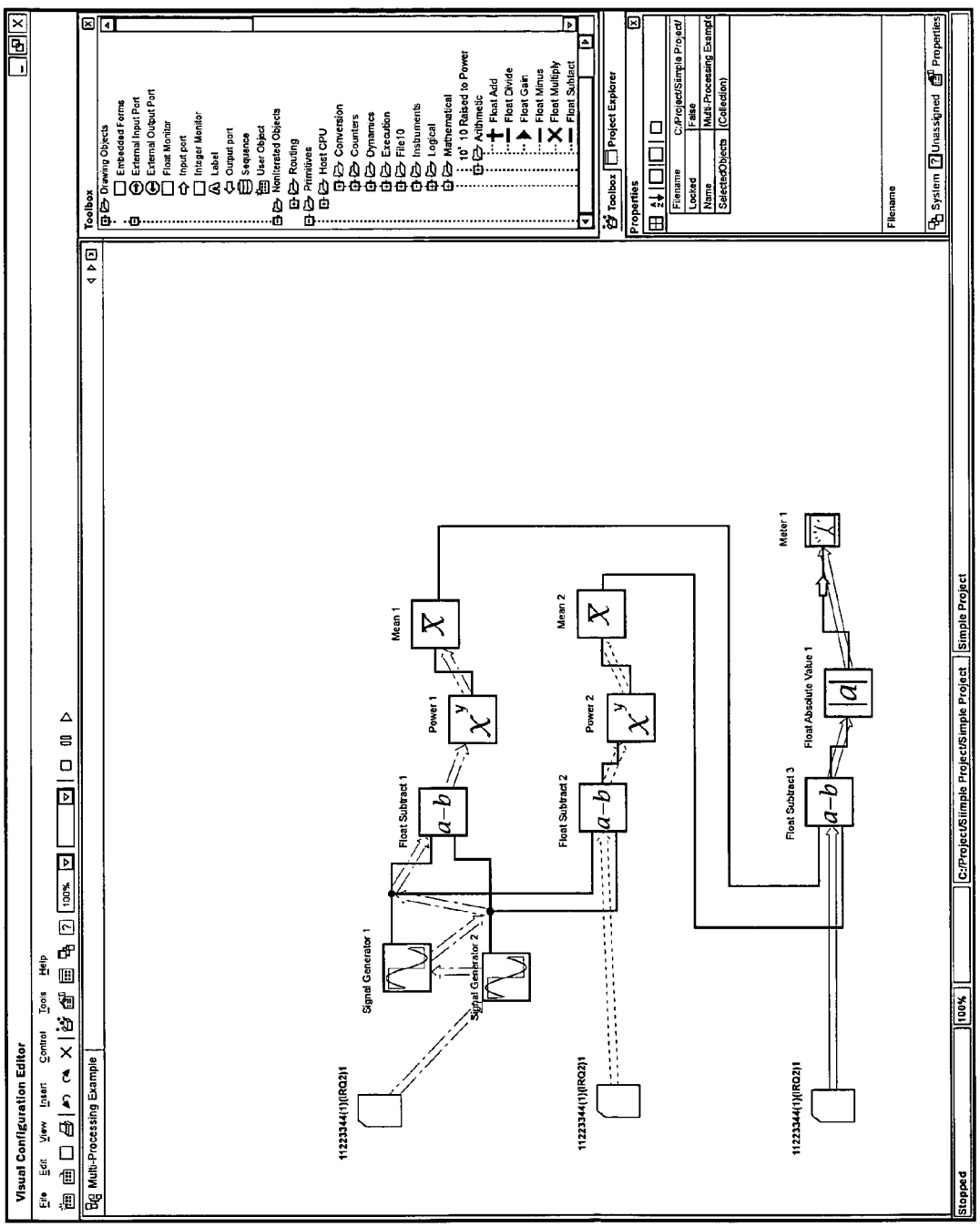
FIG. 32 illustrates three completed processing configurations on the same configuration canvas.

Referring to FIGS. 30 and 31, the project is now completed. The processing system can be operated such that the function objects are performing the associated functions in the order of the execution paths between the object icons and data is passing along the data flow path between the icons. The operation of the processing system is further defined as operating the execution paths between the icons in order of left to right as viewed on the canvas. Hence, the left most object icon executes first, the object immediately to its right executes second, and so on, until all of the object icons on a particular execution path have been executed. As mentioned above, the typical processing system will be repeating such that once the function object associated with the right most object icon has executed, then the operation will continuously repeat. In the preferred embodiment, the values passing through the data flow path are preserved between each pass of the execution path. Hence, values created in the last execution can be available as inputs for the next execution. It should be appreciated that the operation order can be altered without deviating from the overall scope of the subject invention.

The operation of the project is controlled by commands on the toolbar, such as stop, pause, and run. In the subject example, as shown in FIG. 31, Scope 2 displays the original signals from the Sine Wave Generator and the Random Number Generator. Scope 1 displays real time multiplication of these signals.

Another feature of the subject invention is that one of the object icons can be moved to a different location and the execution paths would be automatically re-routed based on the moved orientation of the object icons relative to each other on the canvas while the processing system is operating such that the execution paths are re-routed in real time. In other words, the movement of the icons and re-routing of the execution paths discussed in detail above when programming the processing system, can also be performed while the processing system is operating, thereby greatly increasing the versatility of the invention.

Turning to FIGS. 32-36 another completed project is illustrated. The configuration canvas is larger for this project because the System Setup pane, Project Explorer pane, Toolbox pane, Properties pane, and Unassigned pane are all docked on the right hand side of the screen. As mentioned above, the panes can be arranged in any suitable fashion on the screen. The particular configuration shown in FIG. 32 maximizes the space for the configuration canvas while permitting access to all of the panes.

The project shown in FIGS. 32-36 is multiprocessing, i.e., there is more than one processor positioned on the canvas. In order to create the configuration illustrated in FIG. 32, a first processor icon associated with a first processor is placed onto the canvas. A first plurality of object icons each associated with a first plurality of function objects are placed onto the canvas at a plurality of different locations. A first plurality of execution paths are automatically routed from the first processor icon to each of the first plurality of object icons when the first plurality of object icons are placed on the canvas to define a first processing configuration. Similarly, a second processor icon is placed onto the canvas. A second plurality of object icons each associated with a second plurality of function objects are placed onto the canvas at a plurality of different locations. A second plurality of execution paths are automatically routed from the second processor icon to each of the second plurality of object icons when the second plurality of object icons are placed on the canvas to define a second processing configuration. As illustrated, much of the second processing configuration is a duplication of the first processing configuration to create a redundancy in the system Finally, a third processor icon is placed onto the canvas. A third plurality of object icons each associated with a third plurality of function objects are placed onto the canvas at a plurality of different locations. A third plurality of execution paths are automatically routed from the third processor icon to each of the third plurality of object icons when the third plurality of object icons are placed on the canvas to define a third processing configuration. In order to differentiate between the first, second, and third plurality of execution paths, these execution paths are uniquely labeled. Preferably, the first, second, and third plurality of execution paths will be differentiated by using unique colors for each execution path.

A first data flow path is created between the first plurality of object icons on the canvas separately from the routings of the execution paths from the first processor icon on the canvas. In this example, the first data flow path is created between the Signal Generator 1, Signal Generator 2, Float Subtract 1, Power 1, and Mean 1. Similarly, a second data flow path is created between the second plurality of object icons on the canvas separately from the routings of the execution paths from the second processor icon on the canvas. In this example, the second data flow path is created between a pair of distribution icons, Float Subtract 2, Power 2, and Mean 2. Due to the distribution of the data flow paths, the Signal Generator 1 and Signal Generator 2 are sending data into both the first and second data flow paths. Finally, a third data flow path is created between the third plurality of object icons on the canvas separately from the routings of the execution paths from the third processor icon on the canvas. In this example, the third data flow path is created between the Mean 1 of the first data flow path, Mean 2 of the second data flow path, Float Subtract 3, Float Absolute Value 1, and Meter 1. As is clearly illustrated, the data flow paths can be created to flow data between any of the object icons on the canvas. In particular, at least one of the first, second, and third data flow paths is routed to flow between at least one of the first plurality of object icons, the second plurality of object icons, and the third plurality of object icons such that data is passing across and between the first, second, and third processing configurations. Data flow paths may also be distributed as necessary in accordance with the procedures outlined above. The creation of these processing configurations, which are now completed, are performed by the methodologies outlined above.

Figure 33:
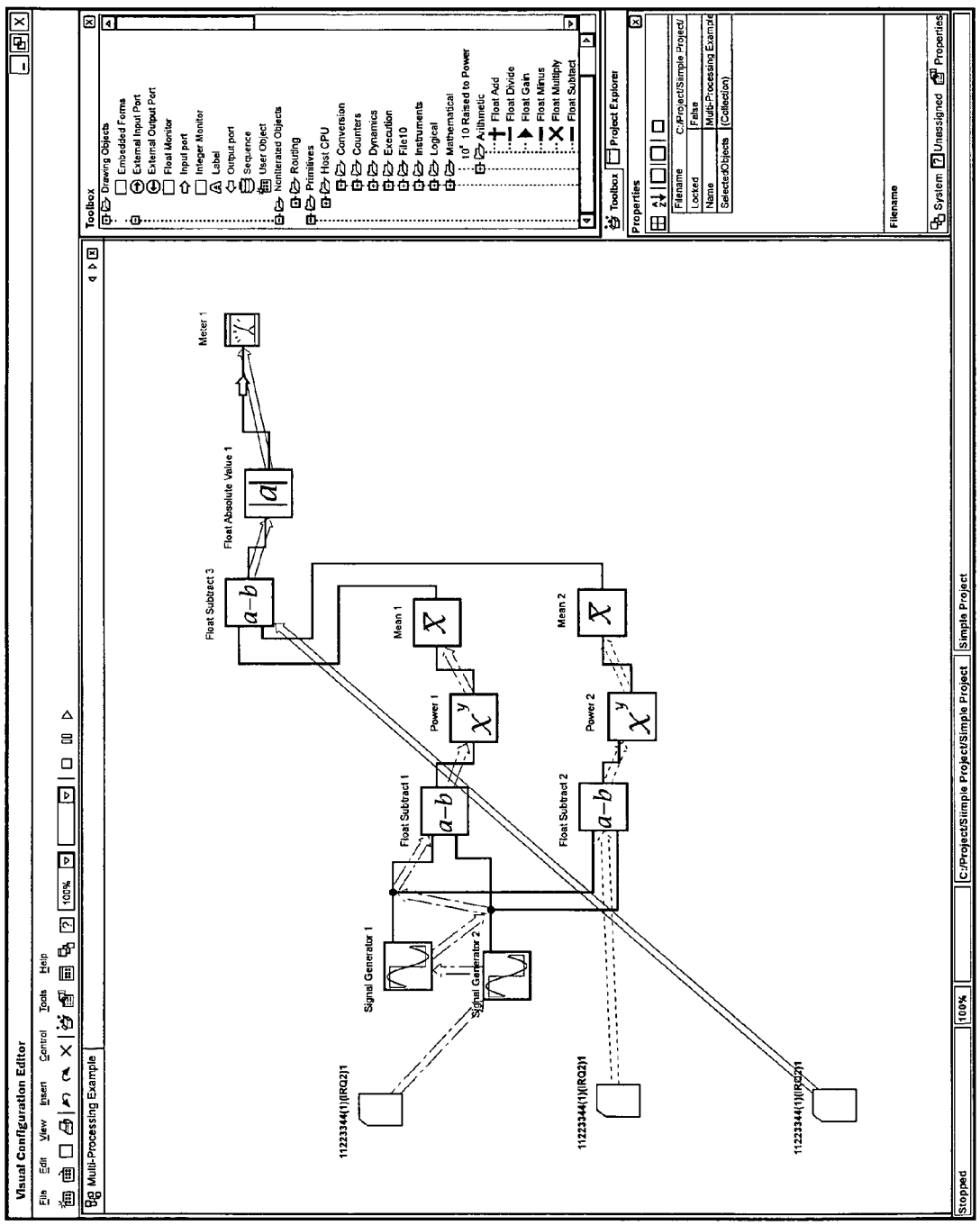
FIG. 33 illustrates the three completed processing configurations of FIG. 32 with some of the object icons being moved to a different location.

As shown in FIG. 33, the object icons can be moved to different orientations on the canvas. The data flow paths are not modified when the icons are moved. The data flow paths are simply redrawn based on the new orientation. The execution paths of each processing configuration do not automatically interact with the execution path of the other processing configuration. Hence, as shown in FIG. 33, the object icons of the third processing configuration have been moved to a top of the canvas. The execution path from the processor of the third processing configuration automatically follows the left most object icon of the third processing configuration and does not automatically interact with the other execution paths of the first and second processing configurations.

Figure 34:
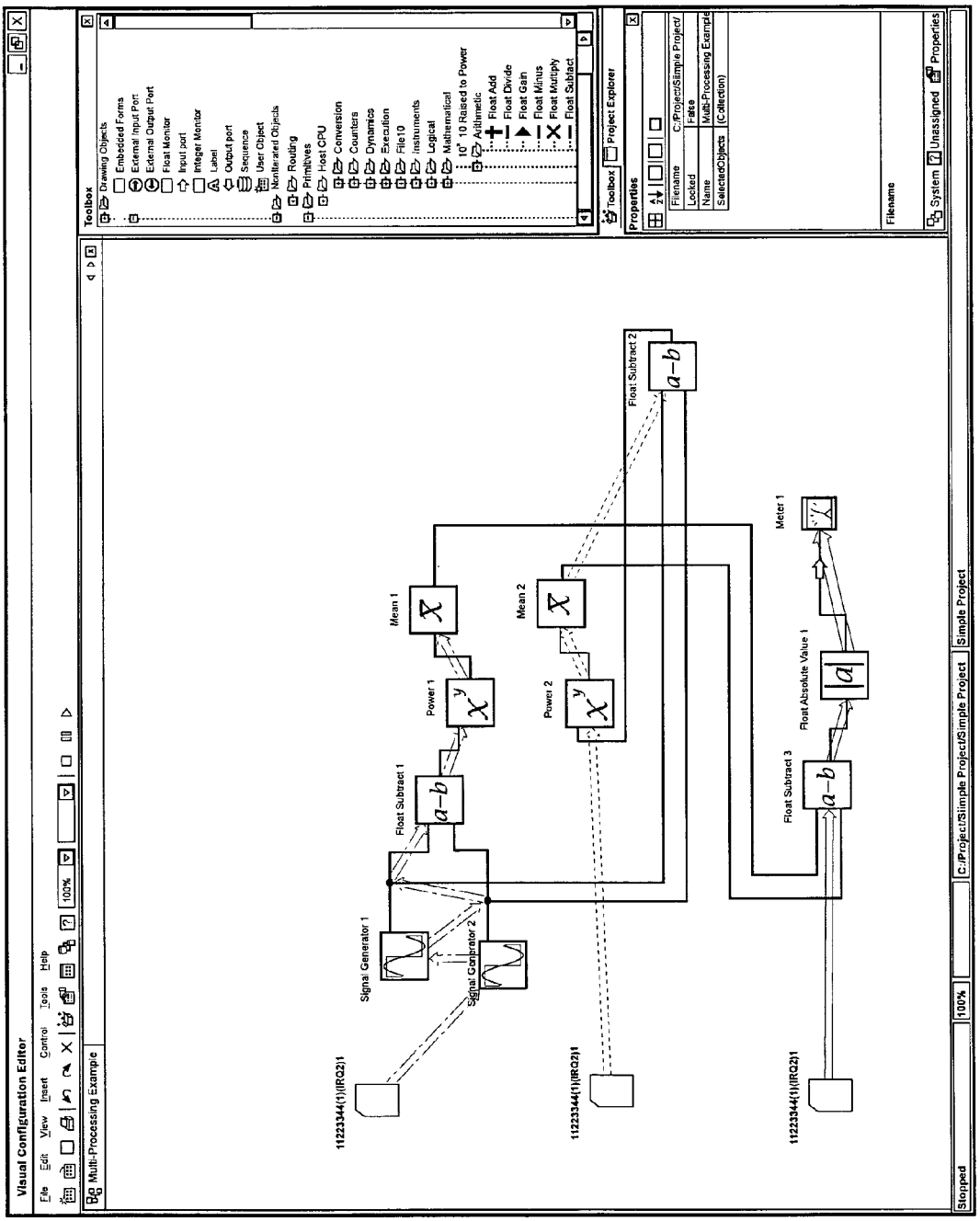
FIG. 34 illustrates the three completed processing configurations of FIG. 32 with one of the object icons being moved to a different location.

FIG. 34 is another example of an object icon changing orientations within the canvas. In particular, an object icon (Float Subtract 2) of the second processing configuration is moved to a different orientation on the canvas. Again, the data flow paths do not change and are simply redrawn based on the new orientation of the object icon. This Figure clearly illustrates that data flow paths can pass data from left to right, right to left, top to bottom, etc. There is an effect, however, of data flow paths which pass data from right to left. As mentioned above, execution paths proceed from left to right. Therefore, when data connections are made from object icons that are later in the execution path a delay occurs. Hence, moving object icons to force a data flow path to pass data from right to left can be one means to initiate a delay in the passage of data. In the subject example of FIG. 34, a single delay will occur in the repetitive execution of the processing system because the data for the Power 2 icon has not been received since the Float Subtract 2 icon is orientated at a position later in the execution path of the second processing configuration.

As discussed in greater detail above, the execution paths of the second processing configuration are re-routed because the object icon that was moved was previously the left most icon. The execution path for the processor of the second processing configuration is therefore re-routed to the new left most object icon (Power 2). The execution path to the moved object icon is also re-routed to now route from the object icon (Mean 2) to the left of the moved object icon (Float Subtract 2). Again, the execution paths of the first and third processing configurations are not affected.

Figure 35:
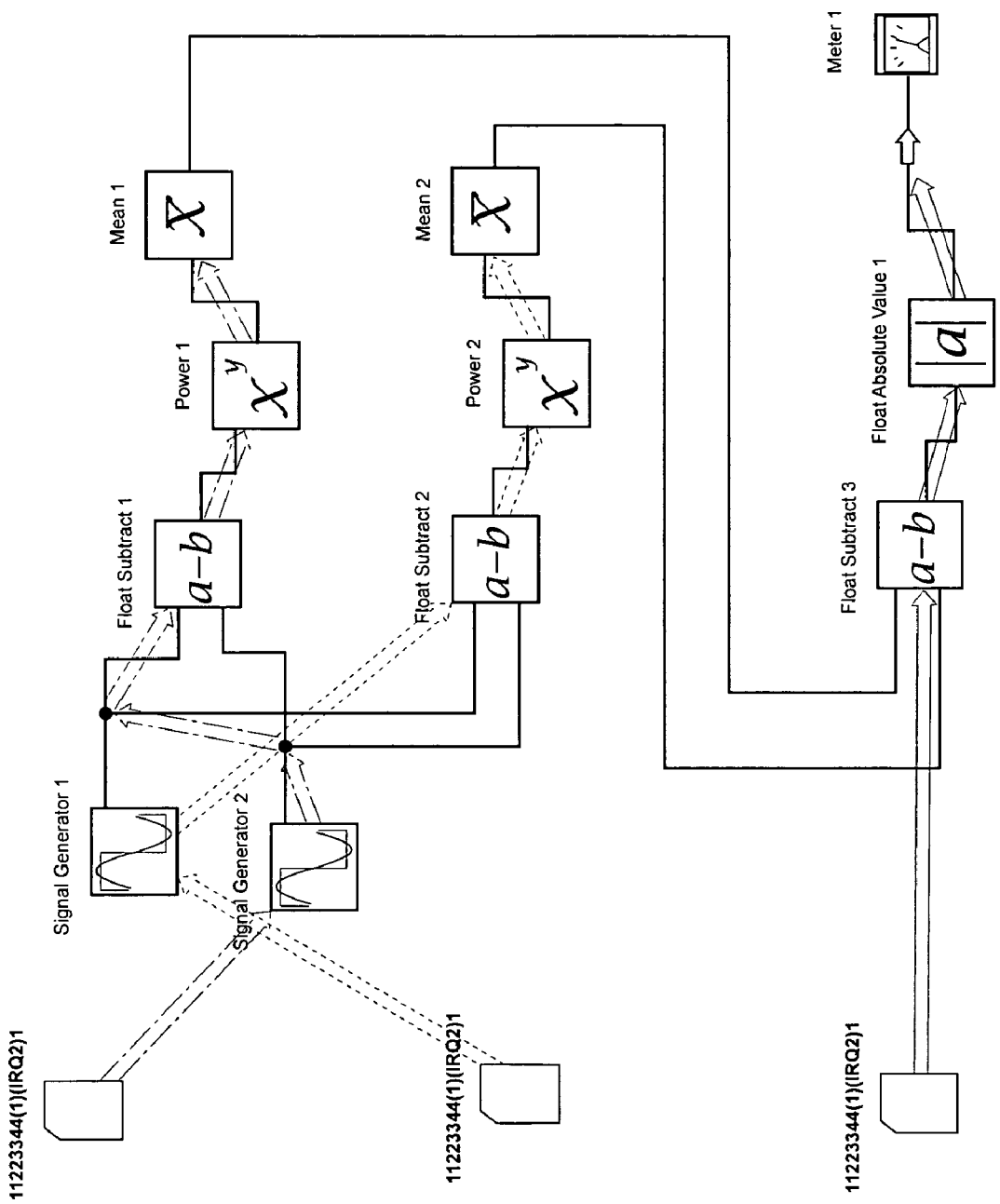
FIG. 35 illustrates the three completed processing configurations of FIG. 32 with one of the object icons being moved into a different processing configuration.

FIG. 35 illustrates yet another feature of the subject invention wherein execution paths in a multiprocessing environment can be manually re-routed. Specifically, one of the first plurality of object icons from the first processing configuration is re-routed into the second processing configuration by automatically removing the first plurality of execution paths associated with the re-routed object icon and automatically routing the second plurality of execution paths to the re-routed object icon. In the example shown in FIG. 35, the Signal Generator 1, which was previously part of the execution paths of the first processing configuration, has been moved to be part of the execution paths of the second processing configuration. This operation is performed by highlighting the object icon to be moved (Signal Generator 1 in this example). Then change the execution path through the use of the toolbar. The execution paths of both the old configuration (first processing configuration) and new configuration (second processing configuration) are automatically re-routed. The data flow paths are not affected. This type of change might have a practical advantage for the user. In particular, the calculation burden could now be more equally spread across two DSPs.

Figure 36:
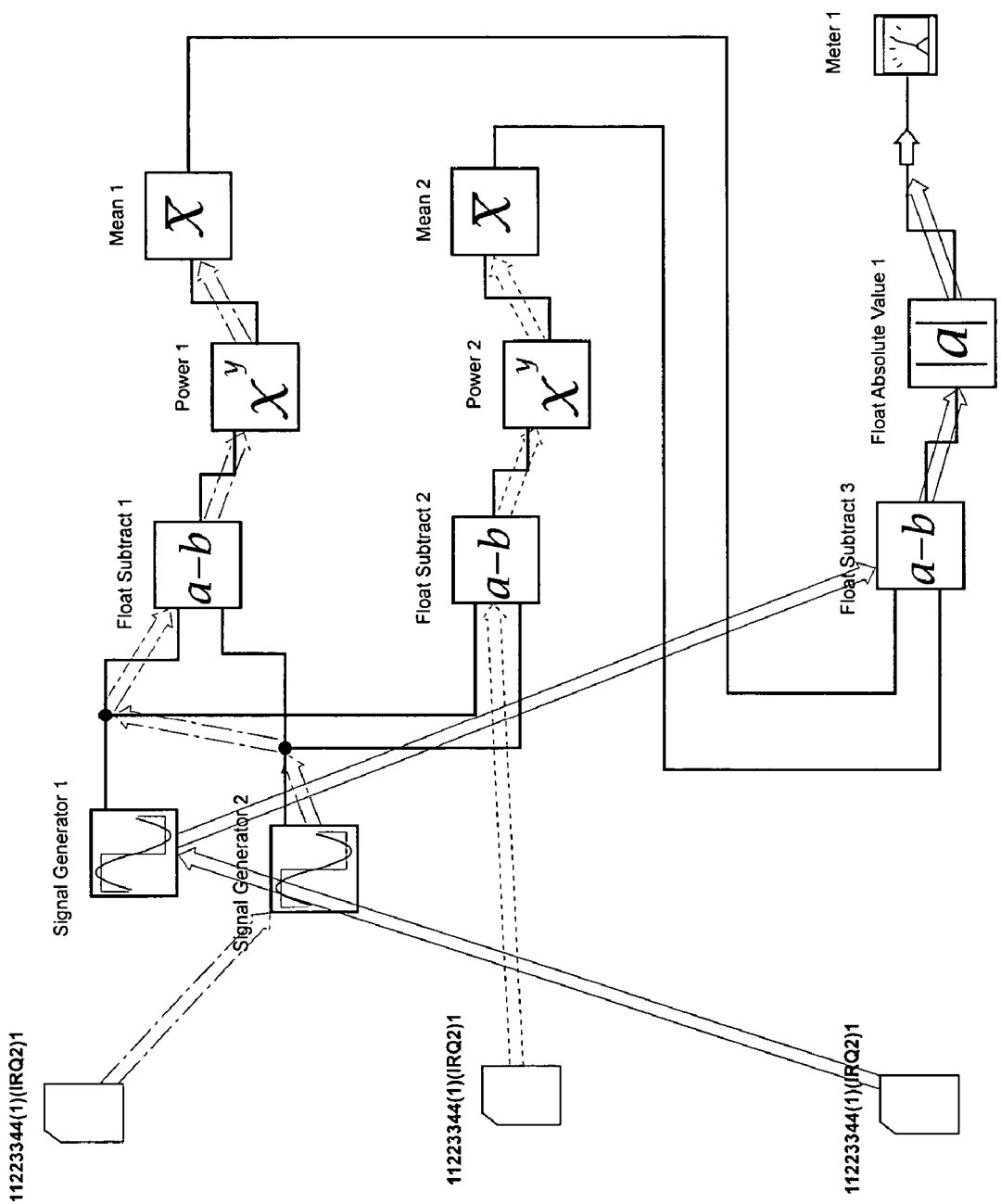
FIG. 36 illustrates the three completed processing configurations of FIG. 32 with one of the object icons being moved into a different processing configuration.

FIG. 36 illustrates a similar feature of the subject invention as shown in FIG. 35. However, the object icon is moved from the first processing configuration to the third processing configuration. Hence, first plurality of execution paths associated with the re-routed object icon is automatically removed and the third plurality of execution paths is automatically routed to the re-routed object icon. In the example shown in FIG. 36, the Signal Generator 1, which was previously part of the execution paths of the first processing configuration, has now been moved to be part of the execution paths of the third processing configuration. Again, the data flow paths are not affected.

The movement of object icons into and out of various processing configuration is an extremely versatile tool and is not hindered by machine language of the processors. In particular, the first processor may include a first machine language and the second processor may include a second machine language that is different than the first machine language. The re-routing of the object icons from processing configurations operating under different machine languages is seamless and not affected by the different machine languages.

Figure 36A:
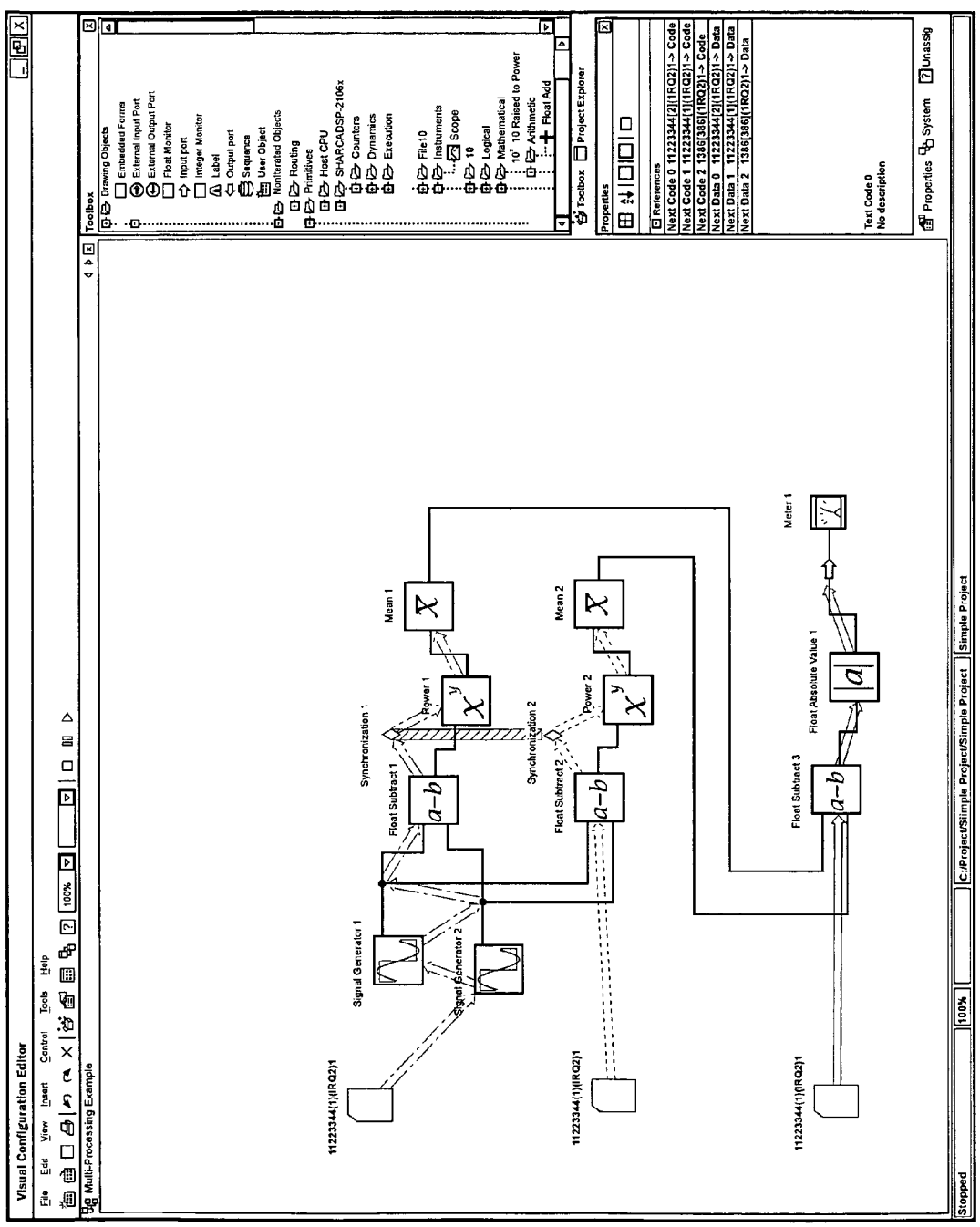
FIG. 36A illustrates the three completed processing configurations of FIG. 32 with two of these processing configurations being synchronized.

Referring to FIG. 36A, a synchronization object may be inserted into the execution path between the icons of the first processing configuration and into the execution path between the icons of the second processing configuration to synchronize these execution paths at the insertion point. Hence, the processing of data across each of these processing configurations will be synchronized in real time at the insertion points. The synchronization object provides a simple, graphical means for aligning the execution of function objects in multiprocessing environments. As is appreciated, different processors and/or different events may be executing a different rates. The synchronization object allows the user to specifically force synchronization points in multiple execution paths of multiple processors. When the execution of a particular execution path reaches the synchronization object, the execution will wait until all synchronized execution paths have reached their respective synchronization objects. At this point, all of the execution paths are allowed to proceed.

Figure 37:
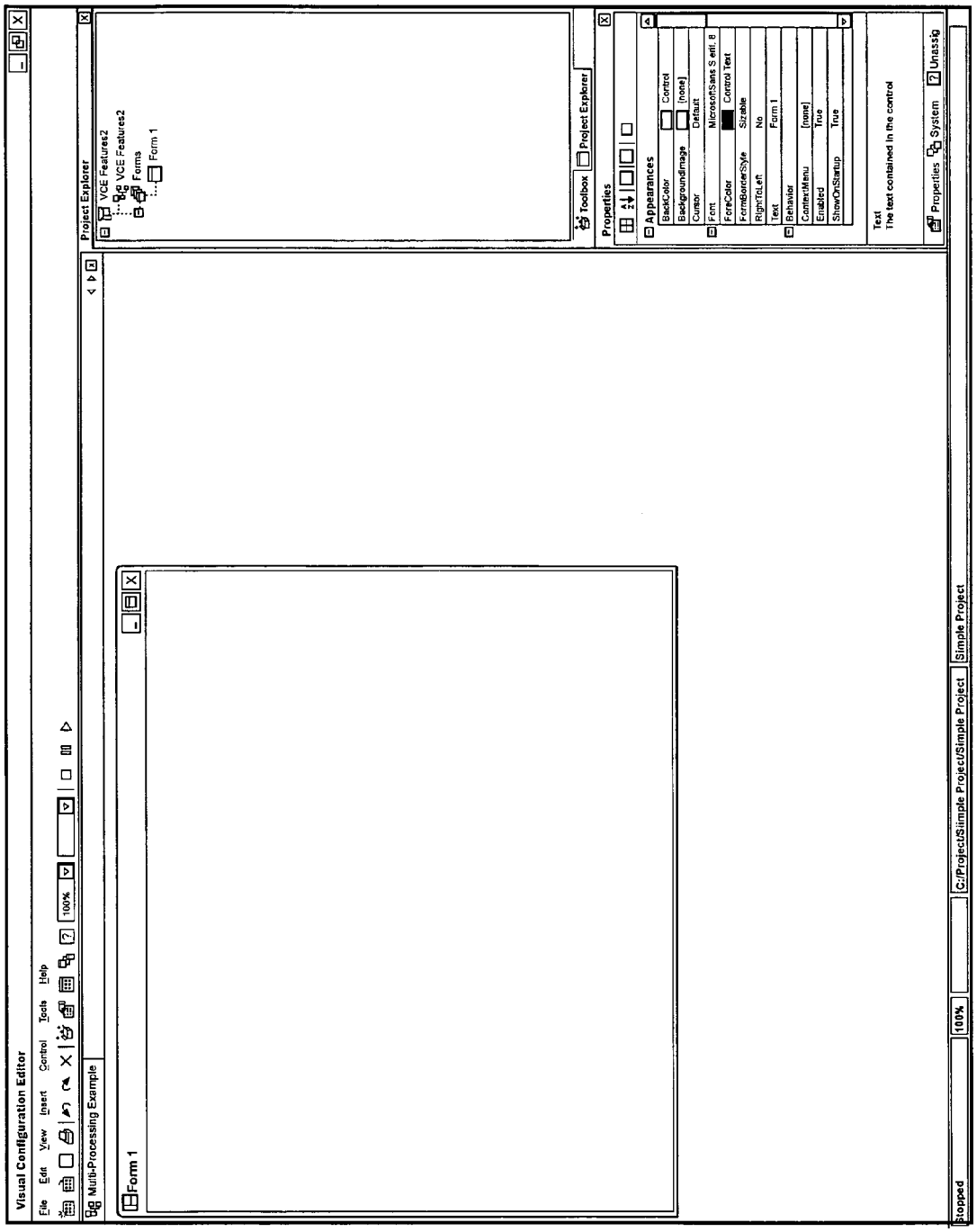
FIG. 37 illustrates an instrument canvas opened over the configuration canvas.
Figure 38:
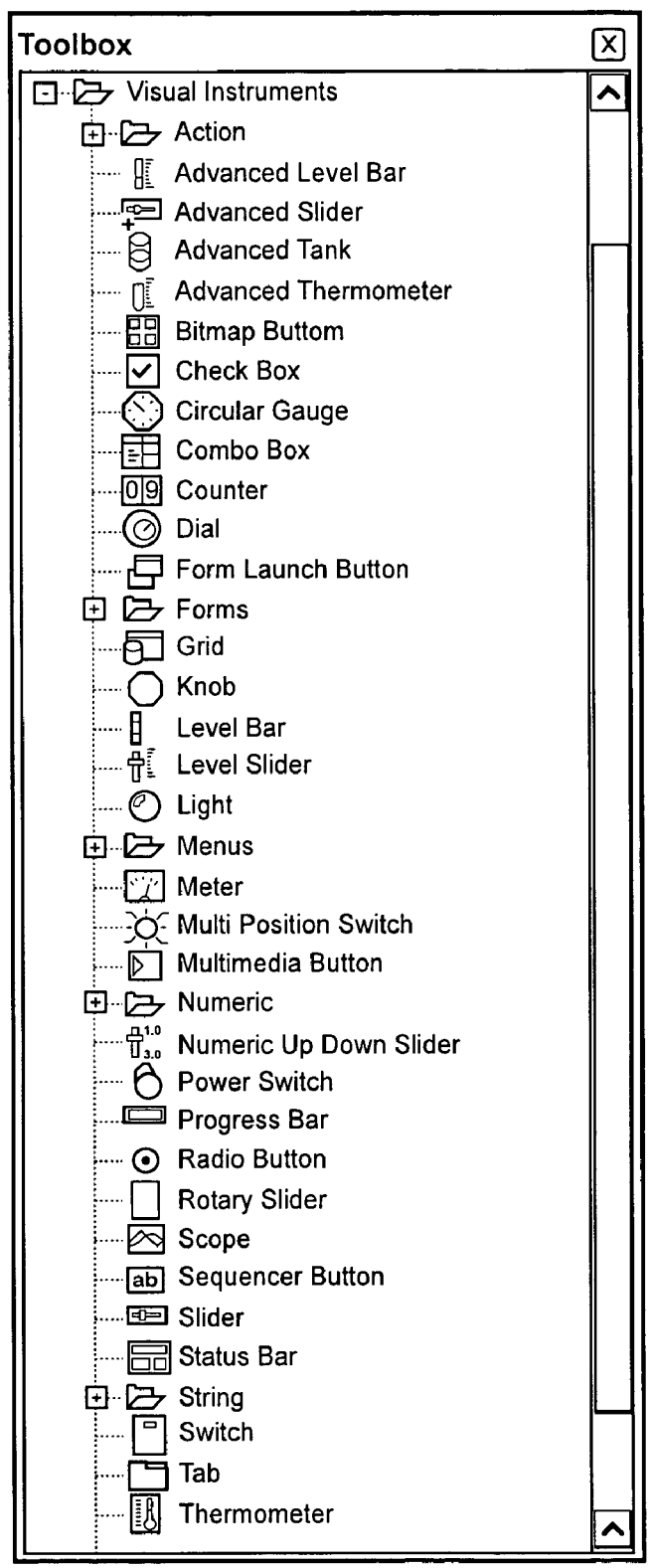
FIG. 38 is another detail of the Toolbox pane.

Turning to FIGS. 37-46, a visual instrument feature of the subject invention will be discussed in detail. Visual instruments enable the user to create controls and indicators that will appear on the monitor of the computer and will allow the user to interact with the processing system during operation. As shown in FIG. 37, the computer also includes an instrument canvas. The instrument canvas is shown disposed over the configuration canvas. It should be appreciated that there may be a plurality of instrument canvases opened at any one time. As shown in FIG. 38, the processing system includes at least one visual instrument. Preferably, the visual instruments are found under a Visual Instruments folder in the Toolbox pane.

Figure 39:
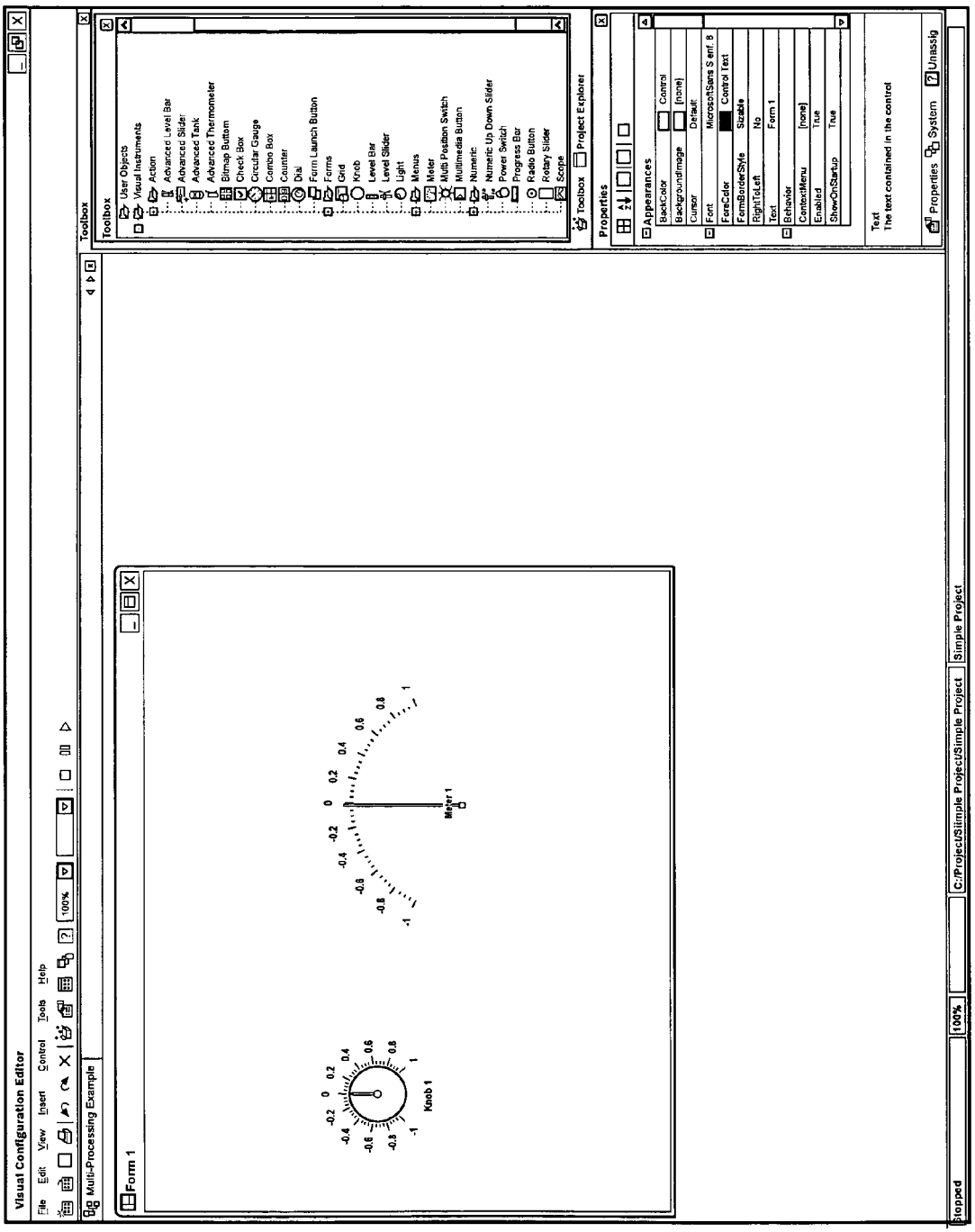
FIG. 39 illustrates the instrument canvas populated with a number of visual instruments.

At least one visual instrument can be placed onto the instrument canvas as shown in FIG. 39. Specifically, the symbol for the visual instrument is located in the Toolbox pane and copies are dragged and dropped into the instrument canvas to define the visual instrument. The visual instruments can be positioned within the instrument canvas and can also be re-sized as desired. In the example shown, the instrument canvas includes a Knob and a Meter.

Figure 40:
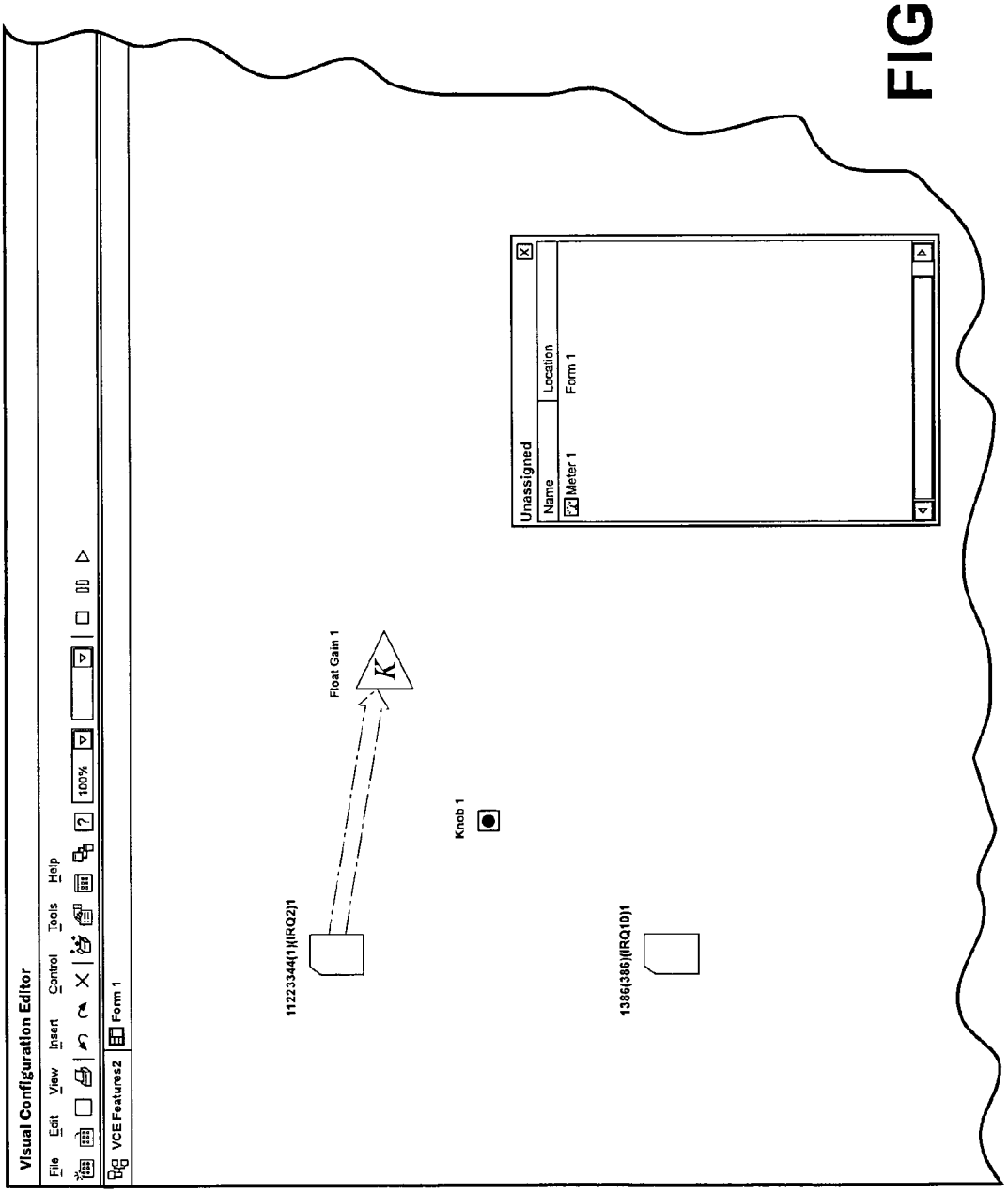
FIG. 40 illustrates a partially created processing configuration along with a detail of the Unassigned pane.

FIG. 40 illustrates another configuration canvas with at least one object icon associated with a function object is placed onto the configuration canvas. One or more processor icons associated with a processor are also placed onto the canvas. One or more execution paths are automatically routed between processors icons and object icon(s) when the object icons are placed on the configuration canvas to define a processing configuration. Data flow paths are also created between the processor icons and object icons on the configuration canvas.

Figure 41:
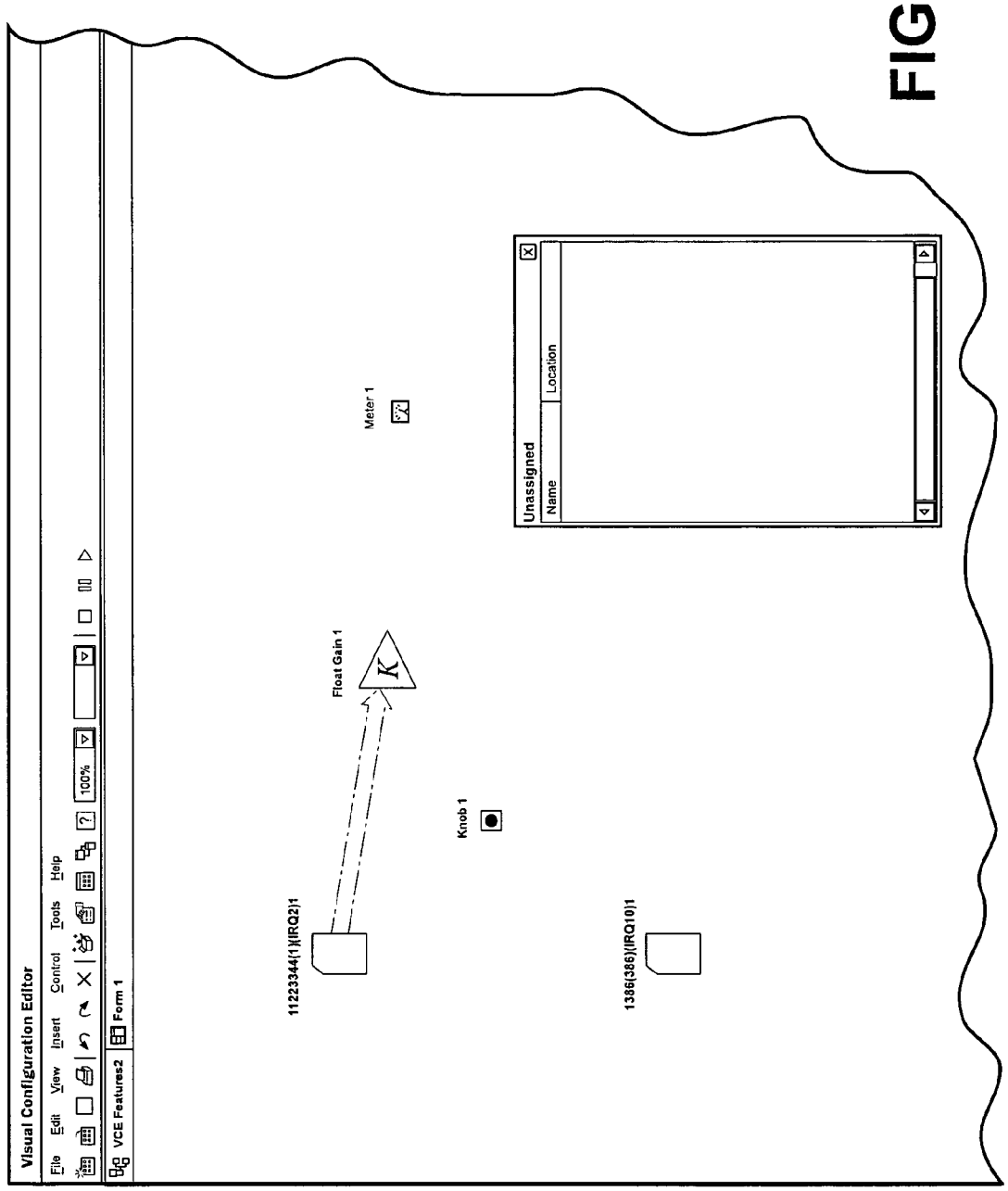
FIG. 41 illustrates another view of the partially created processing configuration along with the detail of the Unassigned pane.

Referring to FIGS. 39-41, an instrument icon associated with the visual instrument is automatically placed onto the Unassigned pane or temporary pane when the visual instrument is placed on the instrument canvas. The instrument icon is then moved from the temporary pane to place the instrument icon onto the configuration canvas. In this example, the instrument icons associated with both the Knob and the Meter would be automatically placed onto the Unassigned pane or temporary pane when the Knob and Meter were placed onto the instrument canvas. As shown in FIG. 40, the Knob has been moved to the configuration canvas while the Meter remains in the Unassigned pane or temporary pane. Specifically, the Knob has been dragged and dropped from the Unassigned pane to the configuration canvas. FIG. 41 illustrates that both the Knob and Meter have been moved to the configuration canvas such that the Unassigned pane or temporary pane is empty again.

Figure 42:
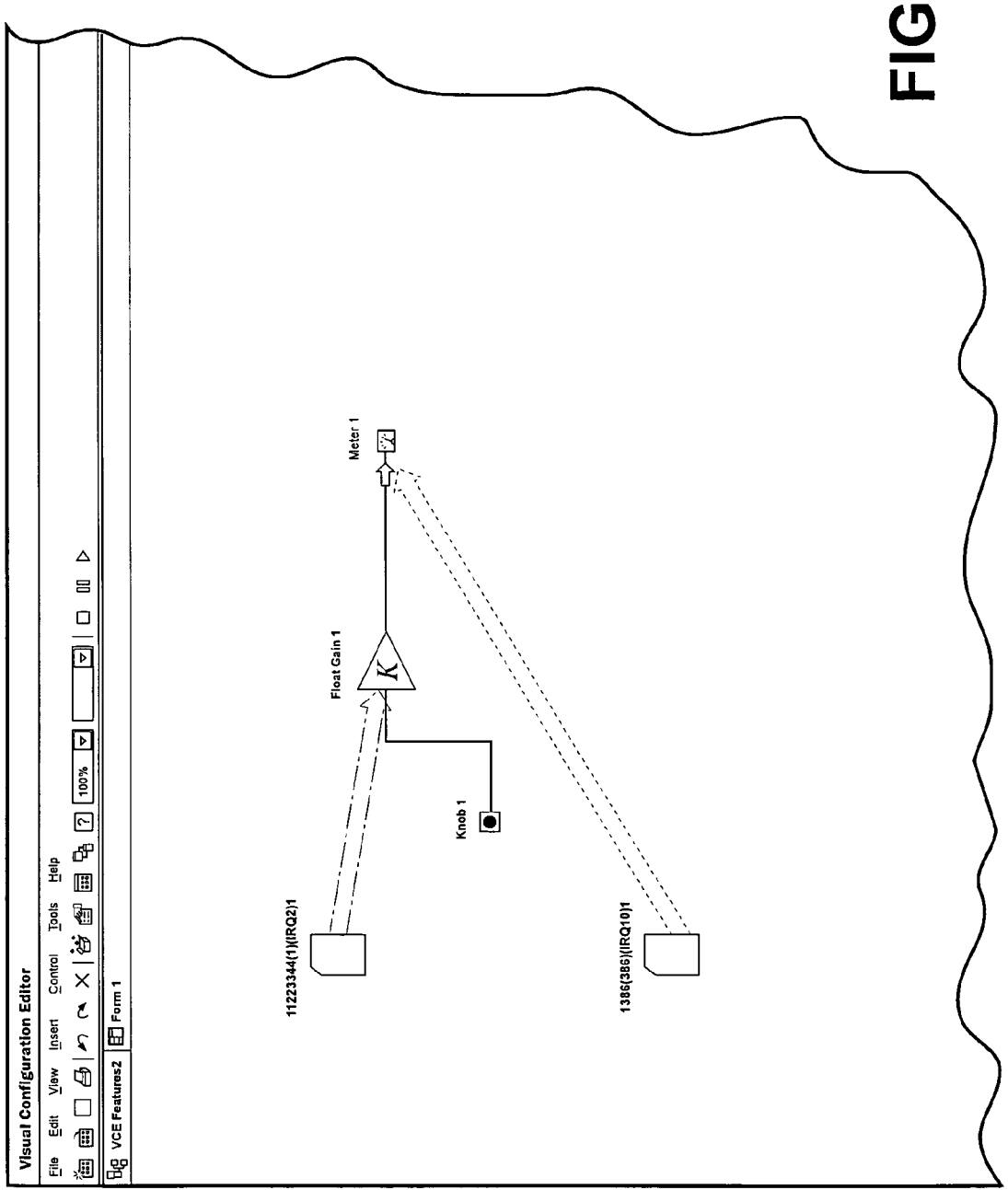
FIG. 42 illustrates another completed processing configuration.

As shown in FIG. 42, data flow paths are created between the instrument icons and at least one of the object icons within the processing configuration on the configuration canvas such that the visual instruments on the instrument canvas are operationally connected to the processing configuration on the configuration canvas. The processing configuration is now complete.

Figure 43:
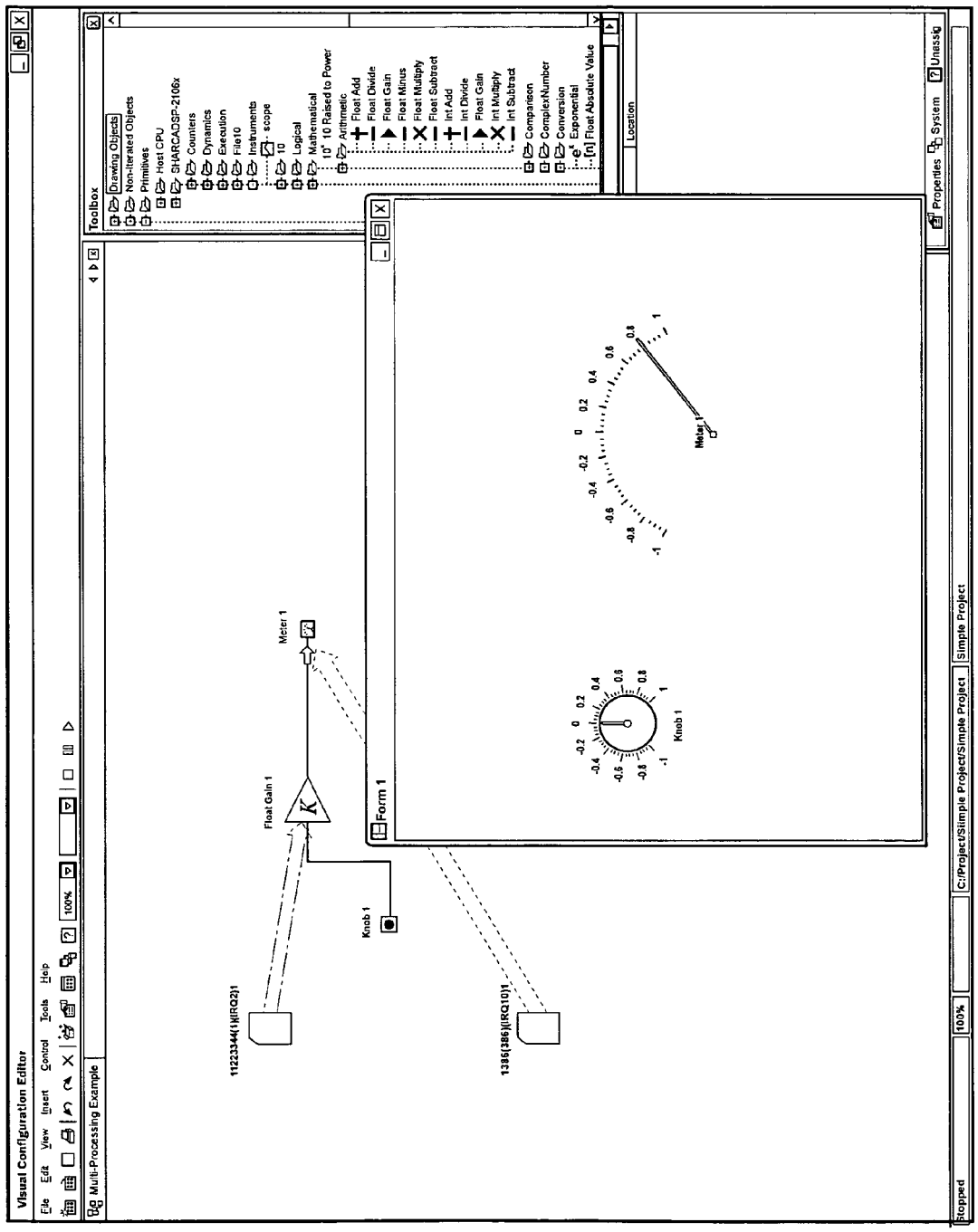
FIG. 43 illustrates the instrument canvas of FIG. 39 overlaid onto the completed processing configuration of FIG. 42.

As shown in FIG. 43, the processing configuration is operated such that the function objects are performing the associated functions in the order of the execution paths between the icons and data is passing along the data flow path between the icons. The visual instrument can be manipulated to automatically alter data values passing along the data flow paths in real time.

The visual instrument is preferably linked to the instrument icon such that a command may be initiated for switching between the visual instrument on the instrument canvas and the instrument icon on the configuration canvas. This command feature is a navigation aid to assist the user to quickly move between various views and parts of the processing configuration. As configuration become large and complex it is difficult to keep track of the instruments and their connectivity. As such, this command feature is a great productivity and quality aid for the user such that the user can quickly locate a visual instrument from an instrument icon or vise versa.

Figure 44:
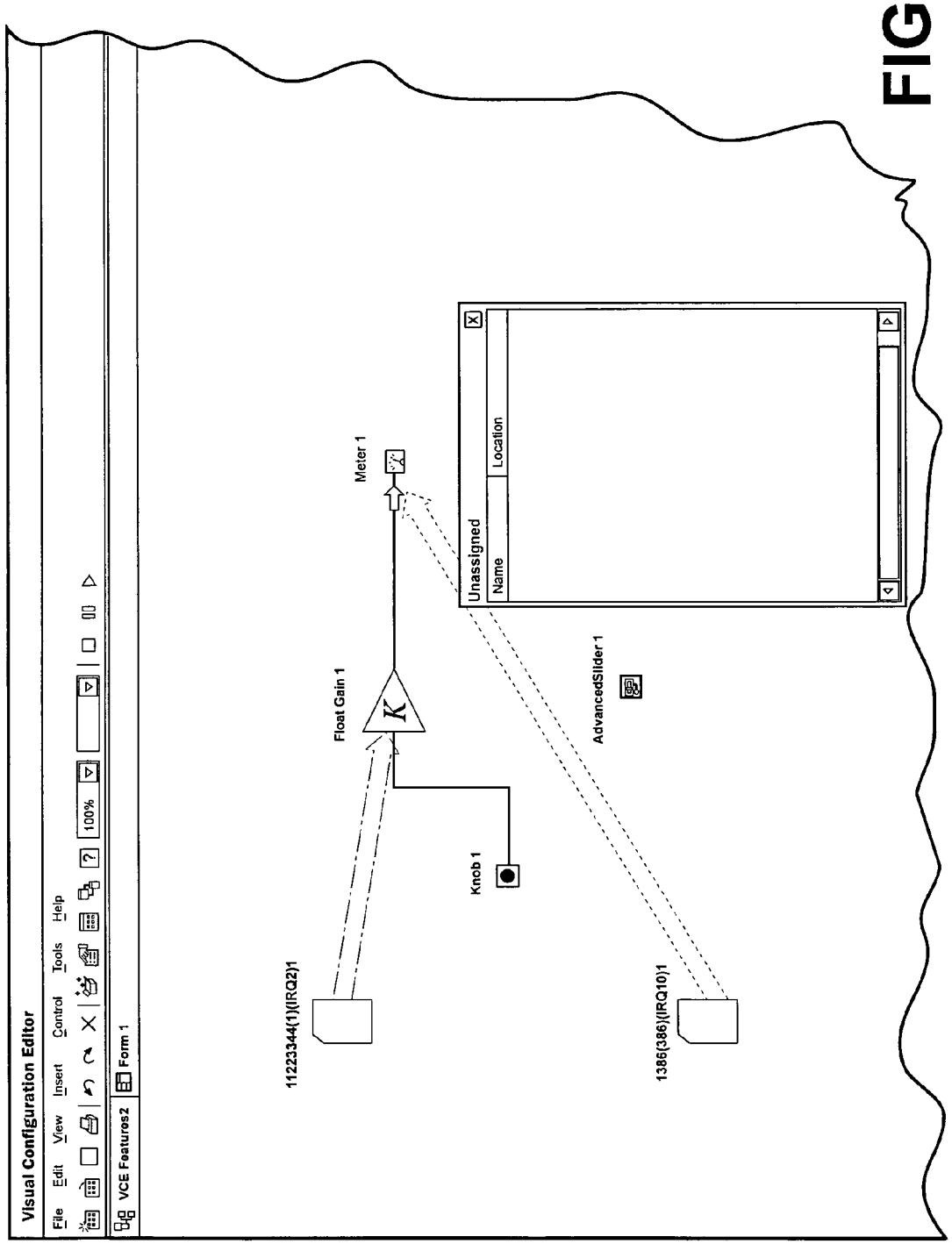
FIG. 44 illustrates a partially created processing configuration along with a detail of the Unassigned pane.
Figure 45:
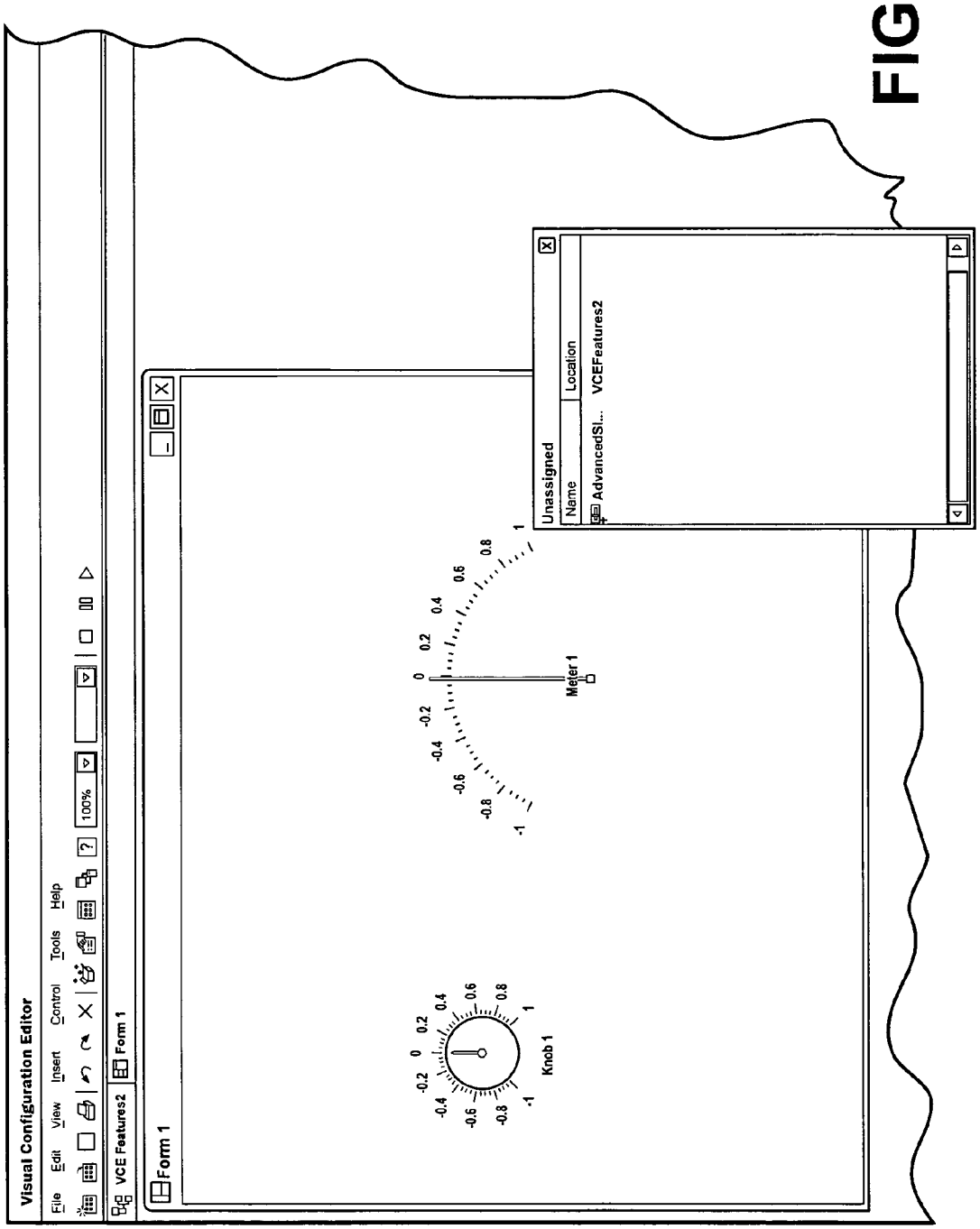
FIG. 45 illustrates the Unassigned pane overlaid onto an instrument canvas populated with some visual instruments.
Figure 46:
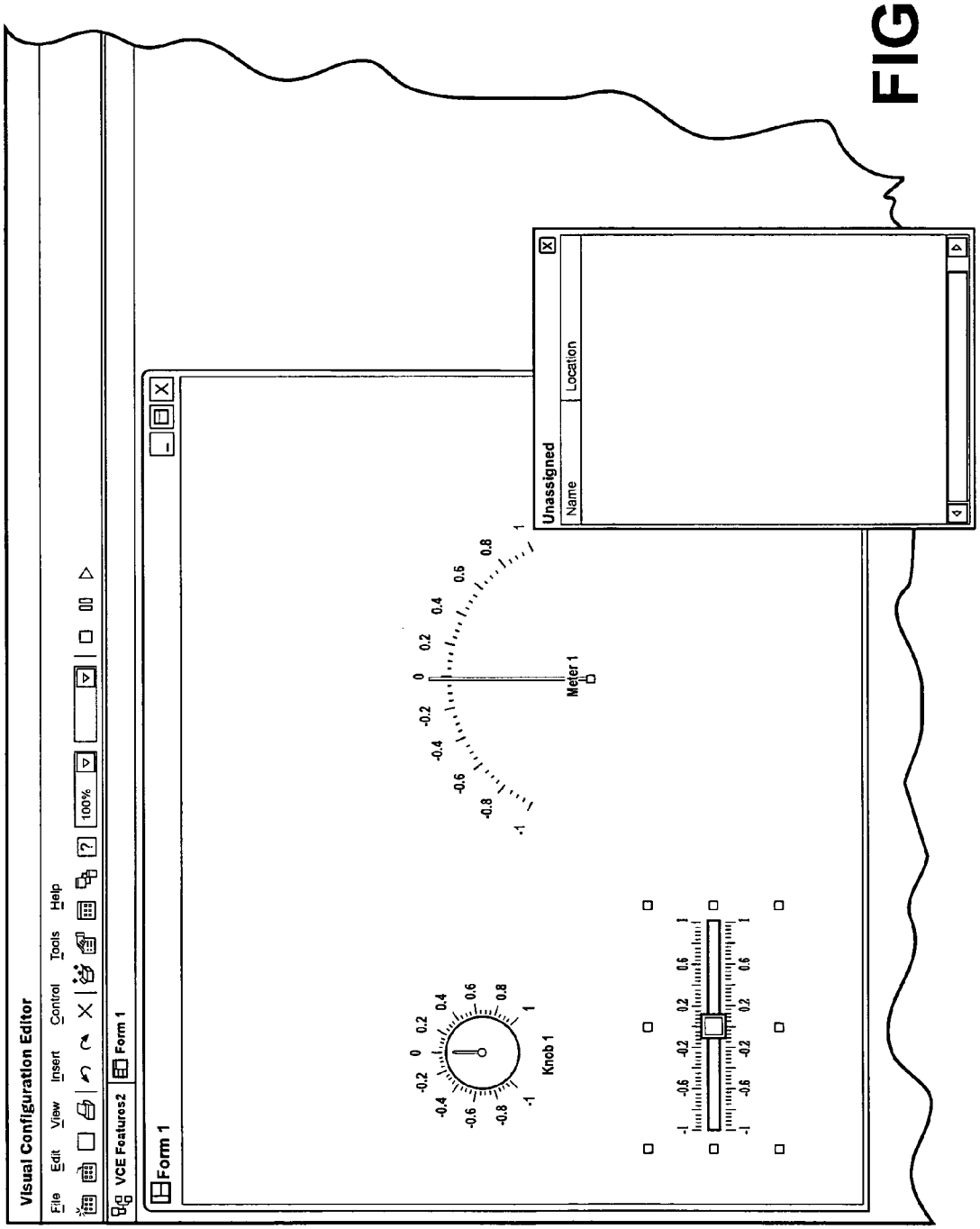
FIG. 46 illustrates another view of the Unassigned pane overlaid onto the instrument canvas of FIG. 45 with the visual instrument moved from the Unassigned pane to the instrument canvas.

Turning to FIGS. 44-46 an alternative means of placing instrument icons on the configuration canvas and visual instruments on the instrument canvas is shown. The creation of the processing configuration is the same as discussed above and as illustrated in FIG. 42. The difference lies in the placement of the instrument icon and visual instrument and the reciprocal nature of the Unassigned pane. In this embodiment, at least one instrument icon is first placed onto the configuration canvas. In particular, the symbol associated with the instrument icon is dragged directly from the Toolbox pane onto the configuration canvas. The visual instrument associated with the instrument icon is then automatically placed onto the Unassigned pane or temporary pane when the instrument icon is placed onto the configuration canvas, see FIG. 45. A data flow path is created between the instrument icon and at least one of the object icons within the processing configuration on the configuration canvas. As shown in FIG. 46, the visual instrument is then moved from the Unassigned pane or temporary pane to place the visual instrument onto the instrument canvas with the visual instrument on the instrument canvas operationally connected to the processing configuration on the configuration canvas. The visual instrument of this embodiment is also linked to the instrument icon such that a command is provided for switching between the visual instrument on the instrument canvas and the instrument icon on the configuration canvas. The user is free to use either method of placing instrument icons and visual instruments on their respective canvases.

Figure 47:
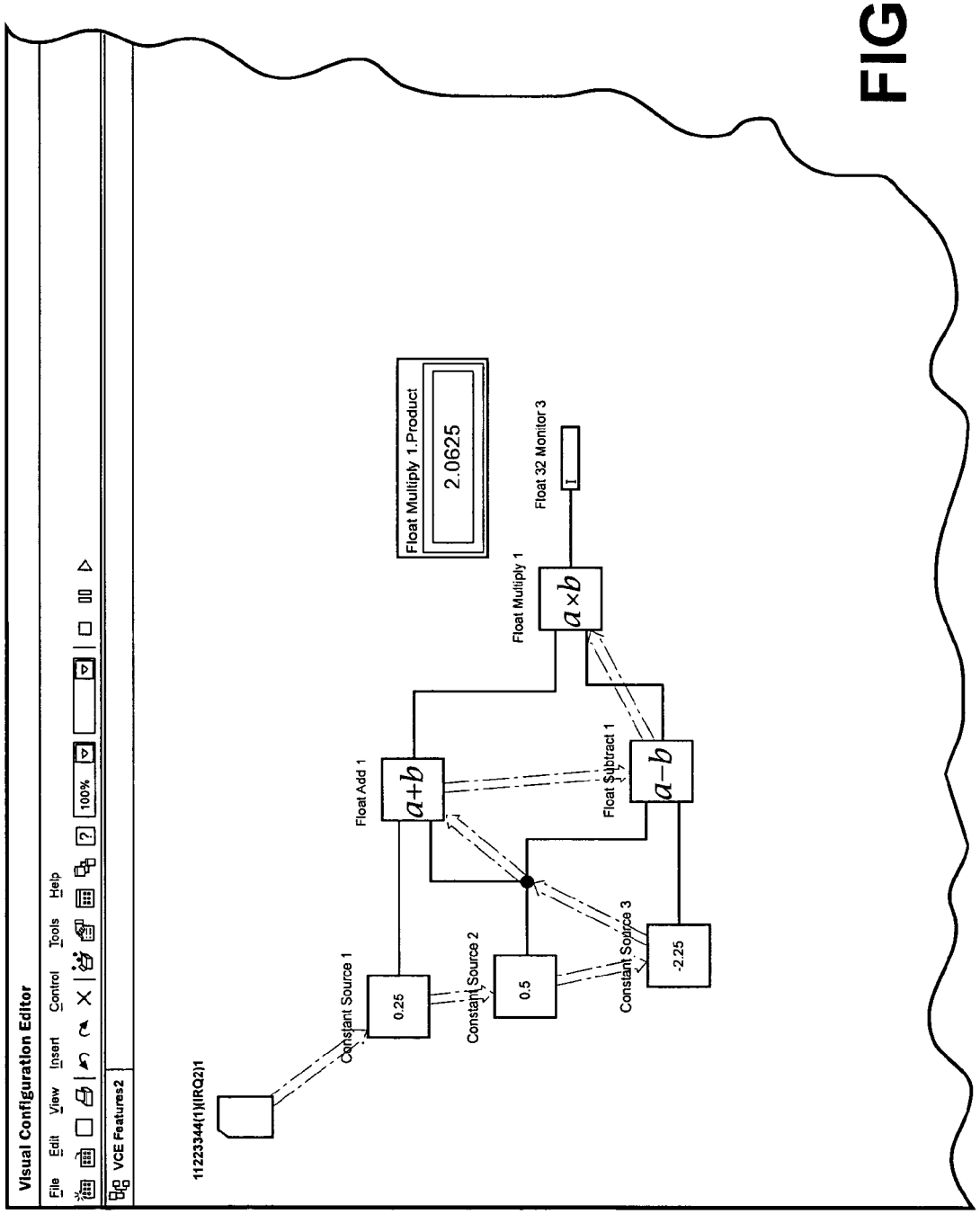
FIG. 47 illustrates another example of a completed processing configuration.
Figure 48:
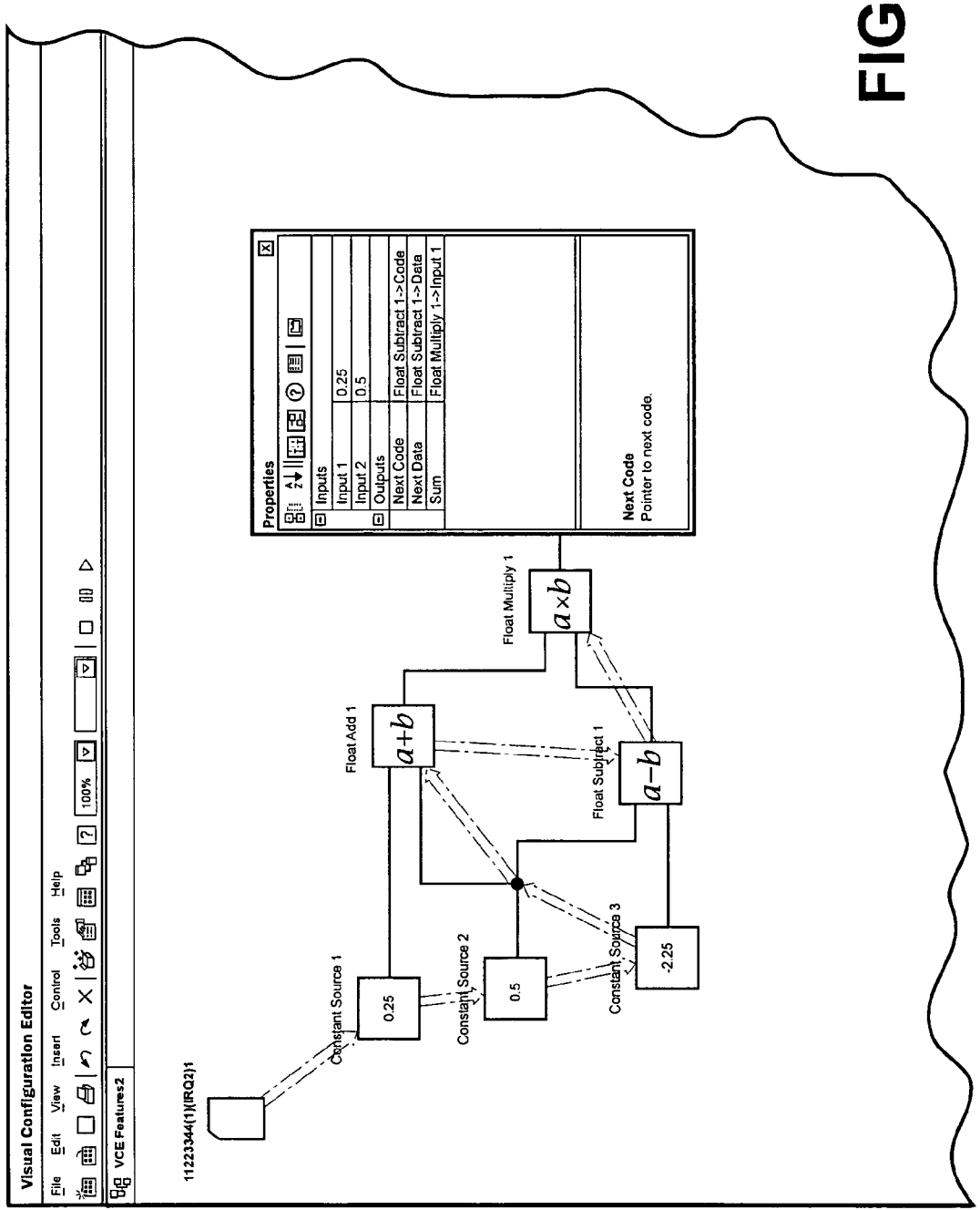
FIG. 48 illustrates the completed processing configuration of FIG. 47 with a detail of the Properties pane.
Figure 49:
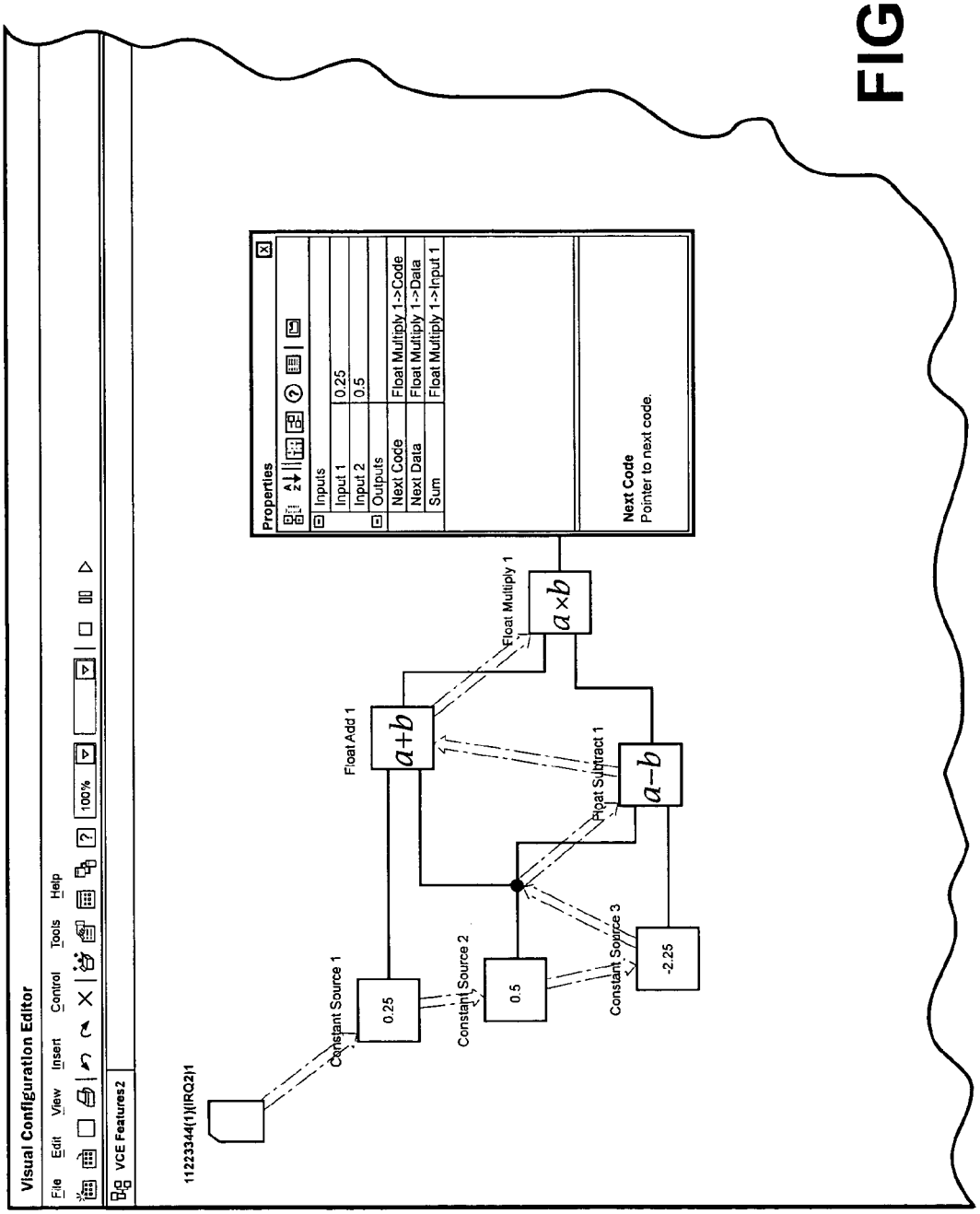
FIG. 49 illustrates the completed processing configuration of FIG. 47 with the detail of the Properties pane while demonstrating the dynamic nature of the subject invention by moving a Float Add icon relative to a Float Subtract icon.
Figure 50:
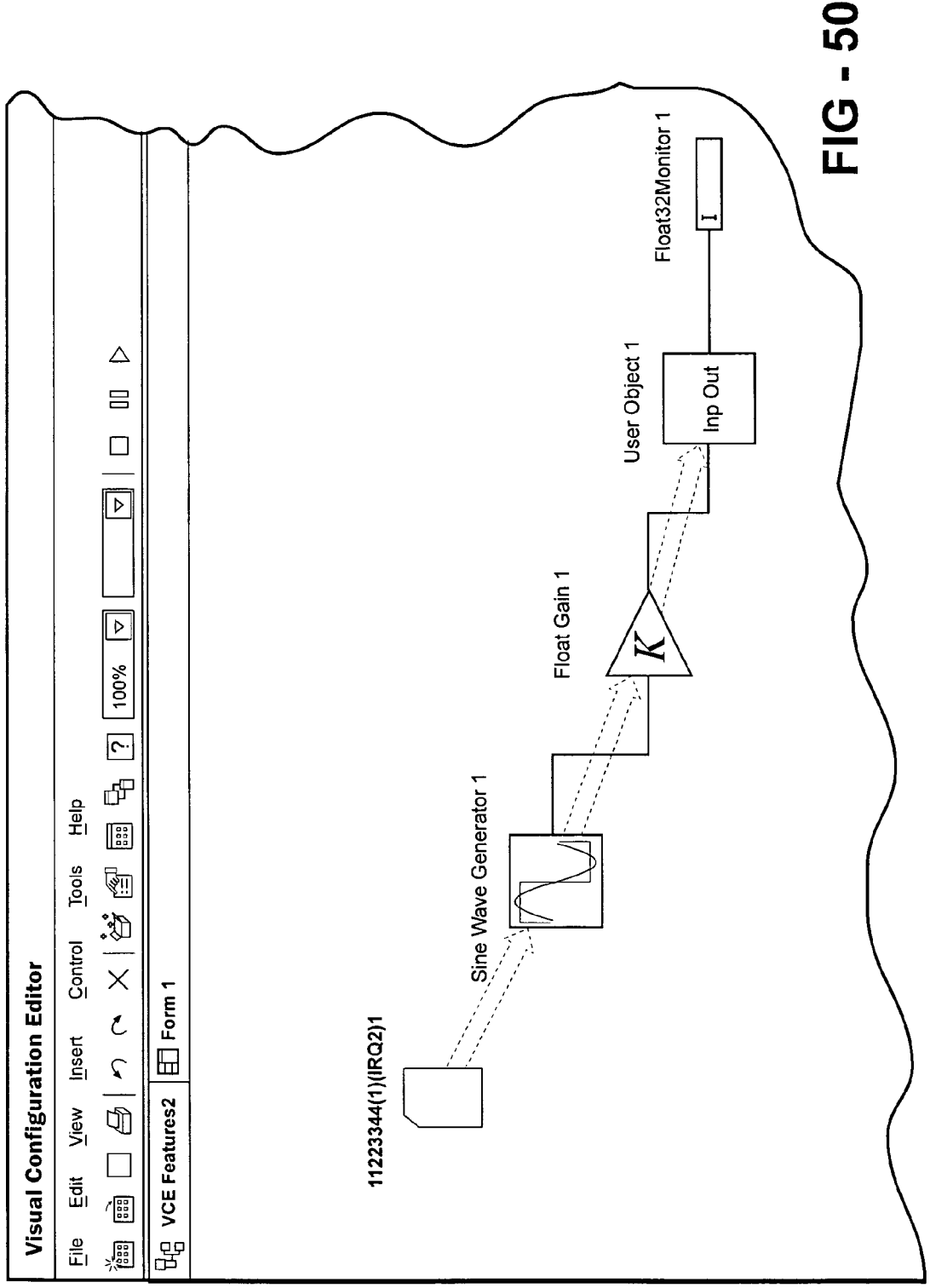
FIG. 50 illustrates yet another example of a completed processing configuration.

Another completed processing configuration is shown in FIGS. 47-49. This processing configuration is created in the same manner as set forth above. Comparing FIGS. 48 and 49 illustrates another example of orientating one object icon relative to another object icon with the execution paths dynamically changing during this re-orientation. In this example, the Float Add icon is moved relative to a Float Subtract icon and a Float Multiply icon. The Properties pane is also illustrated next to the processing configurations. As the Float Add icon is moved, the Outputs are automatically updated. In particular, the Next Code is changed from Float Subtract (FIG. 48) to Float Multiply (FIG. 49). Similarly, the Next Data is changed from Float Subtract (FIG. 48) to Float Multiply (FIG. 49). These outputs are known as code and data pointers and are more specifically described in co-pending U.S. patent application Ser. Nos. 09/692,852 and 09/982,601, the disclosures of which are herein incorporated by reference.

Figure 51:
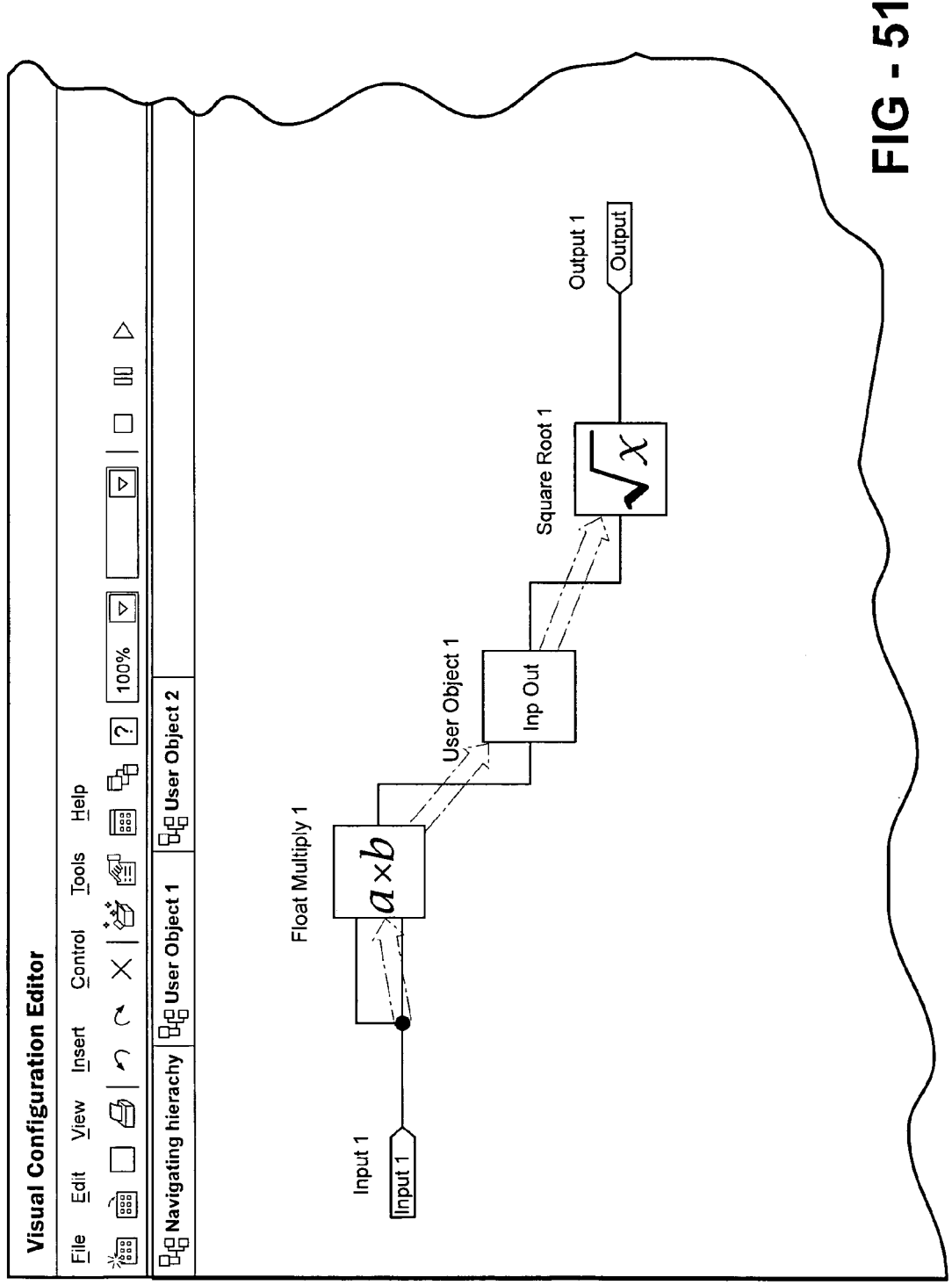
FIG. 51 is a detail of a first User Object of the completed processing configuration of FIG. 50.
Figure 52:
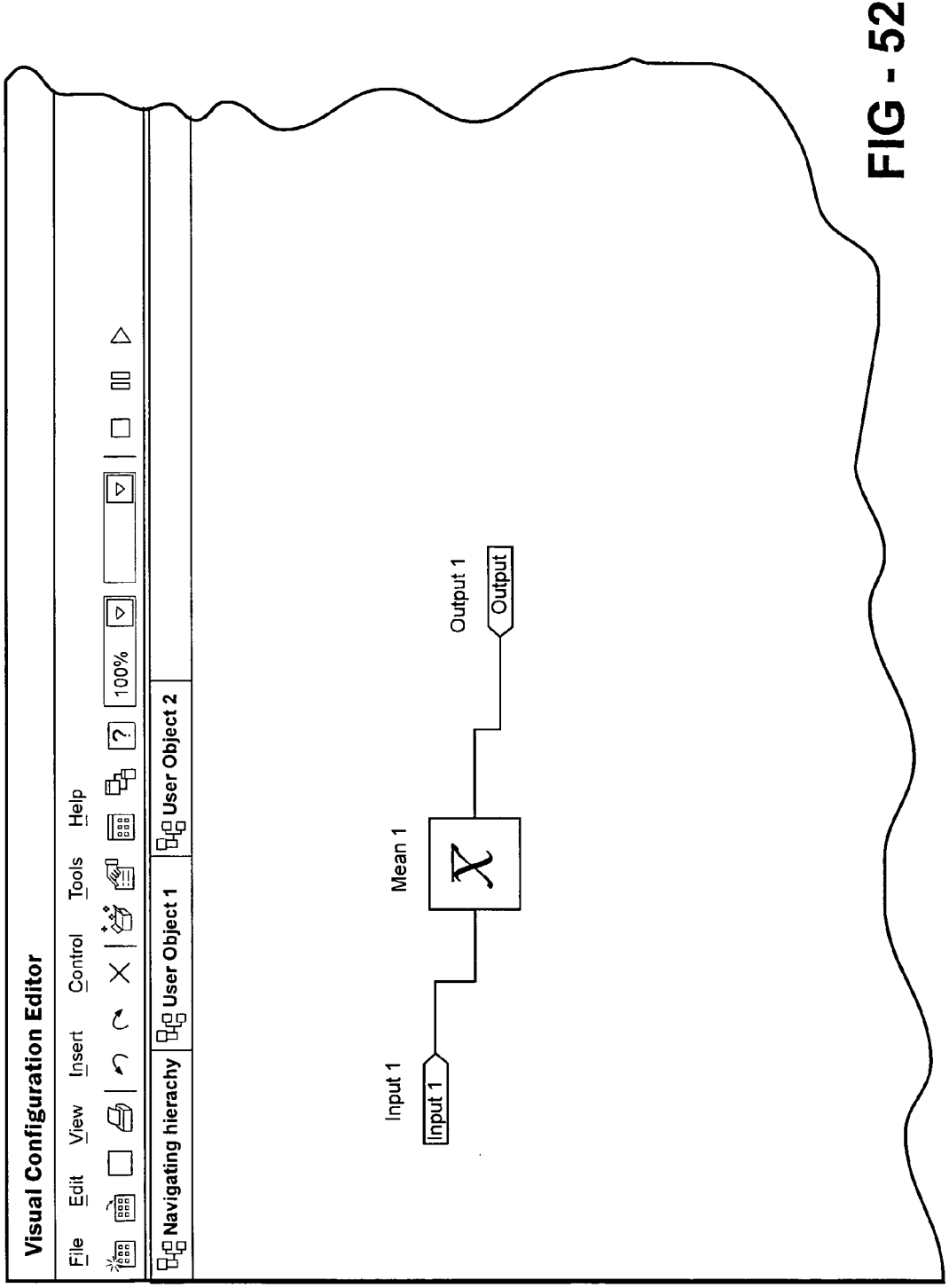
FIG. 52 is a detail of a second User Object within the first User Object of FIG. 51.
Figure 53:
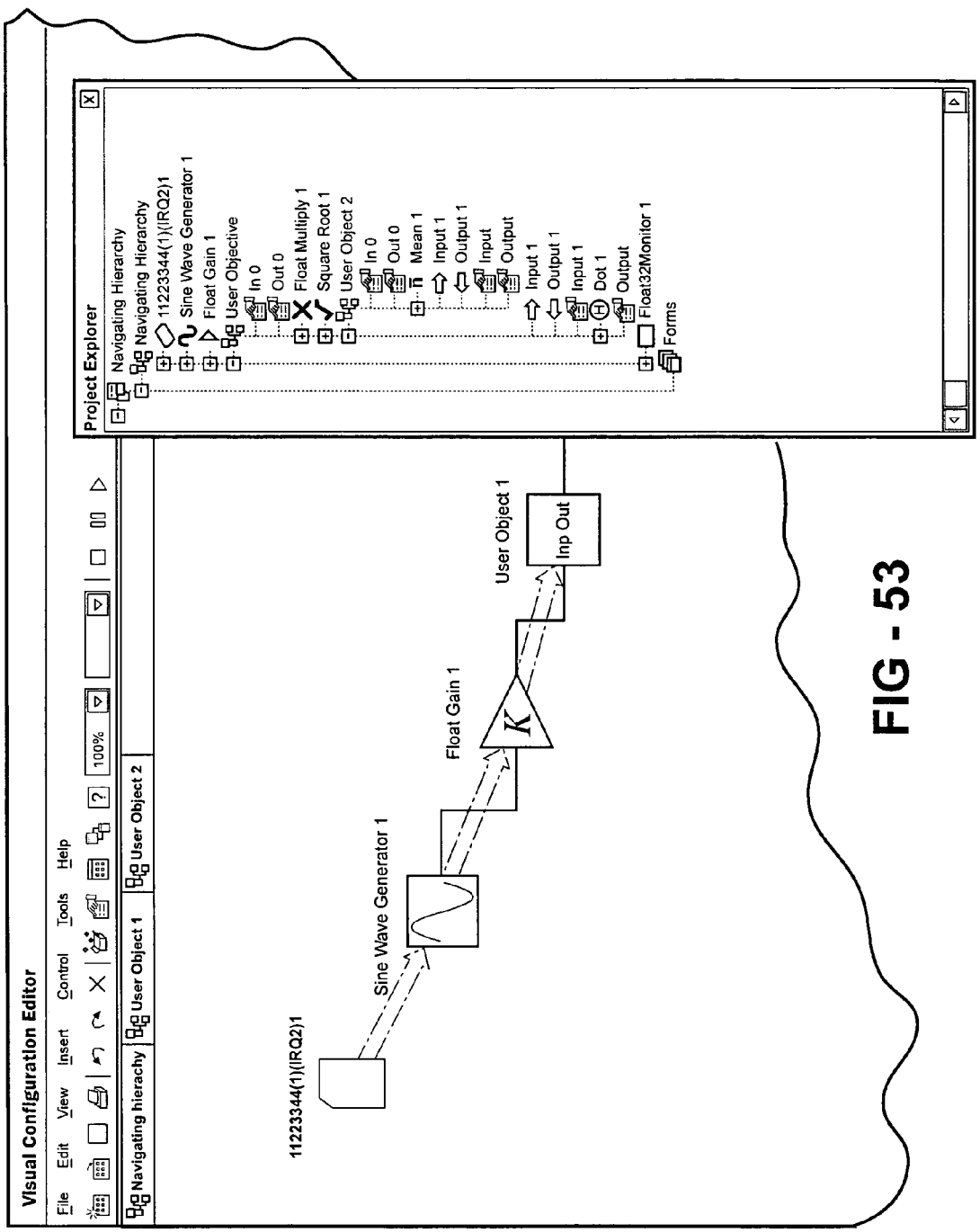
FIG. 53 illustrates the completed processing configuration of FIG. 50 with a detail of the Project Explorer pane.

Further additional features of the subject invention are shown in FIGS. 50-53. A processing configuration is created in FIG. 50 using user objects. User objects are a particular type of function object and are designed to allow a user to create a navigation hierarchy. In particular, user objects are collections of other object icons. User objects can be saved are reused as desired. Double clicking on the User Object 1 of FIG. 50 reveals a sub configuration as shown in FIG. 51. Input and output symbols are used to indicate the direction of data flow. Within the sub configuration of FIG. 51 is User Object 2. Double clicking on User Object 2 reveals a sub-sub configuration as shown in FIG. 52. This is the lowest level of hierarchy. The number of User Objects is listed in the toolbar. As shown in FIG. 53, the Project Explorer pane is opened next to the processing configuration. The Project Explorer illustrates the various hierarchy of the current configuration to assist the user. As mentioned above, the Project Explorer pane is automatically regenerated each time an icon is added, moved, replaced, deleted, etc. The Project Explorer is an important navigational tool or index to the project configuration. The user can click on icons throughout the configuration and the Project Explorer reflects the icon's location in the hierarchy. Also, the user may click on a symbol or other object on the Project Explorer tree and the canvas will automatically switch to display the selected object icon.

Figure 54:
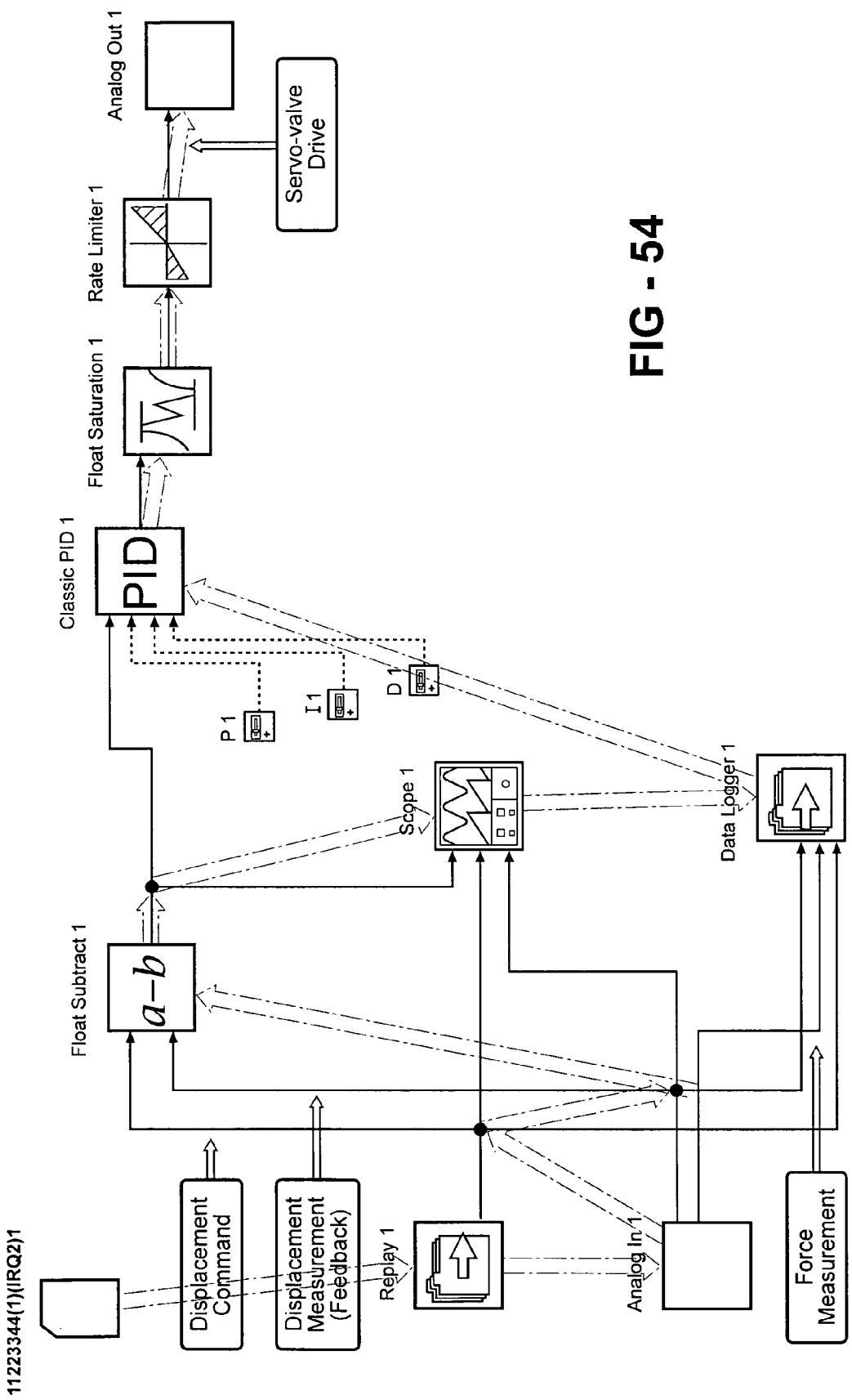
FIG. 54 is another example of a completed processing configuration.

FIG. 54 illustrates a hydraulic servocontroller implementation of the processing system. In particular, a project configuration has been created for a closed-loop servocontroller.

It should be appreciated that the creation of processing configurations can be extremely complex and the use of the subject invention greatly assists in the programming and operation of these configurations.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A method of graphically programming a distributed processing system utilizing a computer having a configuration canvas, at least one processor, and a plurality of function objects with, each of the function objects including fixed commands to perform only a particular function, said method comprising the steps of:

placing a first object icon associated with a first function object onto the canvas at a first location with the first function object performing only a first function based on a fixed set of commands;

placing a second object icon associated with a second function object onto the canvas at a second location, with the second location being different than the first location and with the second function object performing only a second function based on a fixed set of commands;

placing a third object icon associated with a third function object onto the canvas at a third location, with the third location being different than the first and second locations and with the third function object performing only a third function based on a fixed set of commands;

automatically routing a processing thread from one of the first and second object icons to the third object icon based on an orientation of the third location of the third object icon relative to the first location of the first object icon and the second location of the second object icon on the canvas with each of the object icons themselves being devoid of internal processing threads;

creating a data flow path from an output of the first object icon to an input of the second object icon on the canvas separately from the routings processing thread on the canvas such that the processing thread and data flow path, are independent from each, other; and moving at least one of the object icons to a different location and automatically re-routing the processing threads based on the moved orientation of the first, second, and third object icon relative to each other on the canvas.

2. A method as set forth in claim 1 wherein the step of automatically routing a processing thread based on the orientation of the third object icon is further defined as routing a processing thread from the second object icon to the third object icon if the second location of the second object icon is between the first location of the first object icon and the third location of the third object icon as viewed from left to right on the canvas.

3. A method as set forth in claim 2 further including the step of automatically routing a processing thread from the first object icon at the first location to the second object icon at the second location when the second object icon is placed on the canvas.

4. A method as set forth in claim 1 wherein the step of automatically routing a processing thread based on the orientation of the third object icon is further defined as routing a processing thread from the first object icon to the third object icon if the third location of the third object icon is between the first location of the first object icon and the second location of the second object icon as viewed from left to right on the canvas.

5. A method as set forth in claim 4 further including the step of automatically routing a processing thread from the first object icon at the first location to the second object icon at the second location when the second object icon is placed on the canvas and then automatically re-routing the processing thread from the first object icon in response to the orientation of the third object icon such that the processing thread is re-routed to the third object icon.

6. A method as set forth in claim 5 further including the step of automatically routing a processing thread from the third object icon at the third location to the second object icon at the second location in response to the orientation of the third object icon.

7. A method as set forth, in claim 1 further including the step of automatically routing a processing thread from one of the first object icon and the third object icon to the second object icon based on the orientation of the third location of the third object icon relative to the first location of the first object icon and the second location of the second object icon on the canvas.

8. A method as set forth in claim 7 further including the step of creating a data flow path between the first, second, and third object icons on the canvas separately from the routings of the processing threads on the canvas such that the processing threads and data flow path are independent from each other.

9. A method as set forth in claim 8 wherein each of the function objects and associated object icons includes at least one input and at least one output and wherein the step of creating a data flow path between, the object icons is further defined as manually connecting the output from one of the object icons to the input of another object icon.

10. A method as set forth in claim, 9 further including the step of automatically distributing the data flow path when more than one input is required by one or more object icons thereby creating a distribution point on the data flow path.

11. A method as set forth in claim 10 further including the step of automatically creating a distribution icon associated with another function object at the distribution point on the data flow path and automatically re-routing the processing threads to include the distribution icon at the distribution point based on the relative orientations of the icons.

12. A method as set forth in claim 9 further including the step of placing a distribution icon associated with another function object on the data flow path to distribute the data flow path when more than one input is required by one or more icons.

13. A method as set forth in claim 8 further including the step of operating the processing system such that the function objects are performing the specific associated functions based on the fixed commands in the order of the processing threads between the object icons based on the relative orientations of the object icons and data is passing along the data flow path between the icons with the execution of the processing threads moving continuously from one of the object icons to the next object icon based on the relative orientations of the object icons irrespective of the flow of data along the data flow path.

14. A method as set forth in claim 13 further including the step of moving at least one of the first, second, and third object icons to a different location and automatically re-routing the processing threads based on the moved orientation of the first, second, and third object icons relative to each other on the canvas while the processing system is operating such that the processing threads are re-routed in real time.

15. A method as set forth in claim 13 wherein the step of operating the processing system is further defined as operating the processing threads between the icons in order of left to right as viewed on the canvas.

16. A method as set forth in claim 1 further including the step of placing a processor icon associated with the processor onto the canvas.

17. A method as set forth in claim 16 wherein the processing system further includes a processor pane and the processor includes a plurality of events, and wherein the step of placing the processor icon onto the canvas is further defined as moving one of the events from the processor pane to the canvas.

18. A method as set forth in claim 16 further including the step of automatically routing a processing thread from the processor icon to one of the first, second, and third object icons based on the orientations of the icons.

19. A method as set forth in claim 18 wherein the step of routing the processing thread from the processor icon to one of the first, second, and third object icons is further defined as automatically routing the processing thread from the processor icon to one of the first, second, and third object icons based on a left most position of the first, second, and third object icons as viewed from left to right on the canvas.

20. A method as set forth in claim 1 wherein the processing system further includes a toolbox pane with each function object having a symbol identified in the toolbox pane and wherein the steps of placing the first, second, and third object icons onto the canvas is further defined as copying the associated symbol from the toolbox pane onto the canvas.

21. A method as set forth in claim 1 wherein each of the first, second, and third object icons include a plurality of symbols and descriptors and further including the step of dynamically alternating between the plurality of symbols and descriptors when desired.

22. A method as set forth in claim 21 wherein each of the first, second, and third object icons include both a graphical symbol and a text descriptor with, only one of the symbol and descriptor being visible at any one time and further including the step of dynamically alternating between the graphical symbol, and the text descriptor when desired.

23. A method of graphically programming a distributed processing system utilizing a computer having a configuration canvas, at least one processor, and a plurality of function objects with each of the function objects including fixed commands to perform only a particular function and further including inputs and outputs, said method comprising the steps of:

placing a first object icon associated with a first function object onto the canvas at a first location with the first function object performing only a first function based on a fixed set of commands;

placing a second object icon associated with a second function object onto the canvas at a second location, with the second location being different than the first location and with the second function object performing only a second function based on a fixed set of commands;

automatically routing a processing thread from the first object icon at the first location to the second object icon at the second location when the second object icon is placed on the canvas with each of the object icons themselves being devoid of internal processing threads;

creating a data flow path from an output of the first object icon to an input of the second object icon on the canvas separately from the routings of the processing threads on the canvas such that the processing threads and data flow path are independent from each other; and operating the distributed processing system such that the function objects are performing the associated functions in the order of the processing threads between the object icons based on the relative orientations of the object icons and data is passing along the data flow path between the object icons with the execution of the processing threads moving continuously from one of the object icons to the next object icon based on the relative orientations of the object icons irrespective of the flow of data along the data flow path.

24. A method, as set forth in claim 23 wherein the step of creating a data flow path between the object icons is further defined as manually connecting the output from the first object icon to the input of the second object icon.

25. A method as set forth in claim 23 further including the step of automatically distributing the data flow path when more than one input is required by one or more object icons thereby creating a distribution point on the data flow path.

26. A method as set forth in claim 25 further including the step of automatically creating a distribution icon associated with another function object at the distribution point on the data flow path and automatically re-routing the processing threads to include the distribution icon at the distribution point based on the relative orientations of the icons.

27. A method as set forth claim 23 further including the step of placing a distribution icon associated with another function object on the data flow path to distribute the data flow path when more than one input is required by one or more icons.

28. A method as set forth in claim 23 further including the steps of:

placing a third object icon associated with a third function object onto the canvas at a third location;

placing a fourth object icon associated with a fourth, function object onto the canvas at a fourth location, with the fourth location being different than the third location;

automatically routing a processing thread from the third object icon at the third location to the fourth object icon at the fourth location when the fourth object icon is placed on the canvas; and creating a data flow path from an output of the third object icon to an input of the fourth object icon on the canvas separately from the routings of the processing threads on the canvas such that the processing threads and data flow path are independent from each other.

29. A method as set forth in claim 28 further including the step inserting a synchronization object into the processing thread between, the first and second object icons and into the processing thread between the third and fourth object icons to synchronize the processing threads at the insertion point.

30. A method as set forth in claim 23 wherein the step of operating the processing system is further defined as operating the processing threads between the icons in order of left to right as viewed on the canvas and passing data along the data flow path from the outputs to the inputs.

31. A method, as set forth in claim 23 further including the step of placing a processor icon associated with the processor onto the canvas.

32. A method as set forth in claim 31 wherein the processing system further includes a processor pane and the processor includes a plurality of events, and wherein the step of placing the processor icon onto the canvas is further defined moving one of the events from the processor pane to the canvas.

33. A method as set forth, in claim 31 further including the step of automatically routing a processing thread from the processor icon to one of the first and second object icons based on a left most position of the first and second object icons as viewed from left to right on the canvas.

34. A method, as set forth in claim 23 wherein the processing system further includes a toolbox pane with each function object having a symbol identified in the toolbox pane and wherein the steps of placing the first and second object icons onto the canvas is further defined as copying the associated symbol from the toolbox pane onto the canvas.

35. A method as set forth in claim 23 wherein each of the first and second object icons include a plurality of symbols and descriptors and further including the step of dynamically alternating between the plurality of symbols and descriptors when desired.

36. A method of graphically programming a distributed processing system utilizing a computer having a common configuration canvas, a plurality of processors, and a plurality of function objects with each of the function objects including commands to perform a particular function, said method comprising the steps of:

placing a first processor icon associated with a first processor onto the canvas;

placing a first plurality of object icons each associated with a first plurality of function objects onto the canvas at a plurality of different locations;

automatically routing a first plurality of processing threads from the first processor icon to each of the first plurality of object icons when the first plurality of object icons are placed on the canvas to define a first processing configuration;

creating a first data flow path between the first plurality of object icons on the canvas separately from the routings of the processing threads from the first processor icon on the canvas with the execution of the processing threads moving continuously through the first plurality of object icons irrespective of the flow of data along the first data flow path;

placing a second processor icon onto the canvas;

placing a second plurality of object icons each associated with a second plurality of function objects onto the canvas at a plurality of different locations;

automatically routing a second plurality of processing threads from the second processor icon to each of the second plurality of object icons when the second plurality of object icons are placed on the canvas to define a second processing configuration;

creating a second data flow path between the second plurality of object icons on the canvas separately from the routings of the processing threads from the second processor icon on the canvas with the execution of the processing threads moving continuously through the second plurality of object icons irrespective of the flow of data along the second data flow path; and re-routing at least one of the first plurality of object icons from the first processing configuration into the second processing configuration by manually indicating that a re-routing is desired and then automatically removing the first plurality of processing threads associated with the re-routed object icon and automatically routing the second plurality of processing threads to the re-routed object icon.

37. A method as set forth in claim 36 wherein the first processor includes a first machine language and the second processor includes a second machine language that is different than the first machine language and wherein the step of re-routing the first plurality of object icons is further defined as re-routing at least one of the first plurality of object icons from the first processing configuration operating under the first machine language seamlessly into the second processing configuration operating under the second machine language.

38. A method as set forth in claim 36 further including the step of routing at least one of the first and second data flow paths to flow between at least one of the first plurality of object icons and the second plurality of object icons such that data is passing between the first and second processing configurations.

39. A method as set forth in claim 36 further including the step of operating the first and second processing configurations such that the function objects are performing the associated functions in the order of the processing threads between the icons based on relative orientations of the icons and data is passing along the data flow path between the icons.

40. A method as set forth in claim 39 wherein the step of operating the first and second processing configurations is further defined as operating the processing threads between the icons in order of left Ito right as viewed on the canvas.

41. A method as set forth in claim 39 further including the step inserting a synchronization object into the processing thread between the icons of the first processing configuration and into the processing thread between the icons of the second processing configuration to synchronize the processing threads at the insertion point.

42. A method of graphically programming a distributed processing system utilizing a computer having a configuration canvas, an instrument canvas, and a temporary pane, the distributed processing system including at least one processor, a plurality of function objects with each of the function objects including commands to perform a particular function, and at least one visual instrument configure to create controls and indicators that appear on the computer to permit interaction with the distributed processing system during operation thereof, said method comprising the steps or:
    placing a plurality of object icons each associated with, a plurality of function objects onto the configuration canvas at a plurality of different locations;
    automatically routing a plurality of processing threads between each of the plurality of object icons when the plurality of object icons are placed on the configuration canvas to define a processing configuration, each processing thread generated between a first object icon and a second object icon is based on a relative orientation on the configuration canvas of the first object icon to the second object icon;
    automatically re-routing the processing threads when the first object icon is moved relative to the second object icon on the canvas;
    creating data flow paths between the object icons on the configuration canvas;
    placing at least one visual instrument onto the instrument canvas;
    automatically placing an instrument icon associated with the visual instrument onto the temporary pane when the visual instrument is placed onto the instrument canvas;
    moving the instrument icon from the temporary pane to place the instrument icon onto the configuration canvas, the moving of the instrument icon links the visual instrument on the instrument canvas to the instrument icon on the configuration canvas; and
    creating a data flow path between the instrument icon and, at least one of the object icons within the processing configuration on the configuration canvas such that the visual instrument on the instrument canvas is operationally connected to the processing configuration on the configuration canvas separately from the routings of the processing threads such that the processing threads and data flow path are independent from each other.

43. A method as set forth in claim 42 further including the step of operating the processing configuration such that the function objects are performing the associated functions in the order of the processing threads between the icons based on relative orientations of the icons and data is passing along the data flow path between the icons with the execution of the processing threads moving continuously from one of the icons to the next icon based on the relative orientations of the icons irrespective of the flow of data along the data flow path.

44. A method as set forth in claim 43 further including the step of manipulating the visual instrument to automatically alter data values passing along the data flow paths in real time.

45. A method as set forth in claim 42 further including the step of providing a command for switching between the visual instrument on the instrument canvas and the instrument icon on the configuration canvas.

46. A method of graphically programming a distributed processing system utilizing a computer having a configuration canvas, an instrument canvas, and a temporary pane, the distributed processing system including at least one processor, a plurality of function objects with each of the function objects including commands to perform a particular function, and at least one visual instrument configured to create controls and indicators that appear on the computer to permit interaction with the distributed processing system during operation thereof, said method comprising the steps of:
    placing a plurality of object icons each associated with a plurality of function objects onto the configuration canvas at a plurality of different locations;
    automatically routing a plurality of processing threads between each of the plurality of object icons when the plurality of object icons are placed on the configuration canvas to define a processing configuration, each processing thread generated between a first object icon and a second object icon is based on a relative orientation on the configuration canvas of the first object icon to the second object icon;
    creating data flow paths between the object icons on the configuration canvas;
    placing at least one instrument icon onto the configuration canvas;
    automatically placing the visual instrument associated with the instrument icon onto the temporary pane when the instrument icon is placed onto the configuration canvas;
    creating a data flow path between the instrument icon and at least one of the object icons within the processing configuration on the configuration canvas separately from the routings of the processing threads such that the processing threads and data flow path are independent from each other; and
    moving the visual instrument from the temporary pane to place the visual instrument onto the instrument canvas with the visual instrument on the instrument canvas operationally connected to the processing configuration on the configuration canvas, the moving of the visual instrument links the instrument icon on the instrument canvas to the visual instrument on the configuration canvas.

47. A method as set forth in claim 46 further including the step of operating the processing configuration such that the function objects are performing the associated functions in the order of the processing threads between the icons based on relative orientations of the icons and data is passing along the data flow path between the icons with the execution of the processing threads moving continuously from one of the icons to the next icon based on the relative orientations of the icons irrespective of the flow of data along the data flow path.

48. A method as set forth in claim 47 further including the step of manipulating the visual instrument to automatically alter data values passing along the data flow paths in real time.

49. A method as set forth in claim 46 further including the step of providing a command for switching between the visual instrument on the instrument canvas and the instrument icon on the configuration canvas.

* * * * *

UNITED STATES PATENT AND TRADEMARK OFFICE
CERTIFICATE OF CORRECTION

| | | |
|---|---|---|
| PATENT NO. | : 7,992,093 B2 | Page 1 of 1 |
| APPLICATION NO. | : 11/066687 | |
| DATED | : August 2, 2011 | |
| INVENTOR(S) | : Andrew R. Osborn et al. | |

It is certified that error appears in the above-identified patent and that said Letters Patent is hereby corrected as shown below:

In the Claims Section

Column 18, line 18, please delete "with," and insert --with--.
Column 18, line 44, please delete "routings processing" and insert --routings of the processing--.
Column 18, line 46, please delete "path," and insert --path--.
Column 19, line 18, please delete "forth," and insert --forth--.
Column 19, line 34, please delete "between," and insert --between--.
Column 20, line 40, please delete "with," and insert --with--.
Column 20, line 43, please delete "symbol," and insert --symbol--.
Column 21, line 13, please delete "method," and insert --method--.
Column 21, line 37, please delete "fourth," and insert --fourth--.
Column 21, line 51, please delete "between," and insert --between--.
Column 23, line 23, please delete "left Ito" and insert --left to--.
Column 23, line 37, please delete "configure" and insert --configured--.
Column 23, line 41, please delete "steps or." and insert --steps of:--.
Column 23, line 42, please delete "with," and insert --with--.
Column 24, line 1, please delete "and," and insert --and--.
Column 24, line 45, after "icon:" insert --automatically re-routing the processing threads when the first object icon is moved relative to the second object icon on the canvas;--.

Signed and Sealed this
Fifteenth Day of November, 2011

David J. Kappos
*Director of the United States Patent and Trademark Office*